(12) United States Patent
Ishibashi

(10) Patent No.: US 7,287,010 B1
(45) Date of Patent: Oct. 23, 2007

(54) INFORMATION PROCESSING DEVICE AND METHOD, AND PROVIDING MEDIUM

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/719,111

(22) PCT Filed: Apr. 7, 2000

(86) PCT No.: PCT/JP00/02290
§ 371 (c)(1),
(2), (4) Date: Dec. 8, 2000

(87) PCT Pub. No.: WO00/62217
PCT Pub. Date: Oct. 19, 2000

(30) Foreign Application Priority Data
Apr. 12, 1999 (JP) .................................. 11-103992

(51) Int. Cl.
*H04L 9/32* (2006.01)
(52) U.S. Cl. .......................................... 705/52; 726/30
(58) Field of Classification Search .................. 705/50; 713/187
See application file for complete search history.

(56) References Cited

U.S. PATENT DOCUMENTS

| | | | | |
|---|---|---|---|---|
| 4,908,861 | A * | 3/1990 | Brachtl et al. ............... | 713/187 |
| 5,671,412 | A * | 9/1997 | Christiano ............... | 707/104.1 |
| 6,289,314 | B1 * | 9/2001 | Matsuzaki et al. ............. | 705/1 |
| 6,502,124 | B1 * | 12/2002 | Shimakawa et al. ........ | 709/203 |

FOREIGN PATENT DOCUMENTS

| | | |
|---|---|---|
| EP | 0 715 247 A1 | 6/1996 |
| JP | 10-512074 | 11/1998 |
| WO | WO90 02382 | 3/1990 |
| WO | WO 96/27155 | 9/1996 |
| WO | WO96/27155 | 9/1996 |

OTHER PUBLICATIONS

"An Overview of Electronic Copyright Management Systems", Masaji Kawahara, Tsukuba college of Technology, Nov. 15, 1997, pp. 43 to 48.
Supplementary European Search Report with Annex.

* cited by examiner

*Primary Examiner*—Nasser Moazzami
*Assistant Examiner*—Brandon S Hoffman
(74) *Attorney, Agent, or Firm*—Finnegan, Henderson, Farabow, Garrett & Dunner, L.L.P.

(57) ABSTRACT

The present invention allows content to be transferred with source equipment retaining the content. Content is transferred to destination equipment while at the same time it is retained on the source equipment. This allows the content to be used on both source and destination equipment in contrast to the usual move operation in which content is removed from the source equipment and used only on the destination equipment. While content is under transferred control, the source equipment cannot transfer the control of the content to any third equipment. Thus, the content is held only on the two pieces of equipment: the source equipment and destination equipment. In this respect, content control transfer differs from the first-generation duplication which can produce multiple duplicates (first-generation) from the original content. Also, content control transfer differs from one-time duplication in that content control can be transferred to third equipment if the content is returned to the source equipment.

21 Claims, 48 Drawing Sheets

| DELIVERY KEYS | VERSION | VALIDITY PERIOD | |
|---|---|---|---|
| | | START | END |
| aaaaaaaa | 1 | 1998/1/1 | 1998/1/31 |

TEMPORARY DELIVERY KEYS Kd

FIG. 8

| SAM ID | ID OF SAM62 | ID OF SAM212 |
|---|---|---|
| EQUIPMENT NUMBER | EQUIPMENT NUMBER (100) OF RECEIVERS 51 | EQUIPMENT NUMBER (100) OF RECEIVERS 201 |
| SETTLEMENT ID | SETTLEMENT NUMBER | SETTLEMENT NUMBER |
| ACCOUNT-SETTLING USER INFORMATION — NAME | NAME OF USER F | NAME OF USER F |
| ADDRESS | ADDRESS OF USER F | ADDRESS OF USER F |
| PHONE NUMBER | PHONE NUMBER OF USER F | PHONE NUMBER OF USER F |
| SETTLEMENT INSTITUTION INFORMATION | SETTLEMENT INSTITUTION INFORMATION OF USER F | SETTLEMENT INSTITUTION INFORMATION OF USER F |
| DATE OF BIRTH | DATE OF BIRTH OF USER F | DATE OF BIRTH OF USER F |
| AGE | AGE OF USER F | AGE OF USER F (35) |
| SEX | SEX OF USER F | SEX OF USER F (MALE) |
| USER ID | USER ID OF USER F | USER ID OF USER F |
| PASSWORD | PASSWORD OF USER F | PASSWORD OF USER F |
| SUBORDINATE USER INFORMATION — NAME | | |
| ADDRESS | | |
| PHONE NUMBER | | |
| DATE OF BIRTH | | |
| SEX | | |
| USER ID | | |
| PASSWORD | | |
| ⋮ | ⋮ | ⋮ |
| USE POINT INFORMATION | USE POINT INFORMATION OF RECEIVERS 51 | USE POINT INFORMATION OF RECEIVERS 201 |

SYSTEM REGISTRATION INFORMATION

FIG. 9

| USER | PROVIDER | USE POINT |
|---|---|---|
| ACCOUNT-SETTLING USER | CONTENT PROVIDER2-1<br>CONTENT PROVIDER2-2<br>SERVICE PROVIDER3-1<br>SERVICE PROVIDER3-2 | 222POINTS<br>123POINTS<br>345POINTS<br>0POINT |

USE POINT INFORMATION

CONTENT PROVIDER 2-1

FIG. 12

A (ucpA)

| CONTENT ID | ID OF CONTENT A | |
|---|---|---|
| CONTENT PROVIDER ID | ID OF CONTENT PROVIDER 2-1 | |
| UCP ID | ID OF ucpA | |
| UCP VALIDITY | VALIDITY PERIOD OF ucpA | |
| USAGE CONDITIONS 10 | USER CONDITIONS 10 | 200 POINTS OR HIGHER |
| | EQUIPMENT CONDITIONS 10 | NO CONDITION |
| USAGE DETAILS 11 | ID 11 | ID OF USAGE DETAILS 11 |
| | TYPE 11 | PURCHASE AND REPRODUCE |
| | PARAMETER 11 | xxxx |
| | CONTROL TRANSFER PERMISSION INFORMATION 11 | PERMITTED |
| USAGE DETAILS 12 | ID 12 | ID OF USAGE DETAILS 12 |
| | TYPE 12 | FIRST-GENERATION DUPLICATE |
| | PARAMETER 12 | xxxx |
| | CONTROL TRANSFER PERMISSION INFORMATION 12 | NOT PERMITTED |
| USAGE DETAILS 13 | ID 13 | ID OF USAGE DETAILS 13 |
| | TYPE 13 | LIMITED-TIME REPRODUCTION |
| | PARAMETER 13 | xxxx |
| | CONTROL TRANSFER PERMISSION INFORMATION 13 | NOT PERMITTED |
| USAGE DETAILS 14 | ID 14 | ID OF USAGE DETAILS 14 |
| | TYPE 14 | Pay Per Copy 5 |
| | PARAMETER 14 | DUPLICATES FIVE TIMES |
| | CONTROL TRANSFER PERMISSION INFORMATION 14 | NOT PERMITTED |

B (ucpB)

| CONTENT ID | ID OF CONTENT A | |
|---|---|---|
| CONTENT PROVIDER ID | ID OF CONTENT PROVIDER 2-1 | |
| UCP ID | ID OF ucpB | |
| UCP VALIDITY PERIOD | VALIDITY PERIOD OF ucpB | |
| USAGE DETAILS 20 | USER CONDITIONS 20 | 200 POINTS OF LOWER |
| | EQUIPMENT CONDITIONS 20 | NO CONDITION |
| USAGE DETAILS 21 | ID 21 | ID OF USAGE DETAILS 21 |
| | TYPE 21 | Pay Per Play 4 |
| | PARAMETER 21 | REPRODUCTION FOUR TIMES |
| | CONTROL TRANSFER PERMISSION INFORMATION 21 | NOT PERMITTED |
| USAGE DETAILS 22 | ID 22 | ID OF USAGE DETAILS 22 |
| | TYPE 22 | Pay Per Copy 2 |
| | PARAMETER 22 | DUPLICATES TWO TIMES |
| | CONTROL TRANSFER PERMISSION INFORMATION 22 | NOT PERMITTED |

A

| SERVICE CODE | INDICATION |
|---|---|
| 0000h | NO CONDITION |
| 0001h TO 00FFh | WITH CONDITIONS FOR EQUIPMENT |
| 0100h TO 01FFh | WITH CONDITIONS FOR SEX |
| 0200h TO 02FFh | WITH CONDITIONS FOR AGE |
| 0300h TO 7FFFh | WITH OTHER CONDITIONS |
| 8000h TO FFFFh | WITH CONDITIONS FOR USE POINT |

B

| CONDITION CODE | INDICATION |
|---|---|
| 00h | NO CONDITION |
| 01h | = |
| 02h | ≠ |
| 03h | < (SMALLER) |
| 04h | > (LARGER) |
| 05h | ≦ (EQUAL OR SMALLER) |
| 06h | ≧ (EQUAL OF LARGER) |
| 07h TO FFh | FREE |

| USER CONDITIONS 10 | SERVICE CODE | VALUE CODE | CONDITION CODE |
|---|---|---|---|
| | 80××h | 0000C8h | 06h |
| EQUIPMENT CONDITIONS 10 | SERVICE CODE | VALUE CODE | CONDITION CODE |
| | 0000h | FFFFFFh | 00h |

USAGE CONDITIONS 10 OF UCPA

B

| USER CONDITIONS 20 | SERVICE CODE | VALUE CODE | CONDITION CODE |
|---|---|---|---|
| | 80××h | 0000C8h | 03h |
| EQUIPMENT CONDITIONS 20 | SERVICE CODE | VALUE CODE | CONDITION CODE |
| | 0000h | FFFFFFh | 00h |

USAGE CONDITIONS 20 OF UCPB

| CONTENT ID | ID OF CONTENT A | |
|---|---|---|
| CONTENT PROVIDER ID | ID OF CONTENT PROVIDER 2-1 | |
| UCP ID | ID OF UCP A | |
| SERVICE PROVIDER ID | ID OF SERVICE PROVIDER 3-1 | |
| PT ID | ID OF PTA-1 | |
| PT VALIDITY PERIOD | VALIDITY PERIOD OF PTA-1 | |
| PRICING CONDITIONS 10 | USER CONDITIONS 10 | MALE |
| | EQUIPMENT CONDITIONS 10 | NO CONDITIONS |
| PRICE 11 | 2000YEN | |
| PRICE 12 | 600YEN | |
| PRICE 13 | 100YEN | |
| PRICE 14 | 300YEN | |

PTA-1

B

| CONTENT ID | ID OF CONTENT A | |
|---|---|---|
| CONTENT PROVIDER ID | ID OF CONTENT PROVIDER 2-1 | |
| UCP ID | ID OF UCP A | |
| SERVICE PROVIDER ID | ID OF SERVICE PROVIDER 3-1 | |
| PT ID | ID OF PTA-2 | |
| PT VALIDITY PERIOD | VALIDITY PERIOD OF PTA-2 | |
| PRICING CONDITIONS 20 | USER CONDITIONS 20 | FEMALE |
| | EQUIPMENT CONDITIONS 20 | NO CONDITIONS |
| PRICE 21 | 1000YEN | |
| PRICE 22 | 300YEN | |
| PRICE 23 | 50YEN | |
| PRICE 24 | 150YEN | |

PTA-2

| USER CONDITIONS 10 | SERVICE CODE | VALUE CODE | CONDITION CODE |
|---|---|---|---|
| | 01××h | 000000h | 01h |
| EQUIPMENT CONDITIONS 10 | SERVICE CODE | VALUE CODE | CONDITION CODE |
| | 0000h | FFFFFFh | 00h |

USAGE CONDITIONS 10 OF PTA-1

B

| USER CONDITIONS 20 | SERVICE CODE | VALUE CODE | CONDITION CODE |
|---|---|---|---|
| | 01××h | 000001h | 01h |
| EQUIPMENT CONDITIONS 20 | SERVICE CODE | VALUE CODE | CONDITION CODE |
| | 0000h | FFFFFFh | 00h |

USAGE CONDITIONS 20 OF PTA-2

A  PTB-1

| CONTENT ID | ID OF CONTENT A | |
|---|---|---|
| CONTENT PROVIDER ID | ID OF CONTENT PROVIDER 2-1 | |
| UCP ID | ID OF ucP B | |
| SERVICE PROVIDER ID | ID OF SERVICE PROVIDER 3-1 | |
| PT ID | ID OF PTB-1 | |
| PT VALIDITY PERIOD | VALIDITY PERIOD OF PTB-1 | |
| PRICING CONDITIONS 30 | USER CONDITIONS 30 | NO CONDITIONS |
| | EQUIPMENT CONDITIONS 30 | SLAVE EQUIPMENT |
| PRICE 31 | 100YEN | |
| PRICE 32 | 300YEN | |

B  PTB-2

| CONTENT ID | ID OF CONTENT A | |
|---|---|---|
| CONTENT PROVIDER ID | ID OF CONTENT PROVIDER 2-1 | |
| UCP ID | ID OF ucPB | |
| SERVICE PROVIDER ID | ID OF SERVICE PROVIDER 3-1 | |
| PT ID | ID OF PTB-2 | |
| PT VALIDITY PERIOD | VALIDITY PERIOD OF PTB-2 | |
| PRICING CONDITIONS 40 | USER CONDITIONS 40 | NO CONDITIONS |
| | EQUIPMENT CONDITIONS 40 | MASTER EQUIPMENT |
| PRICE 41 | 50YEN | |
| PRICE 42 | 150YEN | |

A

| USER CONDITIONS 30 | SERVICE CODE | VALUE CODE | CONDITION CODE |
|---|---|---|---|
| | 0000h | FFFFFFh | 00h |
| EQUIPMENT CONDITIONS 30 | SERVICE CODE | VALUE CODE | CONDITION CODE |
| | 00××h | 000064h | 03h |

USAGE CONDITIONS 30 OF PTB-1

B

| USER CONDITIONS 40 | SERVICE CODE | VALUE CODE | CONDITION CODE |
|---|---|---|---|
| | 0000h | FFFFFFh | 00h |
| EQUIPMENT CONDITIONS 40 | SERVICE CODE | VALUE CODE | CONDITION CODE |
| | 00××h | 000064h | 06h |

USAGE CONDITIONS 40 OF PTB-2

FIG. 23

| CONTENT ID | ID OF CONTENT A |
|---|---|
| CONTENT PROVIDER ID | ID OF CONTENT PROVIDER 2-1 |
| UCP ID | ID OF ucpA |
| UCP VALIDITY PERIOD | VALIDITY PERIOD OF ucpA |
| SERVICE PROVIDER ID | ID OF SERVICE PROVIDER 3-1 |
| PT ID | ID OF ptA-1 |
| PT VALIDITY PERIOD | VALIDITY PERIOD OF ptA-1 |
| UCS ID | ID OF ucsA |
| SAM ID | ID OF SAM62 |
| USER ID | ID OF USER F |
| USAGE DETAILS: ID | ID OF USAGE DETAILS 11 |
| USAGE DETAILS: TYPE | PURCHASE AND REPRODUCE |
| USAGE DETAILS: PARAMETER | × × × |
| USAGE DETAILS: CONTROL TRANSFER STATUS | SOURCE: ID OF SAM62<br>DESTINATION: ID OF SAM62 |
| USAGE HISTORY | × × × | ucsA

FIG. 28

| | | |
|---|---|---|
| CONTENT ID | | ID OF CONTENT A |
| CONTENT PROVIDER ID | | ID OF CONTENT PROVIDER 2-1 |
| UCP ID | | ID OF ucpA |
| UCP VALIDITY PERIOD | | VALIDITY PERIOD OF ucpA |
| SERVICE PROVIDER ID | | ID OF SERVICE PROVIDER 3-1 |
| PT ID | | ID OF ptA-1 |
| PT VALIDITY PERIOD | | VALIDITY PERIOD OF ptA-1 |
| UCS ID | | ID OF ucsA |
| SAM ID | | ID OF SAM62 |
| USER ID | | ID OF USER F |
| USAGE DETAILS | ID | ID OF USAGE DETAILS 11 |
| | TYPE | PURCHASE AND REPRODUCE |
| | PARAMETER | × × × |
| | CONTROL TRANSFER STATUS | SOURCE: ID OF SAM62, DESTINATION: ID OF SAM62 |
| ACCOUNTING HISTORY | | × × × |

ACCOUNTING INFORMATION A

FIG. 30

| PUBLIC KEY Kpu OF SAM62 |
|---|
| SECRET KEY Ksu OF SAM62 |
| PUBLIC KEY Kpesc OF THE EMD SERVICE CENTER 1 |
| PUBLIC KEY Kpca OF THE CERTIFICATION AGENCY |
| SAVE KEY Ksave |
| THREE MONTHS' DELIVERY KEYS Kd |
| ⋮ |
| AUTHENTICATION CERTIFICATE OF SAM62 |
| REFERENCE INFORMATION 51 |
| ACCOUNTING INFORMATION |
| ⋮ |
| VERIFICATION VALUES Hp-1 | VERIFICATION VALUES Hp-2 | ·········· |
| ·········· VERIFICATION VALUES Hp-M |

FIG. 31

| | | |
|---|---|---|
| | SAM ID | ID OF SAM62 |
| | EQUIPMENT NUMBER | EQUIPMENT NUMBER (1000) OF RECEIVERS 51 |
| | SETTLEMENT ID | SETTLEMENT ID OF USER F |
| | CHARGE LIMIT | FORMAL REGISTRATION |
| ACCOUNT-SETTLING USER INFORMATION | NAME | NAME OF USER F |
| | ADDRESS | ADDRESS OF USER F |
| | PHONE NUMBER | PHONE NUMBER OF USER F |
| | SETTLEMENT INSTITUTION INFORMATION | SETTLEMENT INSTITUTION INFORMATION OF USER F |
| | DATE OF BIRTH | DATE OF BIRTH OF USER F |
| | AGE | AGE OF USER F (21 YEARS) |
| | SEX | SEX OF USER F |
| | USER ID | USER ID OF USER F |
| | PASSWORD | PASSWORD OF USER F |
| SUBORDINATE USER INFORMATION | NAME | |
| | ADDRESS | |
| | PHONE NUMBER | |
| | DATA OF BIRTH | |
| | SEX | |
| | USER ID | |
| | PASSWORD | |

⋮

| | |
|---|---|
| USE POINT INFORMATION | USE POINT INFORMATION OF RECEIVERS 51 |

REFERENCE INFORMATION 51

FIG. 32

| USER | PROVIDER | USE POINT |
|---|---|---|
| ACCOUNT-SETTLING USER | CONTENT PROVIDER2-1<br>CONTENT PROVIDER2-2<br>SERVICE PROVIDER3-1<br>SERVICE PROVIDER3-2 | 222POINTS<br>123POINTS<br>345POINTS<br>0POINT |

USE POINT INFORMATION OF REFERENCE 51

FIG. 33

LIST SECTION

| SAM ID | USER ID | PURCHA-SING | ACCOUN-TING | EQUIPMENT BILLED | MASTER EQUIPMENT | STATUS FLAG | SIGNATURE TO CONDITIONS | SIGNATURE TO REGISTRATION LIST |
|---|---|---|---|---|---|---|---|---|
| REGISTRATION CONDITIONS OF RECEIVER 51 — ID OF SAM62 | USER ID OF USER F | YES | YES | ID OF SAM62 | NONE | NO RESTRI-CTION | xxxx | xxxx |
| REGISTRATION CONDITIONS OF RECEIVER 201 — ID OF SAM212 | USER ID OF USER A | YES | YES | ID OF SAM212 | NONE | NO RESTRI-CTION | xxxx | |

SAM INFORMATION SECTION

| | |
|---|---|
| SAM ID | ID OF SAM62 |
| VALIDITY PERIOD | xxxx |
| VERSION NUMBER | xxxx |
| NUMBER OF EQUIPMENT CONNECTED | 2 |

FIG. 34

INFORMATION PROCESSING DEVICE AND METHOD, AND PROVIDING MEDIUM

TECHNICAL FIELD

The present invention relates to an information processing apparatus, information processing method, and providing medium. More particularly, it relates to an information processing apparatus, information processing method, and providing medium that utilize encrypted information.

BACKGROUND ART

There are systems that encrypt information (hereafter referred to as content) such as music and send it to the information processing apparatus of the users who have made a required agreement, so that the users can decrypt and use the content on their information processing apparatus.

If a user possesses two or more information processing apparatuses that make it possible to use contents, he/she can transfer a content that is provided, and use the content in the information processing apparatus to which the content is transferred.

However, in this case, there has been a problem that the information processing apparatus which is the transfer source does not retain the content so that the user can not use that content in information processing apparatus of transfer source.

SUMMARY OF THE INVENTION

The present invention has been made in view of the above circumstances. It makes it possible to have a content retained in an information processing apparatus of transfer source while having that content transferred in other information processing apparatuses.

To solve these problems, the present invention provides an information processing apparatus which is connected to other information processing apparatuses and which decrypts and uses encrypted value information, characterized by comprising: storage means for storing usage information including the key needed to decrypt the value information, usage conditions of the value information, and transfer status information which indicates whether the value information has been transferred; supply means for supplying the value information together with appropriate transfer information including the key contained in the usage information to the other information processing apparatuses when the usage conditions contained in the usage information stored by the storage means are right and the transfer status information contained in the usage information indicates that the value information is not transferred; first change means for changing the transfer status information to indicate that the value information has been transferred if the value information and the transfer information has been supplied to the other information processing apparatuses by the supply means; sending means for sending an appropriate control signal to the other information processing apparatuses if the transfer status information contained in the usage information stored by the storage means indicates that the value information has been transferred and the transfer of the value information to the other information processing apparatuses is cancelled; and second change means for changing the transfer status information to indicate that the value information is not transferred when a reply signal is received from the other information processing apparatuses in response to the control signal sent by the sending means.

Also, the present invention provides an information processing method for an information processing apparatus which is connected to other information processing apparatuses and which decrypts and uses encrypted value information, characterized by comprising: a storage step of storing usage information including the key needed to decrypt the value information, usage conditions of the value information, and transfer status information which indicates whether the value information has been transferred; a supply step of supplying the value information together with appropriate transfer information including the key contained in the usage information to the other information processing apparatuses when the usage conditions contained in the usage information stored by the storage step are predetermined conditions and the transfer status information contained in the usage information indicates that the value information is not transferred; a first change step of changing the transfer status information to indicate that the value information has been transferred if the value information and the transfer information has been supplied to the other information processing apparatuses by the supply step; a sending step of sending an appropriate control signal to the other information processing apparatuses if the transfer status information contained in the usage information stored by the storage step indicates that the value information has been transferred and the transfer of the value information to the other information processing apparatuses is cancelled; and a second change step of changing the transfer status information to indicate that the value information is not transferred when a reply signal is received from the other information processing apparatuses in response to the control signal sent by the sending step.

Furthermore, the present invention provides a providing medium that provides a computer-readable program for executing a process to an information processing apparatus which is connected to other information processing apparatuses and which decrypts and uses encrypted value information, characterized in that the process comprises: a storage step of storing usage information including the key needed to decrypt the value information, usage conditions of the value information, and transfer status information which indicates whether the value information has been transferred; a supply step of supplying the value information together with appropriate transfer information including the key contained in the usage information to the other information processing apparatuses when the usage conditions contained in the usage information stored by the storage step are predetermined conditions and the transfer status information contained in the usage information indicates that the value information is not transferred; a first change step of changing the transfer status information to indicate that the value information has been transferred if the value information and the transfer information has been supplied to the other information processing apparatuses by the supply step; a sending step of sending an appropriate control signal to the other information processing apparatuses if the transfer status information contained in the usage information stored by the storage step indicates that the value information has been transferred and the transfer of the value information to the other information processing apparatuses is cancelled; and a second change step of changing the transfer status information to indicate that the value information is not transferred when a reply signal is received from the other information processing apparatuses in response to the control signal sent by the sending step.

Furthermore, the present invention provides an information processing apparatus, an information processing method, and a providing medium that store usage information including the key needed to decrypt the value information, usage conditions of the value information, and transfer status information which indicates whether the value information has been transferred; supply the value information together with appropriate transfer information including the key contained in the usage information to the other information processing apparatuses when the usage conditions contained in the usage information stored by the storage step are predetermined conditions and the transfer status information contained in the usage information indicates that the value information is not transferred; change the transfer status information to indicate that the value information has been transferred if the value information and the transfer information has been supplied to the other information processing apparatuses; send an appropriate control signal to the other information processing apparatuses if the transfer status information contained in the stored usage information indicates that the value information has been transferred and the transfer of the value information to the other information processing apparatuses is cancelled; and change the transfer status information to indicate that the value information is not transferred when a reply signal is received from the other information processing apparatuses in response to the control.

Furthermore, the present invention provides an information processing apparatus which is connected to other information processing apparatuses and which decrypts and uses encrypted value information, characterized by comprising: reception means for receiving the value information supplied from the other information processing apparatuses and transfer information containing the key needed to decrypt the value information; storage means for storing the transfer information received by the reception means; deletion means for deleting the transfer information stored in the storage means when an appropriate control signal is received from the other information processing apparatuses; and sending means for sending an appropriate reply signal when the transfer information is deleted by the deletion means.

Furthermore, the present invention provides an information processing method for an information processing apparatus which is connected to other information processing apparatuses and which decrypts and uses encrypted value information, characterized by comprising: a reception step of receiving the value information supplied from the other information processing apparatuses and transfer information containing the key needed to decrypt the value information; a storage step of storing the transfer information received by the reception step; a deletion step of deleting the transfer information stored by the storage step when an appropriate control signal is received from the other information processing apparatuses; and a sending step of sending an appropriate reply signal when the transfer information is deleted by the deletion step.

Furthermore, the present invention provides a providing medium that provides a computer-readable program for executing a process to an information processing apparatus which is connected to other information processing apparatuses and which decrypts and uses encrypted value information, characterized in that the process comprises: a reception step of receiving the value information supplied from the other information processing apparatuses and transfer information containing the key needed to decrypt the value information; a storage step of storing the transfer information received by the reception step; a deletion step of deleting the transfer information stored by the storage step when an appropriate control signal is received from the other information processing apparatuses; and a sending step of sending an appropriate reply signal when the transfer information is deleted by the deletion step.

Furthermore, the present invention provides an information processing apparatus, an information processing method and a providing medium that receive the value information supplied from the other information processing apparatuses and transfer information containing the key needed to decrypt the value information; store the received transfer information; delete the stored transfer information when an appropriate control signal is received from the other information processing apparatuses; and send an appropriate reply signal when the transfer information is deleted.

BRIEF DESCRIPTION OF THE DRAWINGS

FIG. 8 is another chart illustrating the transmission of delivery keys Kd at the EMD service center 1.

FIG. 9 is a chart for explaining system registration information.

FIG. 12 is a chart showing UCP.

FIG. 15 is a chart showing an example of code values of service code and condition code.

FIG. 16 is a chart showing an example of code values set for usage conditions of UCP.

FIG. 20 is a chart showing example PTs.

FIG. 21 is a chart showing an example of code values set for "Price" for PTs.

FIG. 22 is a chart showing an example of other PTs.

FIG. 23 is a chart showing an example of code values set for "Price" for other PTs.

FIG. 28 is a chart showing an example of UCS.

FIG. 30 is a chart showing an example of accounting information.

FIG. 31 is a chart showing the information stored in the memory module 73 of the receiver 51.

FIG. 32 is a chart illustrating reference information 51.

FIG. 33 is a chart showing an example of use point information of reference information 51.

FIG. 34 is a chart showing an example registration list.

DETAILED DESCRIPTION OF THE PREFERRED EMBODIMENTS

Embodiments of the present invention will be described below.

(1) Information Distribution System

Figure 1:
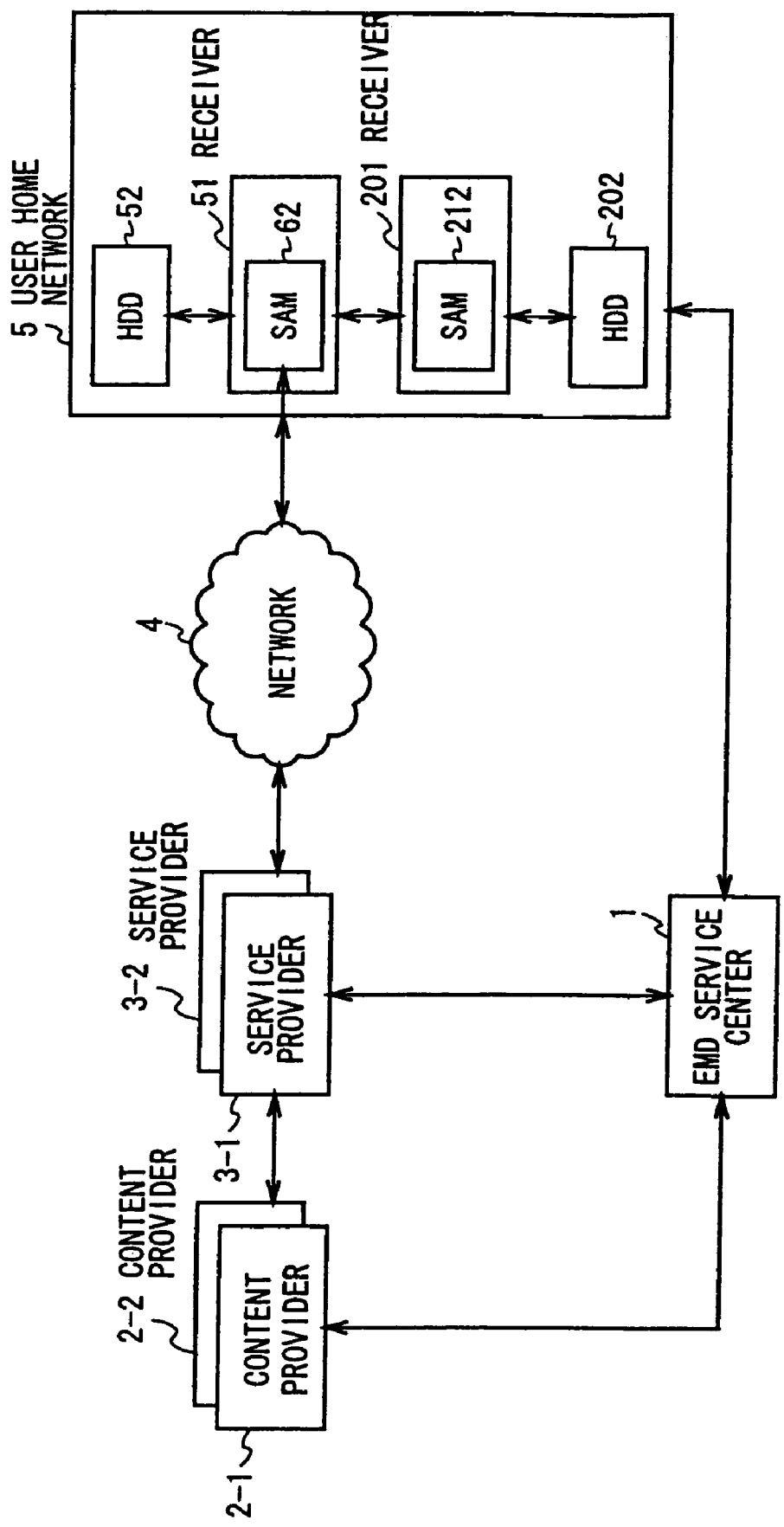
FIG. 1 is a system diagram illustrating a EMD system.

FIG. 1 illustrates an EMD (electronic music distribution) system by the application of the present invention. The EMD system consists of the EMD service center 1 that manages individual pieces of equipment, content provider 2 that provides content (In this example, two content providers 2-1 and 2-2 are provided (referred to as simply content provider 2 unless needed to distinguish them.) The same applies to other apparatuses.), service provider 3 that provides predetermined services corresponding to content (In this example, two service providers 3-1 and 3-2 are provided), and user network 5 composed of the equipment (receiver 51, receiver 201, and receiver 301 in this example) on which content is used.

The content in an EMD system is digital data whose information itself has a value. In this example, one piece of content corresponds to music data equivalent to one piece of music. The content is provided for the users by one piece of content as one unit (single), or a plurality of contents as one unit (album). The user purchases the content (in fact, purchases the right to use the content) to use it. Besides music data, however, content can be video data, game programs, computer programs, literary data, etc.

Figure 2:
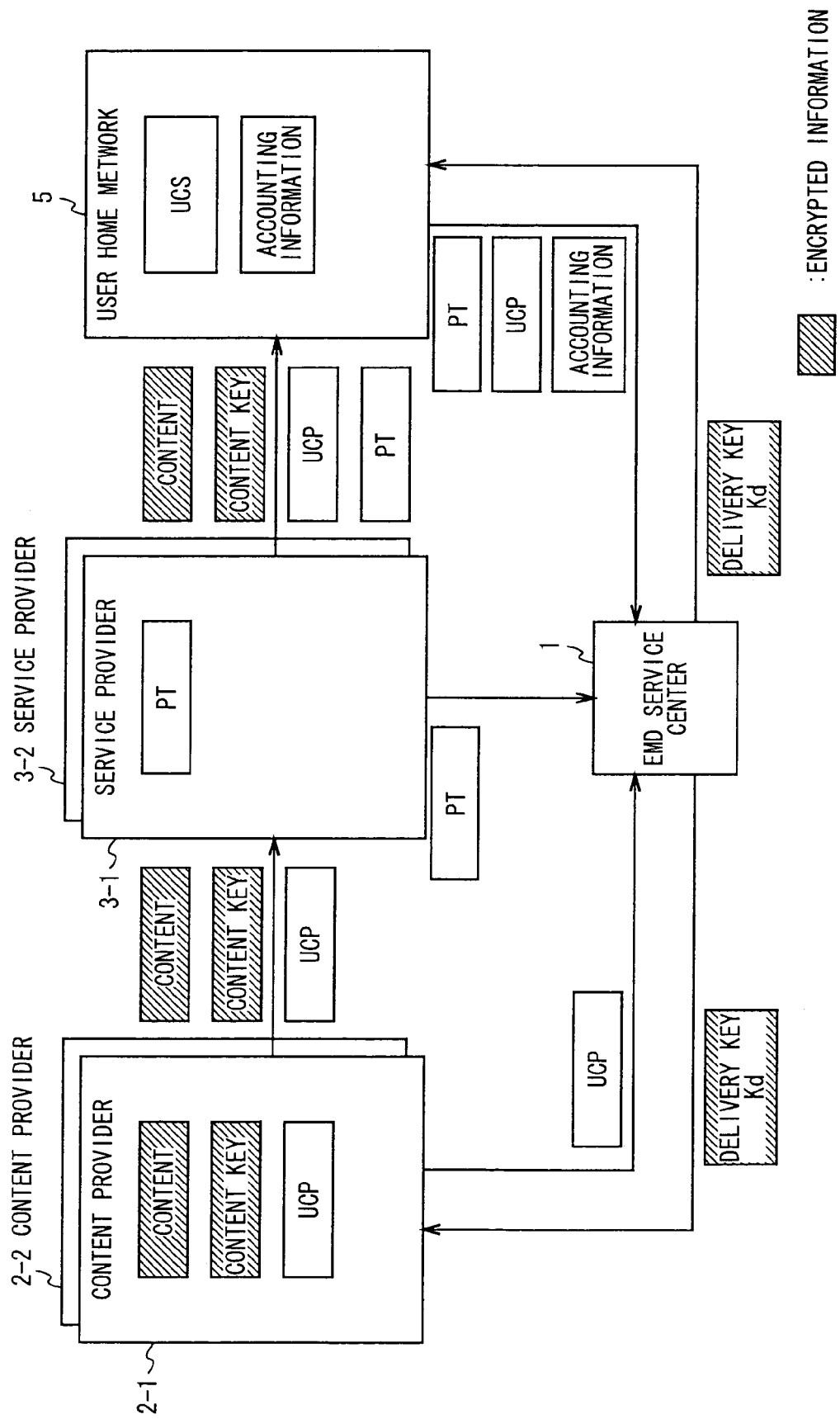
FIG. 2 is a system diagram illustrating the major information flow in the EMD system.

The EMD service center 1 sends the delivery keys Kd needed to use content to the user home network 5 and content provider 2, as shown in FIG. 2, which shows the major information flow in the EMD system.

Also, the EMD service center 1 receives accounting information and the like from the user home network 5 and adjust charges.

As shown in FIG. 2, the content providers 2-1 and 2-2 possess the content (encrypted with a content key Kco) to be provided, content key Kco (encrypted with a delivery key Kd) needed to decrypt the content, and usage control policy (abbreviated as UCP hereafter) that describes the usage details of content, and supply them in the form called a content provider secure container (described later) to the service provider 3.

The service provider 3-1 and 3-2 prepare one or more price tags (abbreviated as PT hereafter) according to the usage details contained in the UCP supplied by the content provider 2. The service provider 2 sends the prepared PT(s) together with the content (encrypted with a content key Kco), content key Kco (encrypted with a delivery key Kd), and UCP supplied by the content provider 2, in the form called a service provider secure container to the user home network 5 through a network 4 consisting of a private cable network, the Internet, or communications satellites.

The user home network 5 prepares usage control status (abbreviated as UCS hereafter) according to the supplied UCP and PT(s) as shown in FIG. 2 and performs the process of using the content based on the prepared UCS. Also, the user home network 5 prepares accounting information, timed with the preparation of UCS, and sends it together with corresponding UCP and PT(s) to the EMD service center 1, timed with, for example, the provision of the delivery keys Kd. In addition, the user home network 5 can be set not to send UCP and PT(s) to the EMD service center 1.

In this example, the user home network 5 is comprised of the receiver 51 which is connected to HDD 52 and has SAM (Secure Application Module) 62 and the receiver 201 which is connected to HDD 202 and has SAM 212. The receivers 51 and 201 are connected by such as IEEE 1394.

(2) EMD Service Center

Figure 3:
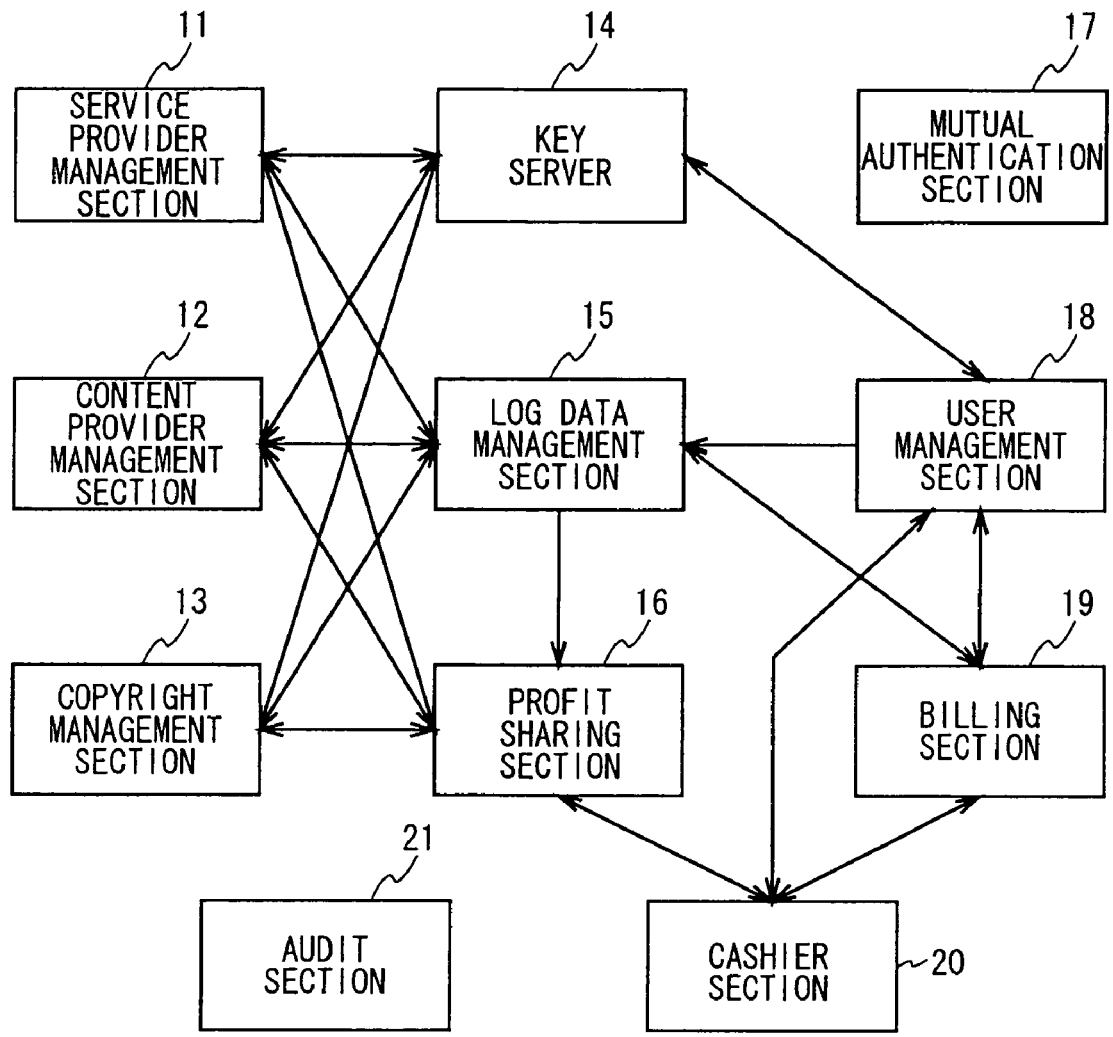
FIG. 3 is a block diagram showing the functional configuration of an EMD service center 1.

FIG. 3 is a block diagram showing the functional configuration of the EMD service center 1. The service provider management section 11 supplies profit-sharing information to the service provider 3. The content provider management section 12 sends delivery keys Kd and supplies profit-sharing information to the content provider 2.

The copyright management section 13 sends information about the usage of content by the user home network 5 to the appropriate copyright management body, for example, JAS-PAC (Japanese Society for Rights of Authors, Composers and Publishers).

The key server 14 stores delivery keys Kd and supplies it to the content provider 2 through the content provider management section 12 or to the user home network 5 through the user management section 18.

The delivery keys Kd supplied to the user home network 5 equipment (for example, the receiver 51 or the receiver 201) and content provider 2 from the EMD service center 1 will be described with reference to FIGS. 4 to 7.

Figure 4:
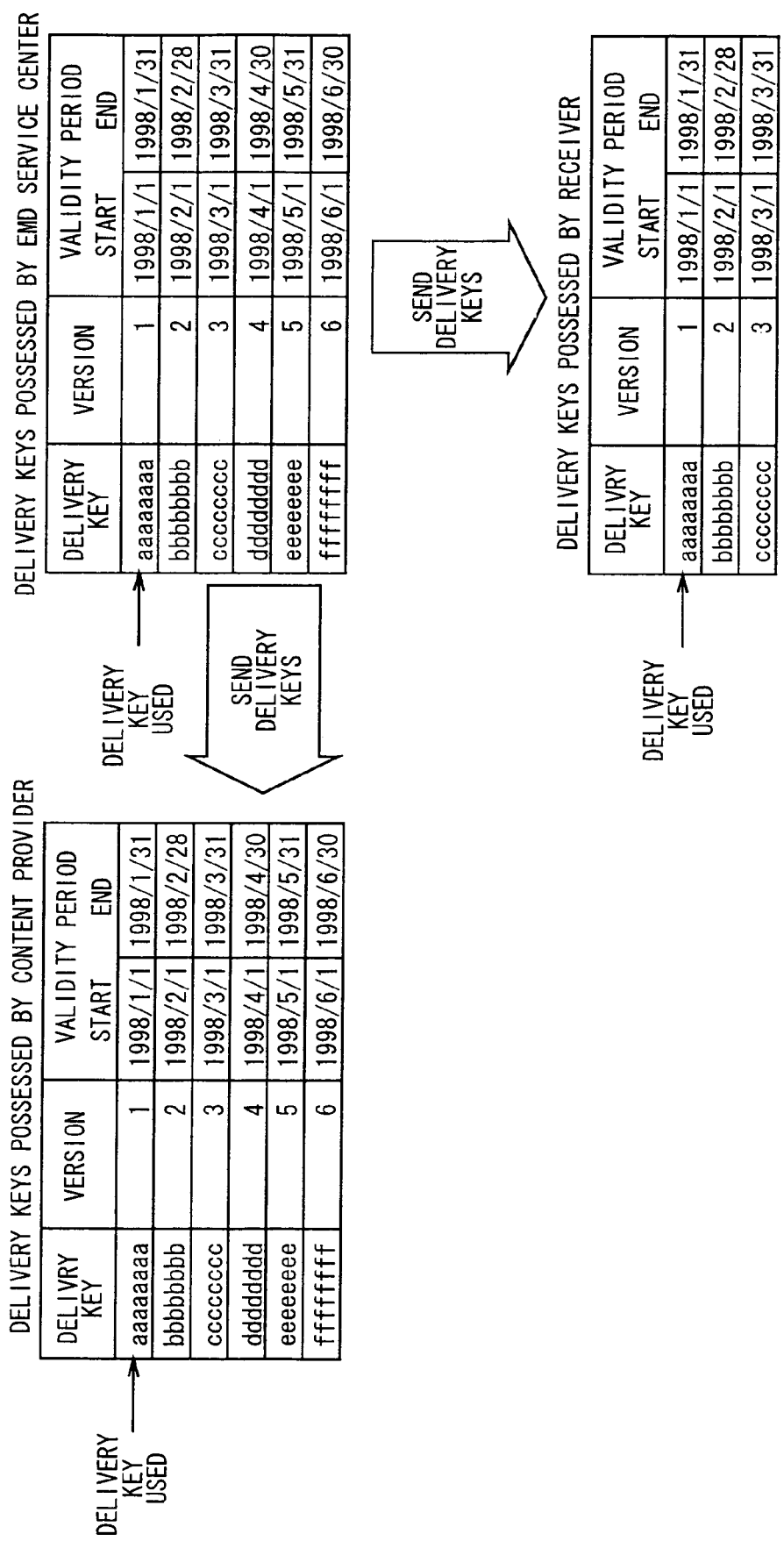
FIG. 4 is a schematic diagram illustrating the transmission of delivery keys Kd at the EMD service center 1.

FIG. 4 shows the delivery keys Kd possessed by the EMD service center 1, the delivery keys Kd possessed by the content provider 2, and the delivery keys Kd possessed by the receiver 51 in January 1998 when the content provider 2 starts to provide content and the receiver 51 composing the user home network 5 starts to use the content.

In the example of FIG. 4, a delivery key Kd is valid from the first day to the last day of a calendar month (both inclusive). For example, the delivery key Kd version 1 with a value of "aaaaaaaa" consisting of a fixed random number of bits is available from Jan. 1, 1998 to Jan. 31, 1998 both inclusive (i.e., the content key Kco that encrypt the content distributed to the user home network 5 via the service provider 3 from Jan. 1, 1998 to Jan. 31, 1998 is encrypted with the delivery key Kd version 1). The delivery key Kd version 2 with a value of "bbbbbbbb" consisting of a fixed random number of bits is available from Feb. 1, 1998 to Feb. 28, 1998 both inclusive (i.e., the content key Kco that encrypt the content distributed to the user home network 5 via the service provider 3 during the given period is encrypted by the delivery key Kd version 2). Similarly, the delivery key Kd version 3 is available during March 1998, the delivery key Kd version 4 is available during April 1998, the delivery key Kd version 5 is available during May 1998, and the delivery key Kd version 6 is available during June 1998.

Before the content provider 2 starts to provide content, the EMD service center 1 sends six delivery keys Kd—delivery keys Kd versions 1 to 6—available from January 1998 to June 1998 (both inclusive) to the content provider 2, which receives and stores the six delivery keys Kd. The reason why six months' delivery keys Kd are stored is that a certain period of time is required for the content provider 2 to make preparations such as encryption of the content and content keys before starting to provide the content.

Before the receiver 51 starts to use content, the EMD service center 1 sends three delivery keys Kd delivery keys Kd versions 1 to 3 available from January 1998 to March 1998 (both inclusive) to the receiver 51, which receives and stores the three delivery keys Kd. Three months' delivery keys Kd are stored in order to avoid the situation in which content would not be available even during the term of the contract due to trouble in that the receiver 5 cannot be connected to the EMD service center 1 or other trouble and to reduce the load on the user home network 5 by decreasing the number of connections to the EMD service center 1.

During the period from Jan. 1, 1998 to Jan. 31, 1998, the delivery key Kd version 1 is used by the EMD service center 1, the content provider 2, and the receiver 51 that composes the user home network 5.

Figure 5:
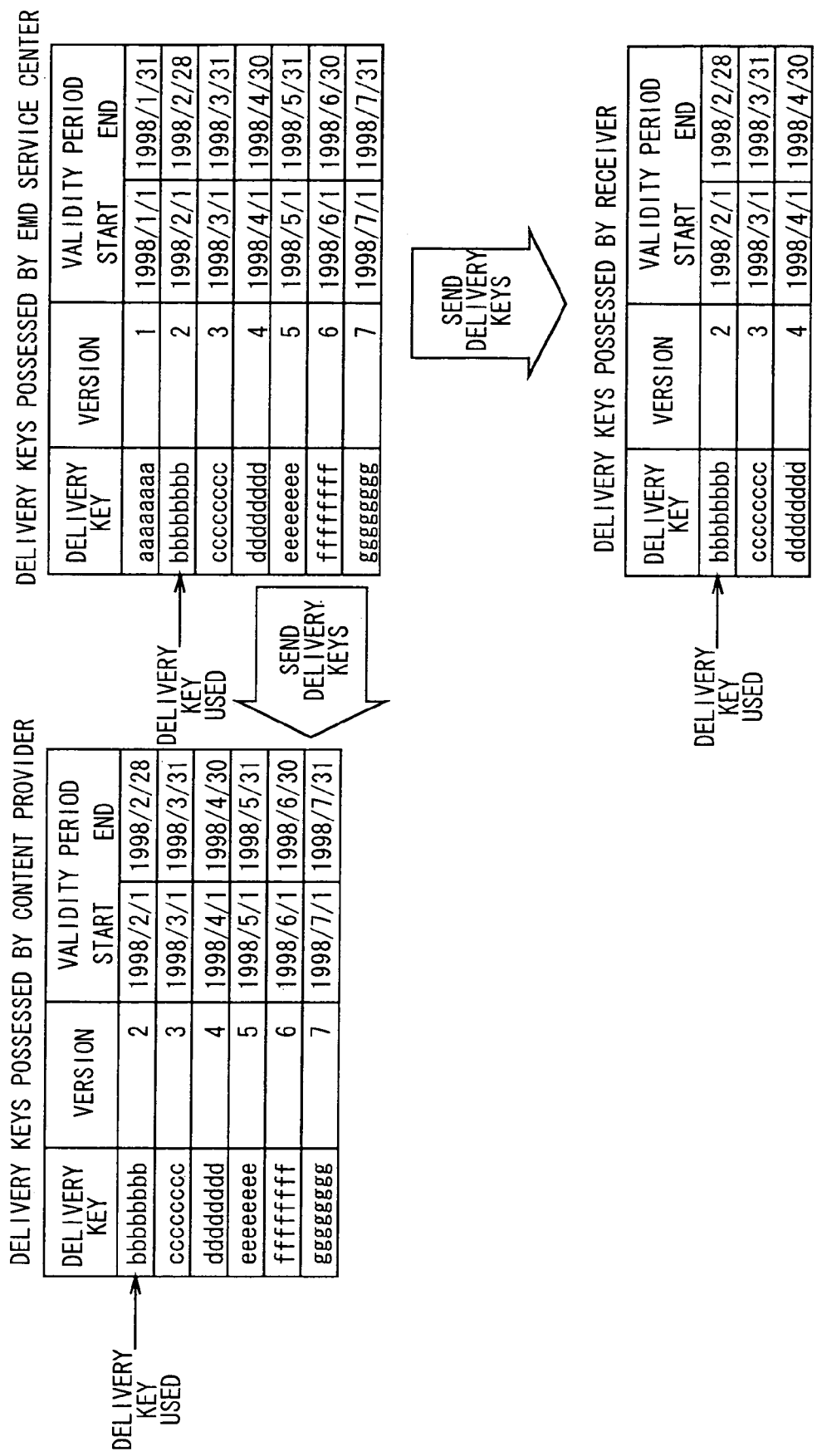
FIG. 5 is another schematic diagram illustrating the transmission of delivery keys Kd at the EMD service center 1.

Now the transmission of delivery keys Kd from the EMD service center 1 to the content provider 2 and receiver 51 on Feb. 1, 1998 will be described with reference to FIG. 5. The EMD service center 1 sends six delivery keys Kd—delivery keys Kd versions 2 to 7—available from February 1998 to July 1998 (both inclusive) to the content provider 2, which receives the six delivery keys Kd and store them overwriting the existing ones. The EMD service center 1 sends three delivery keys Kd—delivery keys Kd versions 2 to 4—available from February 1998 to April 1998 (both inclusive) to the receiver 51, which receives the three delivery keys Kd and store them overwriting the existing ones. The EMD service center 1 stores the delivery key Kd version 1 as it is. This is done to make past delivery keys Kd available for use in case of unexpected trouble or in case an illegal act is committed or detected.

During the period from Feb. 1, 1998 to Feb. 28, 1998, the delivery key Kd version 2 is used by the EMD service center 1, the content provider 2, and the receiver 51 that composes the user home network 5.

Figure 6:
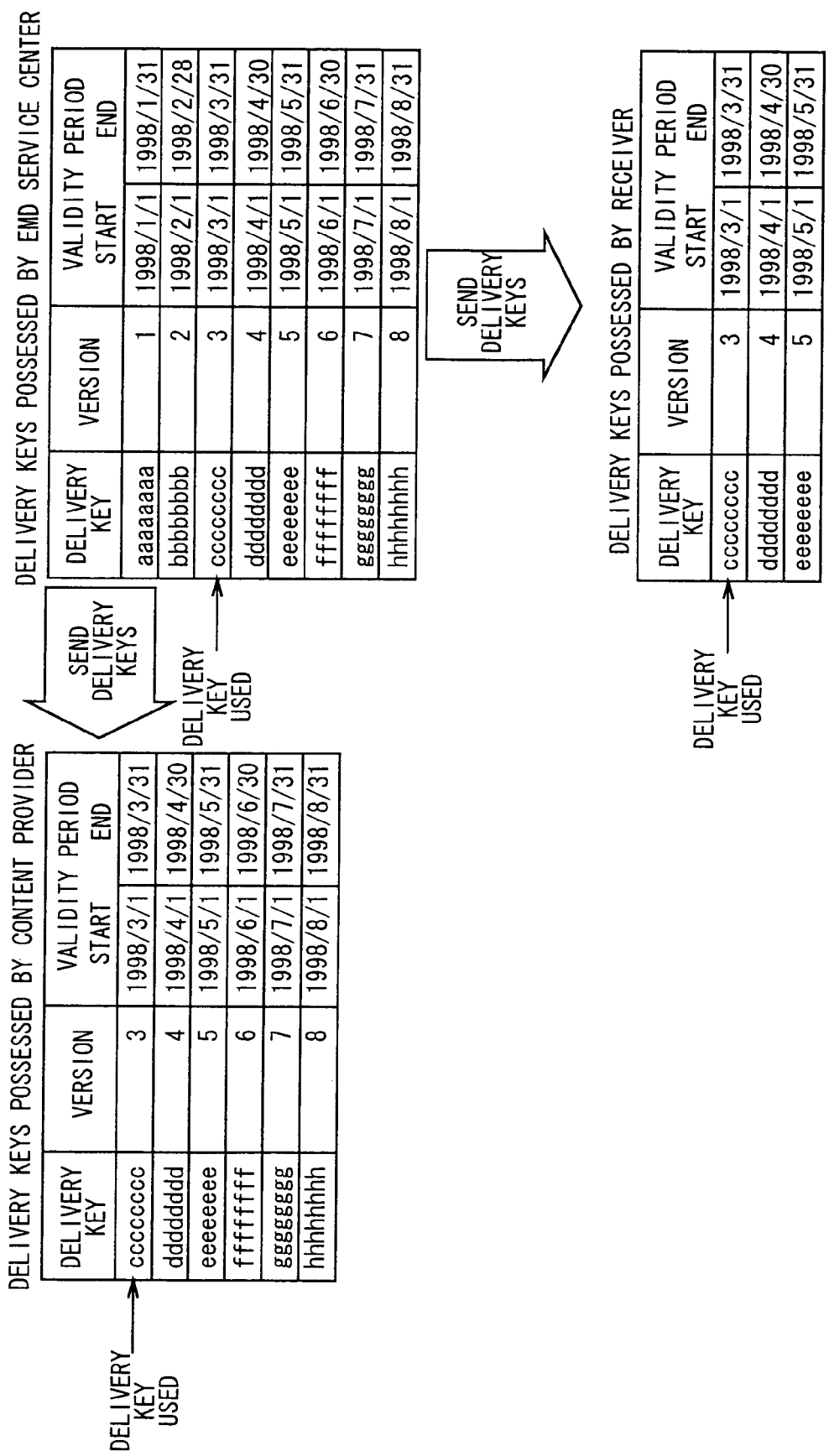
FIG. 6 is another schematic diagram illustrating the transmission of delivery keys Kd at the EMD service center 1.

Now the transmission of delivery keys Kd from the EMD service center 1 to the content provider 2 and receiver 51 on Mar. 1, 1998 will be described with reference to FIG. 6. The EMD service center 1 sends six delivery keys Kd—delivery keys Kd versions 3 to 8—available from March 1998 to August 1998 (both inclusive) to the content provider 2, which receives the six delivery keys Kd and store them overwriting the existing ones. The EMD service center 1 sends three delivery keys Kd—delivery keys Kd version 3 to 5—available from March 1998 to May 1998 (both inclusive) to the receiver 51, which receives the three delivery keys Kd and store them overwriting the existing ones. The EMD service center 1 stores the delivery keys Kd versions 1 and 2 as they are.

During the period from Mar. 1, 1998 to Mar. 31, 1998, the delivery key Kd version 3 is used by the EMD service center 1, the content provider 2, and the receiver 51 that composes the user home network 5.

Figure 7:
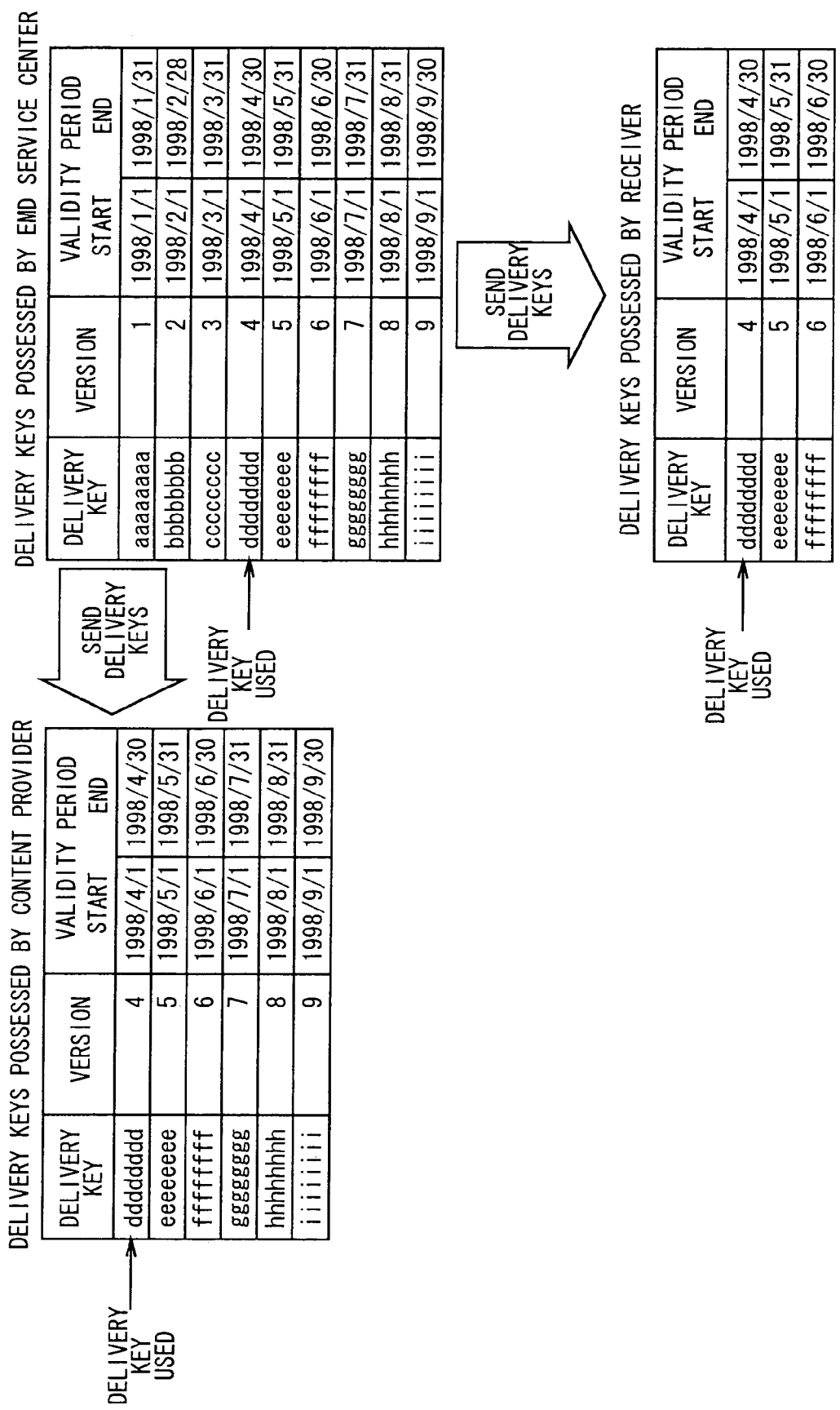
FIG. 7 is another schematic diagram illustrating the transmission of delivery keys Kd at the EMD service center 1.

Now the transmission of delivery keys Kd from the EMD service center 1 to the content provider 2 and receiver 51 on Apr. 1, 1998 will be described with reference to FIG. 7. The EMD service center 1 sends six delivery keys Kd—delivery keys Kd versions 4 to 9—available from April 1998 to September 1998 (both inclusive) to the content provider 2, which receives the six delivery keys Kd and store them overwriting the existing ones. The EMD service center 1 sends three delivery keys Kd—delivery keys Kd version 3 to 5—available from April 1998 to June 1998 (both inclusive) to the receiver 51, which receives the three delivery keys Kd and store them overwriting the existing ones. The EMD service center 1 stores the delivery keys Kd versions 1, 2, and 3 as they are.

During the period from Apr. 1, 1998 to Apr. 30, 1998, the delivery key Kd version 4 is used by the EMD service center 1, the content provider 2, and the receiver 51 that composes the user home network 5.

In this way, if delivery keys Kd are distributed several months in advance, users can purchase content even if they do not access the EMD service center 1 at all for a month or two, and later they can access the EMD service center 1 and receive keys at a convenient time.

As above, three months' delivery keys Kd are distributed to the equipment formally registered in the EMD system and the content provider 2 in the user home network 5. However, to user home network equipment which is not formally registered in the EMD system and temporarily registered (described in detail later), as shown in FIG. 8, one month's delivery keys Kd instead of three months' delivery keys Kd are distributed. In this example, in order to register the user home network 5 equipment in the EMD system, registration procedure such as user-crediting process is required which takes approximately one month. Therefore, in order to make the content available during the period (one month) from applying registration to formal registration, delivery keys Kd which allows one-month use are distributed to the equipment which is not formally registered.

Returning to FIG. 3, the log data management section 15 stores, the accounting information output by the user management section 18, PTs corresponding to the content, and UCP corresponding to the content.

The profit-sharing section 16 calculates, the respective profits of the EMD service center 1, content providers 2-1 and 2-2, and service providers 3-1 and 3-2 according to the information provided by the log data management section 15 and outputs the results to the service provider management section 11, content provider management section 12, cashier section 20, and copyright management section 13. The profit-sharing section 16 calculates use points for the content providers 2-1, 2-2 and service providers 3-1 and 3-2 respectively (the larger the profits are, or the more the user uses, the lager the points become) according to the calculated profits and outputs the use points to the user management section 18. From now on, the use point in the content provider 2 is called content use point and the use point in the service provider 3 is called service use point.

The mutual authentication section 17 performs mutual authentication with the content provider 2, service provider 3, and user home network 5 equipment.

The user management section 18 manages the information (hereafter referred to as system registration information) about the equipment in the user home network 5. The system registration information contains information corresponding to the items "SAM ID," "Equipment Number," "Settlement ID," "Account-Settling User Information," multiple "Subordinate User Information," and "Use Point Information," as shown in FIG. 9.

"SAM ID" contains the SAM (described later) ID of the manufactured equipment composing the user home network 5. The "SAM ID" row of the system registration information in FIG. 9 contains the SAM 62 ID of the receiver 51, SAM 212 ID of the receiver 201.

"Equipment Number" is the number assigned to the user home network 5 equipment that possesses SAM. If a piece of equipment in the user home network 5 has the capability (communications block) to communicate directly with the service provider 3 and EMD service center 1 through a network 4 and has, for example, the capability to output (present) the contents of UCP and PT to the user or the capability (a display unit and operator panel) to allow the user to select the usage details in UCP, an equipment number of 100 or higher is given to that piece of equipment (hereafter, referred to as master equipment). The pieces of equipment without such capabilities (hereafter, referred to as slave equipment) are assigned an equipment number of 99 or lower. In this example, the receivers 51 and 201 have the above-mentioned capabilities and are assigned an equipment number of 100 or higher (100). Therefore, equipment number 100 is assigned to each "Equipment Number" corresponding to SAM 62 ID of receiver 51 and SAM 212 ID of receiver 201 in the system registration information of FIG. 9.

"Settlement ID" stores the predetermined settlement ID assigned when formally registered in EMD system. In this example, since the receivers 51 and 201 have been formally registered and assigned the settlement ID, that assigned settlement ID is stored in each "Settlement ID" corresponding to SAM 62 ID and SAM 212 ID in the system registration information of FIG. 9.

"Account-Settling User Information" contains, the name, address, phone number, settlement institution information (e.g., the credit card number), date of birth, age, sex, ID, password, etc. of the user who is to settle the account (hereafter, such a user is referred to as account-settling user).

The name, address, phone number, settlement institution information, date of birth and sex of the account-settling user are provided by the user when an application for registration is filed by the user (hereafter the items contained in "Account-Settling User Information" is referred to as user's general information if there is no need to handle them individually). Of these items, the name, address, phone number, and settlement institution information must be accurate (e.g., the information registered in the settlement institution) in this example because they are used for the user-crediting process. On the other hand, the date of birth, age, and sex in the user's general information are not used for the user-crediting process and need not be accurate in this example. Besides, the user is not necessarily required to provide them. The account-settling user's ID and password contained in "Account-Settling User Information" is assigned and set when the user is registered in the EMD system.

"Account-Settling User Information" for the SAM 62 ID of the receiver 51 in the system registration information of FIG. 9 contains the user's general information provided by user F, who is an account-settling user of the receiver 51, as well as the ID and password of user F. "Account-Settling User Information" for the SAM 212 ID of the receiver 201 contains the user's general information provided by user F as well as the ID and password of user A, who is an account-settling user of the receiver 201.

"Subordinate User Information" contains the name, address, phone number, date of birth, age, sex, ID, password, etc. of the user who does not settle his/her account for himself/herself (hereafter such users are referred to as subordinate users). In other words, it contains the information contained in "Account-Settling User Information" except the settlement institution information. The subordinate user's name, address, phone number, date of birth, age, and sex contained in "Subordinate User Information" need not be accurate because subordinate users are not subject to a crediting process. For example a nickname may be used for the name. Although the name is used to identify the user, the other information is not necessarily required. The subordinate user's ID and password contained in "Subordinate User Information" is assigned and set when the subordinate user is registered in the EMD system.

In this example, since no subordinate user is registered for both receivers 51 and 201, "Subordinate User Information" for the SAM 62 ID and SAM 212 ID in the system registration information in FIG. 9 does not contain any information.

Figures 10, 11:
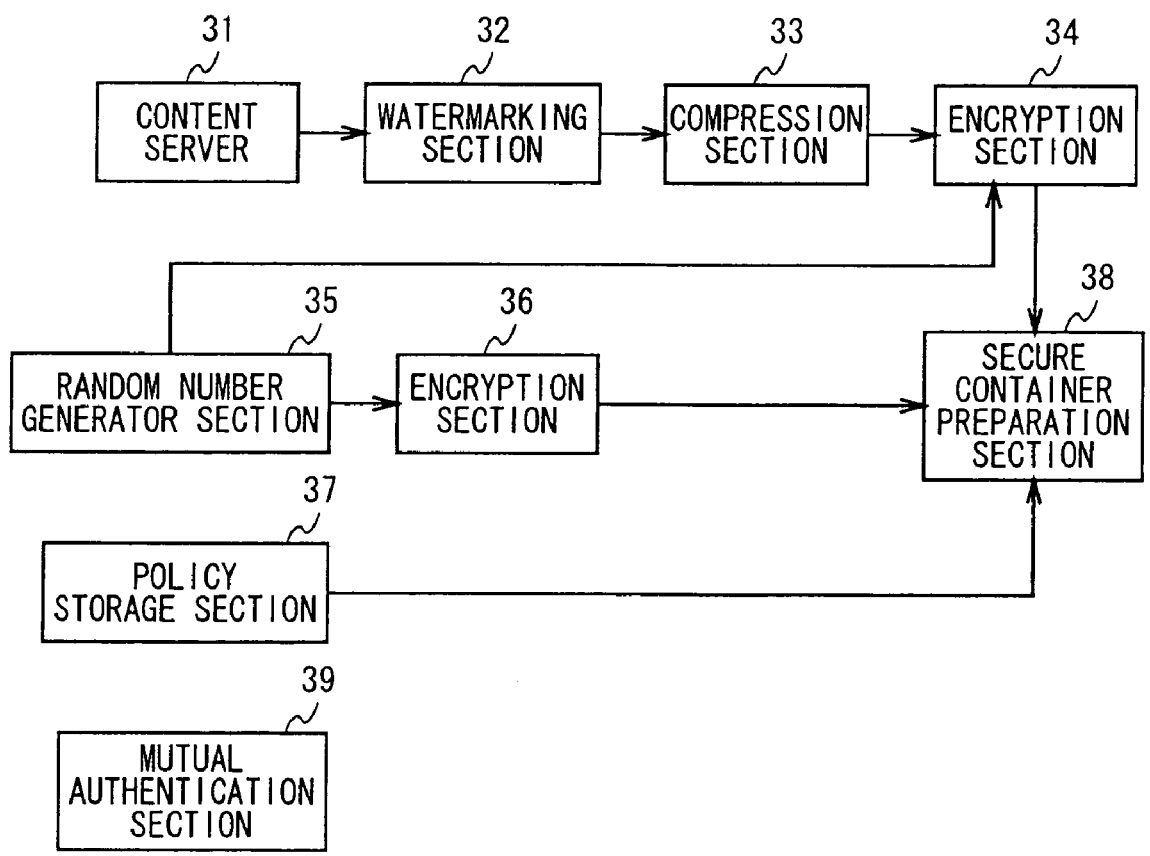
FIG. 10 is a chart for explaining use point information.
FIG. 11 is a block diagram showing an example functional configuration of a content provider 2.

"Use Point Information" is the use point information output by the profit-sharing section 16. In this example, "Use Point Information" for the SAM 62 ID and SAM 212 ID contains the use point information respectively. FIG. 10 shows an example of use point information of the receiver 51. In the example of FIG. 10, content use point of the content provider 2-1 is 222 points, content use point of the content provider 2-2 is 123 points, service use point of the service provider 3-1 is 345 points, and service use point of the service provider 3-2 is 0 point, that are assigned to user F (account-settling user) of the receiver 51.

In this example, the sum points 345 (=123+222) of the use points of each content provider 2-1 and content provider 2-2 and the sum points 345 (=345+0) of the service use points of each service provider 3-1 and content provider 3-2 are made to be equal.

As to the receiver 201, since content is not used at this point, "Use Point Information" for SAM 212 ID does not contain any information.

In addition to managing this system registration information, the user management section 18 prepares registration lists for predetermined processes and sends them together with the delivery keys Kd to the user home network 5.

Returning again to FIG. 3, the billing section 19 calculates the amount charged to the user based on, for example, the accounting information, UCP, and PTs supplied by the log data management section 15, and supplies the results to the cashier section 20, which then settles accounts in communication with external banks or the like (not shown), based on the amounts of usage fees to be paid or charged to the user, content provider 2, and service provider 3. Also, the cashier section 20 informs the user management section 18 about the results of the settlement.

The audit section 21 checks the validity of the accounting information supplied from the equipment in the user home network 5 as well as the validity of PTs and UCP (i.e., checks for any illegal act)

In this example, the audit section 21 receives UCP from the content provider 2, PTs from the service provider 3, and corresponding UCP and PTs from the user home network 5.

(3) Content Provider

FIG. 11 is a block diagram showing a functional configuration of the content provider 2-1. The content server 31 stores the content to be supplied to the user and supplies it the watermarking section 32, which then watermarks the content supplied by the content server 31 and supplies it to the compression section 33.

The compression section 33 compresses the content supplied by the watermarking section 32, by ATRAC2 (Adaptive Transform Acoustic Coding 2) (a trademark) or another method, and supplies it to the encryption section 34. The encryption section 34 encrypts the content compressed by the compression section 33, by common-key cryptography such as DES (Data Encryption Standard) by using the random number supplied by the random number generator section 35 as a key (hereafter this random number is referred to as a content key Kco), and outputs the results to the secure container preparation section 38.

The random number generator section 35 supplies the random number consisting of a fixed number of bits for use as the content key Kco to the encryption sections 34 and 36. The encryption section 36 encrypts the content key Kco by common-key cryptography such as DES by using the delivery key Kd supplied by the EMD service center 1, and outputs the results to the secure container preparation section 38.

DES is an encryption method that encrypts 64-bit blocks of plain text by using a 56-bit common key. The DES process consists of the part (data mixing section) that converts plain text to cipher text by mixing it with the key and the part (key processing section) that generates the key (expansion key) for use by the data mixing section from the common key. All the DES algorithms are open to the public. Therefore, only the basic processing in the data mixing section will be described here briefly.

First, 64 bits of plain text is divided into high-order 32 bits $H_0$ and low-order 32 bits $L_0$. Using, as input, the 48-bit expansion key $K_1$ supplied from the key processing section and the low-order 32 bits $L_0$, the output from an F function is calculated by mixing the low-order 32 bits $L_0$. The F function consists of two basic conversions: "substitution" for substituting numeric values in a prescribed manner and "transposition" for transposing bit positions in a prescribed manner. Then the high-order 32 bits $H_0$ is XORed with the output from the F function and denoted as $L_1$. $L_0$ is denoted as $H_1$.

After 16 iterations of the above process based on the high-order 32 bits $H_0$ and low-order 32 bits $L_0$, the resulting high-order 32 bits $H_{16}$ and low-order 32 bits $L_{16}$ are output as cipher text. For decryption, the above procedures are reversed using the common key used for the encryption.

The policy storage section 37 stores the UCP set for content and outputs it to the secure container preparation section 38. FIG. 12 shows UCP A which has been set for content A kept in the content server 31 and which is stored in the policy storage section 37. A UCP contains predefined information regarding "Content ID," "Content Provider ID,""UCP ID," "UCP Validity Period," "Usage Conditions," and "Usage Details." "Content ID" contains the ID of the content to which the given UCP is applied. Each "Content ID" of UCP A (FIG. 12A) and UCP B (FIG. 12B) contains the ID of content A.

"Content Provider ID" contains the ID of the content provider that provides the content. Each "Content Provider ID" of UCP A and UCP B contains the ID of the content provider 2-1. "UCP ID" contains the ID assigned to the given UCP: "UCP ID" of UCP A contains the ID of UCP A and "UCP ID" of UCP B contains the ID of UCP B. "UCP Validity Period" contains information about the validity period of the UCP: "UCP Validity Period" of UCP A contains the validity period of UCP A.

"Usage Conditions" contains predefined information regarding "User Conditions" and "Equipment Conditions." "User Conditions" contains the conditions for the user who can select the given UCP. "Equipment Conditions" contains the conditions for the equipment that can select the given UCP.

In the case of UCP A, "Usage Conditions 10 " is specified. "User Conditions 10" of "Usage Conditions 10" contains information ('200 Points or Higher') indicating that conditions are that the use points are 200 points or higher. "Equipment Conditions 10" of "Usage Conditions 10" contains information ('No Condition') indicating that there is no condition. Thus, UCP A can be selected only by the users who have 200 or higher content use points of the content provider 2-1.

In the case of UCP B, "Usage Conditions 20" is specified. "User Conditions 20" of "Usage Conditions 20" contains information ('200 Points or Lower') indicating that conditions are that the use points are 200 points or lower. "Equipment Conditions 20" of "Usage Conditions 20" contains 'No Condition'. Thus, UCP B can be selected only by the users who have 200 or lower content use points of the content provider 2-1.

"Usage Details" contains predefined information regarding "D,""Type," "Parameter," and "Control Transfer Permission Information.""ID" contains the ID assigned to the information contained in "Usage Details." "Type" contains information that indicates the use type of the content such as reproduction or duplication. "Parameter" contains the predefined information corresponding to the use type contained in "Type."

Figure 13:
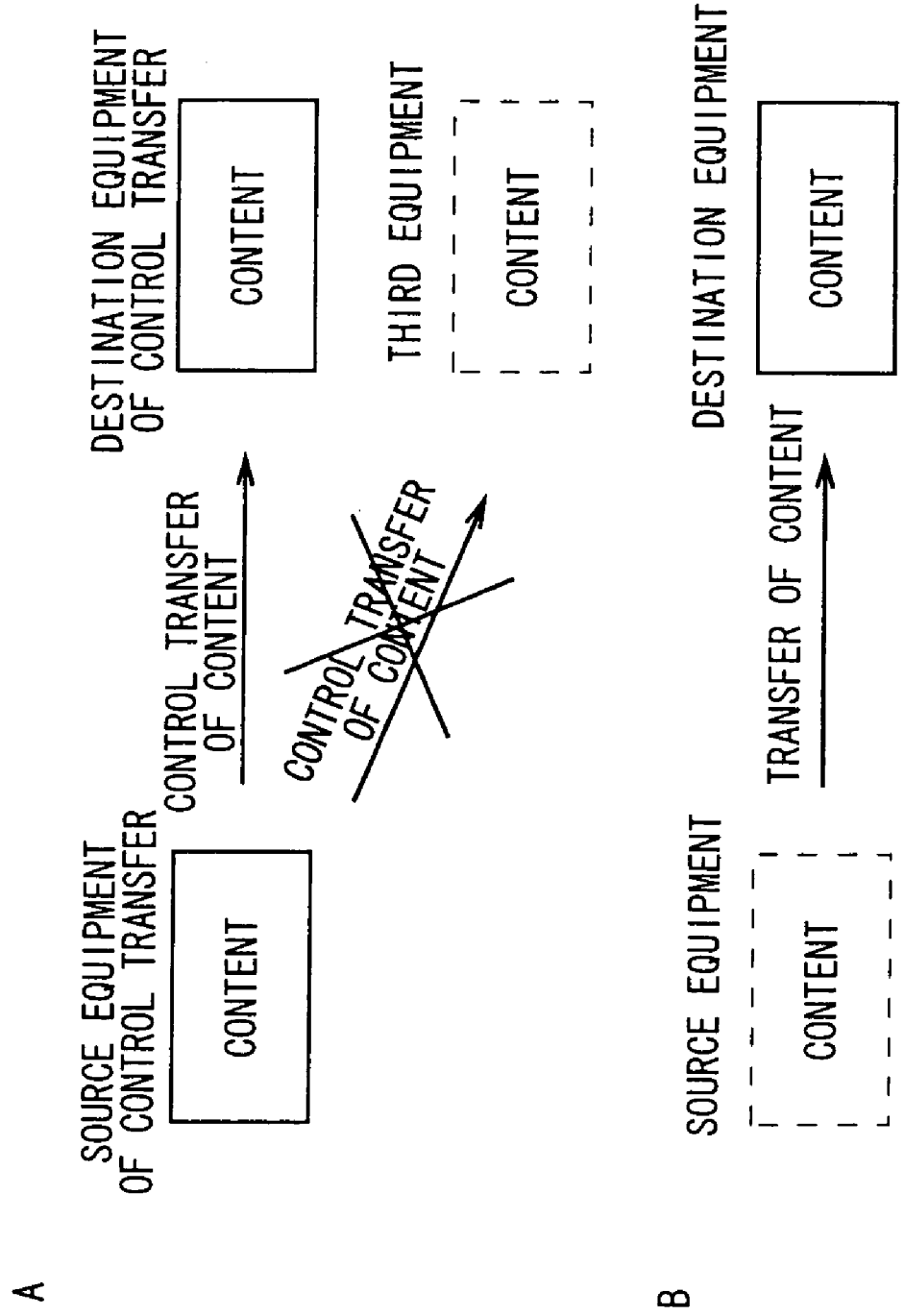
FIG. 13 is a schematic diagram illustrating control transfer of content.

"Control Transfer Permission Information" contains information which indicates whether control transfer of the content is possible (permitted or not). In the case of a content control transfer, the content is copied to the destination equipment while being kept on the source equipment, as shown in FIG. 13A. In other words, the content is used both on the source and destination equipment. In this respect, control transfer differs from normal content transfer in which content is removed from the source equipment and moved to the destination equipment, only where the content is stored and used, as shown in FIG. 13B.

Figure 14:
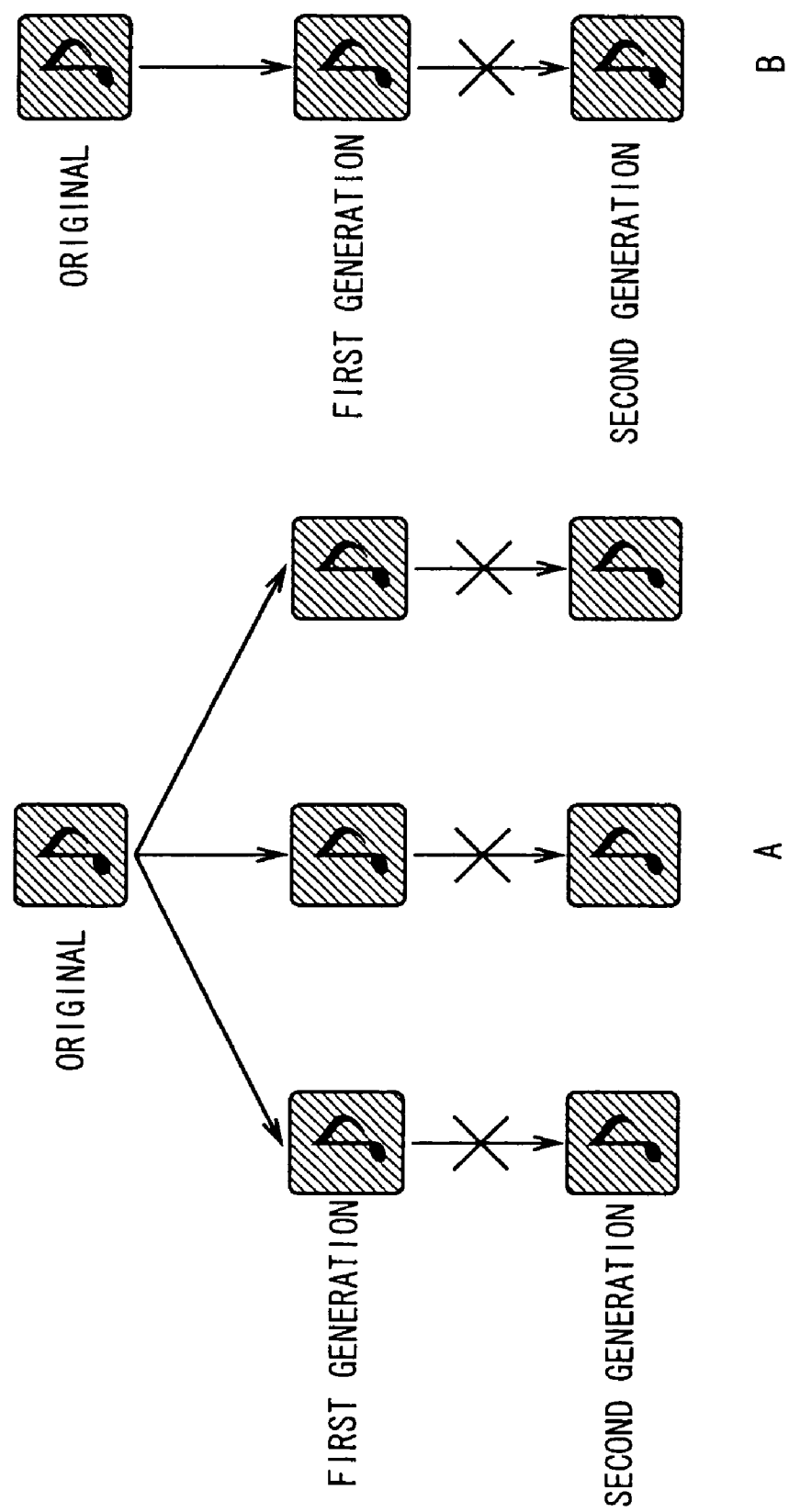
FIG. 14 is a schematic diagram illustrating first-generation duplication.

During a control transfer of content, the source equipment cannot transfer the control of the content to any third equipment (not permitted), as shown in FIG. 13A. Thus, the content is kept only on the two pieces of equipment: the source equipment and destination equipment. In this respect, content control transfer differs from the first-generation duplication which can produce multiple duplicates M(first-generation) from the original content, as shown in FIG. 14A. Also, content control transfer differs from the one-time duplication shown in FIG. 14B in that content control can be transferred to third equipment if the content is returned from the source equipment.

Returning to FIG. 12A, UCP A has four "Usage Details" fields: "Usage Details 11" to "Usage Details 14." "ID 11" of "Usage Details 11" contains the ID assigned to "Usage Details 11." "Type 11" contains the information indicating the use type of 'Purchase and Reproduce' meaning that the content will be purchased and reproduced. "Parameter 11" contains the predefined information corresponding to 'Purchase and Reproduce.' "Control Transfer Permission Information 11" contains the information indicating that the control transfer of the content is permitted ('Permitted').

"ID 12" of "Usage Details 12" contains the ID assigned to "Usage Details 12." "Type 12" contains the information indicating the use type of 'First-Generation Duplicate' meaning that first-generation duplicates will be produced. By purchasing the rights for the use type 'First-Generation Duplicate,' the user can produce multiple first-generation duplicates from the original content as shown in FIG. 14A. However, it is not possible to produce second-generation duplicates from first-generation duplicates (not permitted). "Parameter 12" contains the predefined information corresponding to 'First-Generation Duplicate.' "Control Transfer Permission Information 12" contains the information indicating that the control transfer of the content is not permitted ('Not Permitted').

"ID 13" of "Usage Details 13" contains the ID assigned to "Usage Details 13." "Type 13" contains information 'Limited-Time Reproduction' indicating the use type to reproduce for a specified period (time). "Parameter 13" contains the start time and end time corresponding to 'Limited-Time Reproduction.' "Control Transfer Permission Information 13" is set to 'Not Permitted.'

"ID 14" of "Usage Details 14" contains the ID assigned to "Usage Details 14." "Type 14" contains information 'PayPerCopy5' indicating the use type (coupon for duplicates available for five times, so to speak) to duplicate five times. In this case, it is not possible to produce duplicates from duplicates (not permitted), as shown in FIG. 14B. "Parameter 14" contains information indicating that it is possible to duplicate five times "Duplicate Five Times". "Control Transfer Permission Information 14" is set to 'Not Permitted.'

UCP B in FIG. 12B contains "Usage Details 21" and "Usage Details 22". "ID 21" of "Usage Details 21" contains the predetermined ID assigned to "Usage Details 21." "Type 21" contains information 'Pay Per Copy 4' indicating the use type to reproduce five times. "Parameter 21" contains information indicating that it is possible to reproduce four times "Reproduce Four Times". "Control Transfer Permission Information 21" is set to 'Not Permitted.'

"ID 22" of "Usage Details 22" contains the ID assigned to "Usage Details 22." "Type 22" contains 'Pay Per Copy 2', and "Parameter 22" contains "Duplicate Two Times". "Control Transfer Permission Information 22" is set to 'Not Permitted.'

Here, comparing the details of UCP A and UCP B, while the user having a use point of 200 points or more can select from four "Usage Details" fields: "Usage Details 11" to "Usage Details 14," the user having a use point of 200 points or lower can only select from two "Usage Details" fields: "Usage Details 21" to "Usage Details 22."

Incidentally, FIG. 12 shows UCP A, UCP B to show an example. Actually, in addition to service codes shown in FIG. 15A and condition codes shown in FIG. 15B, "Usage Conditions 10" of UCP A and "Usage Conditions 20" of UCP B respectively contain value codes indicating values or predefined type according to the service codes.

FIG. 16A shows code values of each code set as "User Conditions 10" and "Equipment Conditions 10" of "Usage Conditions 10" in UCP A (FIG. 12A). Since "User Conditions 10 " of "Usage Conditions 10" indicates 200 points or higher, a service code 80xxh (FIG. 15A) meaning "with conditions for use point", a value code 0000C8h (FIG. 15A) meaning "with conditions for use point", a value code 0000C78h indicating the value 200 at this time and condition code 06h (FIG. 15B) meaning ">=equal to or larger" are set as "User Conditions".

Since "Equipment Conditions 10 " in UCP A indicates "No Condition", a service code 0000h (FIG. 15A) meaning "No condition", a value code FFFFFFh having no meaning and a condition code 00h (FIG. 15B) meaning "No Condition" are set as "Equipment Condition".

FIG. 16B shows code values of each code set as "User Conditions 20 " and "Equipment Conditions 20" indicates 200 points or lower, a service code 80xxh (FIG. 15A) meaning "with conditions for use point", a value code 0000C8h indicating the value 200 and condition code 03h (FIG. 15B) meaning ">" are set as "User Conditions"

"Equipment Conditions 20" in UCP B indicates "No condition" similarly to "Equipment Conditions 10 " in UCP A, and the both have the same code values, an explanation for it will be omitted.

Figure 17:
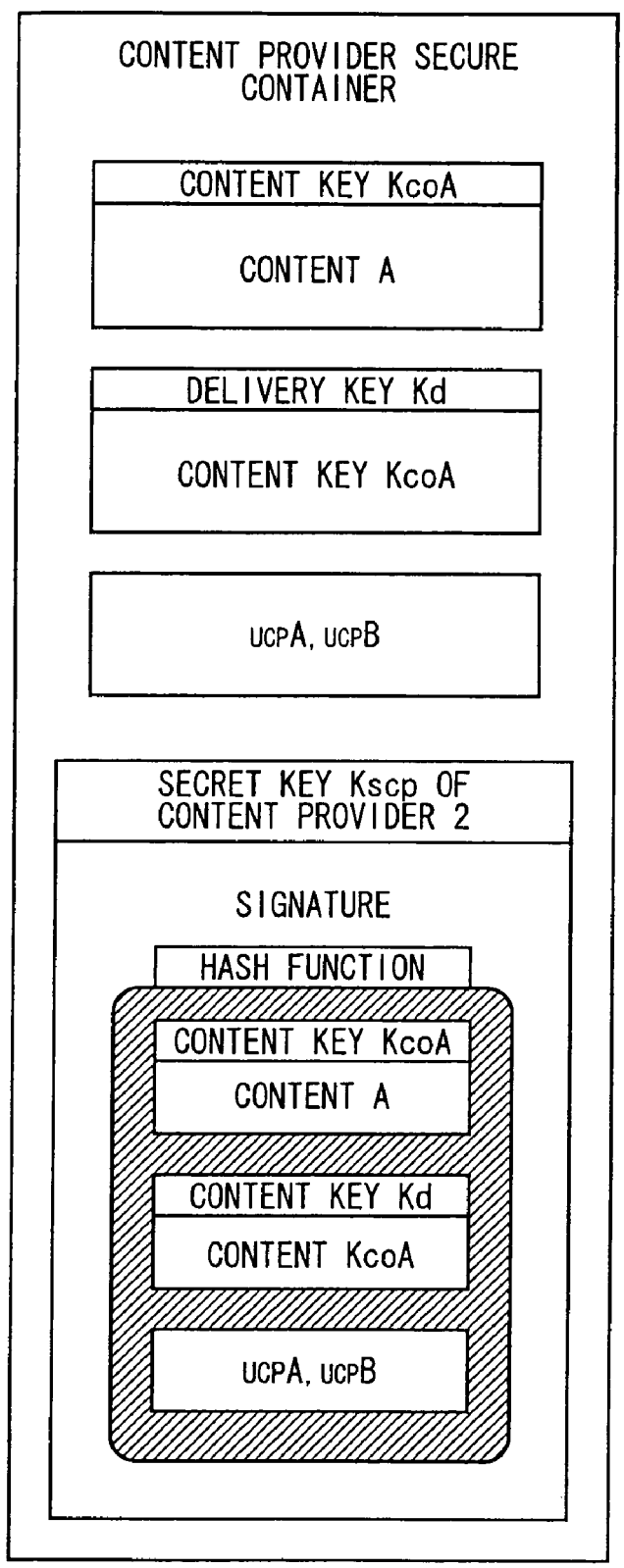
FIG. 17 is a schematic diagram showing a content provider secure container.

Returning to FIG. 11, the secure container preparation section 38 prepares a content provider secure container consisting, for example, of a content A (encrypted with a content key KcoA), a content key KcoA (encrypted with a delivery key Kd), UCP A, UCP B, and the content provider's signature, as shown in FIG. 17. The signature is obtained by encrypting a hash value with a secret key (the secret key Kscp of the content provider 2 in this case) in the public-key cryptosystem of the content provider. The hash value, in turn, has been obtained by applying a hash function to the data that needs to be sent (content A in this case (encrypted with the content key KcoA)), content key KcoA (encrypted with the delivery key Kd), and UCP A.

Figure 18:
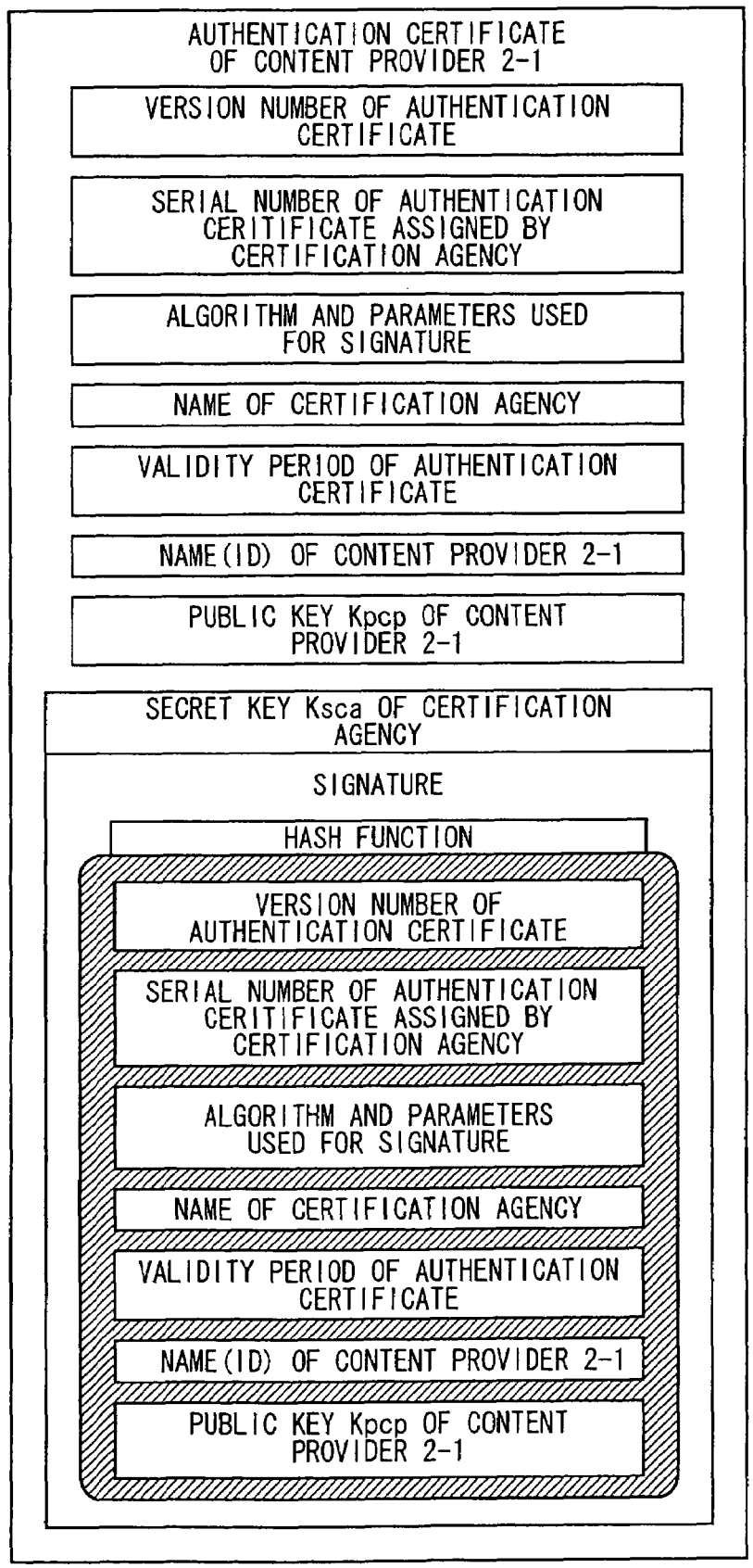
FIG. 18 is a schematic diagram showing an example authentication certificate of the content provider 2.

The secure container preparation section 38 sends the content provider secure container to the service provider 3 by attaching the authentication certificate of the content provider 2-1 shown in FIG. 18. The authentication certificate consists of its version number, its serial number assigned to the content provider 2-1 by the certification agency, the algorithm and parameters used for the signature, the name of the certification agency, the validity period of the authentication certificate, and the name, public key Kpcp, and signature (encrypted with the secret key Ksca of the certification agency) of the content provider 2-1.

The signature is used to check for falsification. It is produced by computing, by means of a hash function, a hash value from the data to be sent and encrypting the hash value with the secret key of public-key cryptography.

Hash functions and signature authentication will be described below. A hash function accepts as input the data to be sent, compresses it to data of a specific bit length, and outputs it as a hash value. Hash functions are characterized in that it is difficult to predict the input from the hash value (output), that if one bit of input data changes, many bits of the hash value change, and that it is difficult to find out input data that have the same hash value.

The receiver that has received the signature and data decrypts the signature by the cryptographic public key to obtain a resulting hash value. Then the hash value of the received data is calculated and compared with the hash value obtained by decrypting the signature, to check whether the two hash values are identical. If they are determined to be identical, the received data has not been falsified and it has been sent by the sender that has the secret key corresponding to the public key. Examples of the hash functions used for signatures include, MD (Message Digest) 4, MD5, SHA (Secure Hash Algorithm), etc.

Now public-key cryptography will be described. In contrast to the common-key cryptography which uses the same key (common key) for encryption and decryption, public-key cryptography uses different keys for encryption and decryption. In public-key cryptography, one of the keys is made public, but the other key can be kept secret. The key that can be made public is called a public key while the key that is kept secret is called a secret key.

Now a typical public-key cryptosystem, RSA (Rivest-Shamir-Adleman), will be described briefly. First, two significantly large primes p and q are determined, and then their product n is determined. The least common multiple L of (p−1) and (q−1) are computed, and the value e that is equal to or larger than 3 and less than L and that is relatively prime to L is determined (i.e., the value that will go into both e and L, which is only 1).

In modulo L arithmetic, the multiplicative inverse d of the element e is determined. In other words, the relationship ed=1 mod L exists among, d, e, and L, where d can be calculated by Euclid an algorithm. Here, n and e are public keys and p, q, and d are secret keys.

Cipher text C can be calculated from plain text M by equation (1).

$$C = M^e \bmod n \quad (1)$$

The cipher text C is decrypted into the plain text M by equation (2).

$$M = C^d \bmod n \quad (2)$$

Demonstration is omitted. The reason why plain text can be converted into cipher text by RSA and cipher text can be decrypted is that RSA is based on Fermat's first theorem and that equation (3) holds.

$$M = C^d = (M^e)^d = M^{ed} = M \bmod n \quad (3)$$

If one knows the secret keys p and q, he/she can compute the secret key d from the public key e. However, if the number of digits of the public key n is increased to the extent that the unique factorization of the public key n is difficult in terms of the amount of computation, the secret key d cannot be computed from the public key e and the cipher text cannot be decrypted based simply on knowledge of the public key n. As described above, the RSA cryptosystem can use different keys for encryption and decryption.

Now another public-key cryptosystem, Elliptic Curve Cryptography, will be described briefly. Let B denote a point on the elliptic curve $y^2 = x^3 + ax + b$. To define additions of points on the elliptic curve, let nB denote the result of n additions of B. Similarly, subtractions will be defined. It has been proven that it is difficult to compute n from B and Bn. Suppose, B and nB are public keys and n is a secret key. Using a random number r and the public keys, cipher text C1 and C2 are computed from plain text M by equations (4) and (5).

$$C1 = M + rnB \quad (4)$$

$$C2 = rB \quad (5)$$

Cipher text C1 and C2 are decrypted into plain text M by equation (6)

$$M = C1 - nC2 \quad (6)$$

Decryption is possible only when the secret key n is available. As can be seen from the above discussion, Elliptic Curve Cryptography allows the use of different keys for encryption and decryption, as is the case with the RSA cryptosystem.

Returning to FIG. 11, the mutual authentication section 39 of the content provider 2-1 performs mutual authentication with the EMD service center 1 before receiving delivery keys Kd from the EMD service center 1. It can also perform mutual authentication with the service provider 3 before sending the content provider secure container to the service provider 3. In this example, however, since the content provider secure container does not contain secret information, this mutual authentication is not necessarily required.

Since the content provider 2-2 basically has the same configuration as the content provider 2-1, showing in Figures and explanation will be omitted.

(4) Service Provider

Figure 19:
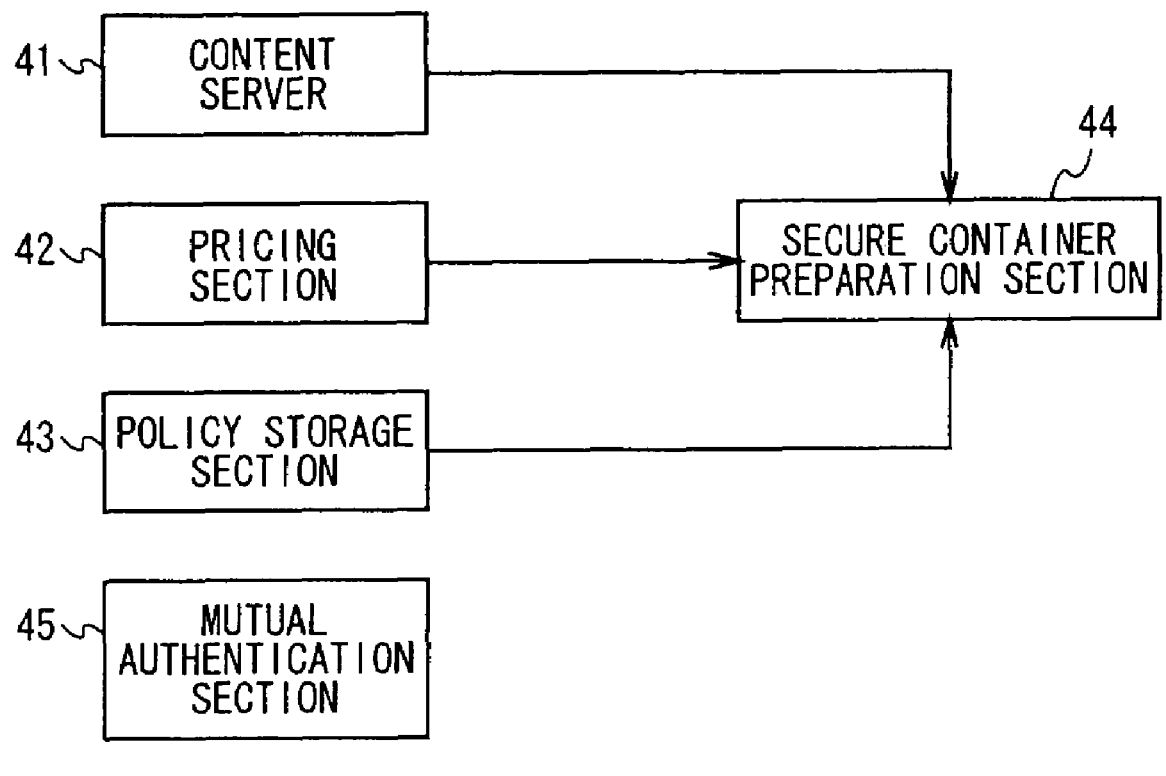
FIG. 19 is a block diagram showing the functional configuration of a service provider 3.

Now, the functional configuration of the service provider 3-1 will be described with reference to the block diagram in FIG. 19. The content server 41 stores the content (encrypted with the content key Kco), content key Kco (encrypted with the delivery key Kd), UCP, and a signature of the content provider 2 contained in the content provider secure container supplied by the content provider 3 and supplies them to the secure container preparation section 44.

The pricing section 42 checks the authenticity of the content provider secure container based on the signature contained in the content provider secure container supplied by the content provider 2. In this case, the certificate of the content provider 2 is checked. If it is authentic, a public key of the content provider 2 will be given. And on the basis of this given public key, the authenticity of the content provider secure container is checked.

If the authenticity of the content provider secure container is confirmed, it prepares PTs according to the UCP contained in the content provider secure container and supplies them to the secure container preparation section 44. FIG. 20 shows two price tags, PT A-1 (FIG. 20A) and PT A-2 (FIG. 20B), prepared according to UCP A of the FIG. 12A. A PT contains the information to be specified in "Content ID," "Content Provider ID," "UCP ID," "Service Provider ID," "PT ID," "PT Validity Period," "Pricing Conditions," and "Price."

"Content ID," "Content Provider ID," and "UCP ID" of PTs contain the information specified in the corresponding items of the UCP. That is, "Content ID" of PT A-1 and PT A-2 contains the ID of content A, their "Content Provider ID" contains the ID of the content provider 2-1, and their "UCP ID" contains the ID of UCP A.

"Service Provider ID" contains the ID of the service provider 3 that has provided the given PT. "Service Provider ID" of PT A-1 and PT A-2 contains the ID of the service provider 3. "PT ID" contains the ID assigned to the given PT: "PT ID" of PT A-1 contains the ID of PT A-1 and "PT ID" of PT A-2 contains the ID of PT A-2. "PT Validity Period" contains information about the validity period of the given PT: "PT Validity Period" of PT A-1 contains the validity period of PT A-1 and "PT Validity Period" of PT A-2 contains the validity period of PT A-2.

"Pricing Conditions" consists of "User Conditions" and "Equipment Conditions," as is the case with "Usage Conditions" in UCP. "User Conditions" contains information about the conditions for the user who can select the given PT. "Equipment Conditions" contains information about the conditions for the equipment that can select the given UCP.

In the case of PT A-1, "Pricing Conditions 10" is specified. "User Conditions 10" of "Pricing Conditions 10" contains information ('Male') indicating that the user is male. "Equipment Conditions" of "Pricing Conditions 10" is set to 'No Condition.' Thus, PT A-1 can be selected only by male users.

In "User Conditions 10" and "Equipment Conditions 10" of "Pricing Conditions 10", actually, code values of each type of code are set as shown in FIG. 21A. "User Conditions 10" of "Pricing Conditions 10" contains a service code 01xxh (FIG. 15A) meaning "with condition of sex", a value code 000000h indicating a male, and a condition code 01h (FIG. 15B) meaning "Equipment Conditions 10" contains a service code 0000h meaning "No condition", a value code FFFFFFh having no meaning in this case and a condition code 00h meaning "No Condition".

In the case of PT A-2, "Pricing Conditions 20" is specified. "User Conditions 20" of "Pricing Conditions 20" contains information ('Female') indicating that the user is female. "Equipment Conditions" of "Pricing Conditions 20" is set to 'No Condition.' Thus, PT A-2 can be selected only by female users.

In "User Conditions 20" and "Equipment Conditions 20" of "Pricing Conditions 20", actually, code values of each type of code are set as shown in FIG. 21B. "User Conditions 20" of "Pricing Conditions 20" contain a service code 01xxh (FIG. 15A) meaning "with conditions for sex", a value code 000000h indicating a female, and a condition code 01h (FIG. 15B) meaning "=". "Equipment Conditions 20" contains a service code 0000h meaning "No condition", a value code FFFFFFh having no meaning in this case and a condition code 00h meaning "No Condition".

Returning to FIG. 20, "Price" of PTs contains the usage charge when the content is used in the use type specified in "Type" of "Usage Details" of the corresponding UCP. This means that '2000 Yen' specified in "Price 11" on PT A-1 and '1000 Yen' specified in "Price 21" on PT A-2 indicate the purchase price (charge) of the content A since "Type 11" of "Usage Details 11" in UCP A (FIG. 12A)is specified 'Purchase and Reproduce'.

'600 Yen' in "Price 12" of PT A-1 and '300 Yen' in "Price 22" of PT A-2 are the prices of the rights to use the content A according to the use type "First-generation Duplicate" as indicated by "Type 12" of "Usage Details 12" of UCP A. '100 Yen' in "Price 13" of PT A-1 and '50 Yen' in "Price 23" of PT A-2 are the prices of the rights to use the content A according to the use type 'Limited-Time Reproduction' as indicated by "Type 13" of "Usage Details 13" of UCP A. '300 Yen' in "Price 14" of PT A-1 and '150 Yen' in "Price 24" of PT A-2 are the prices for using the content A according to the use type to duplicate five times as indicated by "Type 14" of "Usage Details 14" of UCP A.

In this example, when the prices on PT A-1 (applicable to male users) and the prices on PTA-2 (applicable to female users) are compared, it can be seen that the prices on PT A-1 are twice as high as the prices on PT A-2. For example, while "Price 11" on PT A-1 for "Usage Details 11" of UCP A is '2000 Yen,' "Price 21" on PT A-2 for "Usage Details 11" of UCP A is '1000 Yen.' Similarly, the prices specified in "Price 12" to "Price 14" on PT A-1 are twice as high as the prices specified in "Price 22" to "Price 24" on PT A-2. In short, female users can use content A at lower prices.

FIG. 22 shows PT B-1 and PT B-2 prepared according to UCP B in FIG. 12B. PT B-1 in FIG. 22A includes the ID of content A, ID of content provider 2-1, ID of UCP B, ID of service provider 3-1, ID of PT B-1, validity period of PT B-1, pricing condition 30, and two types of prices 31 and 32.

"User Conditions 30" of "Pricing Conditions 30" in PT B-1 is set to "No Condition" and "Equipment Conditions 30" contains information ('Slave Equipment') which conditions the equipment to be a slave equipment. Therefore, PT B-1 can be selected only when the content A is used by the slave equipment.

In "User Conditions 30" and "Equipment Conditions 30" of "Pricing Conditions 30", actually, code values of each type of code are set as shown in FIG. 23A. "User Conditions 30" contains a service code 0000h (FIG. 15A) meaning "No Condition", a value code FFFFFFh having no meaning in this case, and a condition code 00h (FIG. 15B) meaning "No Condition". "Equipment Conditions 30" is specified in "Slave equipment", therefore the service code is set to 00xxh meaning "With Conditions for Equipment", the value code is set to 000064h indicating "value 10" and the condition code is set to 03h meaning "<(smaller)". In this example, such code values are set since the equipment number is set at below number 100 for the slave equipment.

'100 Yen' in "Price 31" on PT B-1 is the price when reproduction is performed four times as "Type 21" of "Usage Details 21" of UCP B (FIG. 12B) indicates 'Pay Per Play 4'. Also, '300 Yen' in "Price 32" is the price when duplication is performed two times as "Type 22" of "Usage Details 22" of UCP A indicates 'Pay Per Play 2'.

PT B-2 prepared according to UCP B includes, as shown in FIG. 22B, the ID of content A, ID of content provider 2-1, ID of UCP B, ID of service provider 3-1, ID of PT B-2, validity period of PT B-2, pricing condition 40, and two types of prices 41 and 42.

"User Conditions 40" of "Pricing Conditions 40" in PT B-2 is set to "No Condition" and "Equipment Conditions 40" contains information ('Master Equipment') which conditions the equipment to be a master equipment. In short, PT B-2 can be selected only when the content A is used by the master equipment.

In "User Conditions 40" and "Equipment Conditions 40" of "Pricing Conditions 40", actually, code values of each type of code are set as shown in FIG. 23B. "User Conditions 40" of "Pricing Conditions 40" contains a service code 0000h (FIG. 15A) meaning "No Condition", a value code FFFFFFh having no meaning in this case, and a condition code (15B) 00h meaning "No Condition". In "Equipment Conditions 40", the service code is set to 00xxh meaning "With Condition for Equipment", the value code is set to 000064h indicating "value 100" and the condition code is set to 06h meaning "=> (equal or larger)". In this example, such code values are set since the equipment number is set at over number 100 for the master equipment.

The prices indicated in "Price 41" and "Price 42" on PT B-2 are charges when using the content A according to the use type indicated in each "Type 21" of "Usage Details 21" and "Type 22" of "Usage Details 22" in UCP B.

Here, comparing the prices on PT B-1 (applied to the slave equipment) and PT B-2 (applied to the master equipment), the price on PT B-1 is found to be set at two times as much as that on PT B-2. For example, while "Price 31" on PT B-1 indicates '100 Yen', "Price 41" on PT B-2 indicates '50 Yen'. Similarly, while "Price 32" indicates '300 Yen', "Price 42" indicates '150 Yen.' Returning to FIG. 19, the policy storage section 43 stores the content's UCP supplied by the content provider 2 and supplies it to the secure container preparation section 44.

Figure 24:
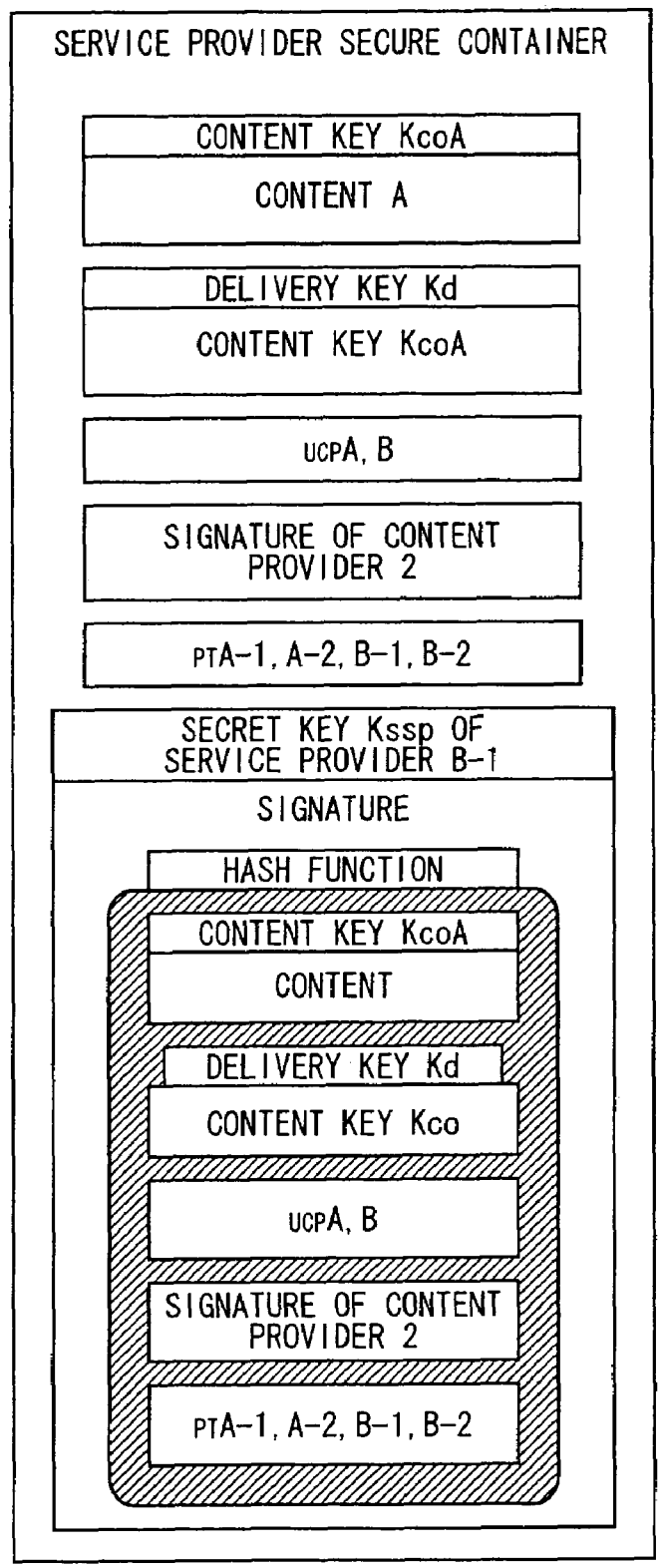
FIG. 24 is a schematic diagram showing a service provider secure container.

The secure container preparation section 44 prepares a service provider secure container consisting, for example, of the content A (encrypted with a content key KcoA), content key KcoA (encrypted with a delivery key Kd), UCP A, UCP B, signature of the content provider 2, PT A-1, PT A-2, PT B-1, PT B-2, and signature of the service provider, as shown in FIG. 24.

Figure 25:
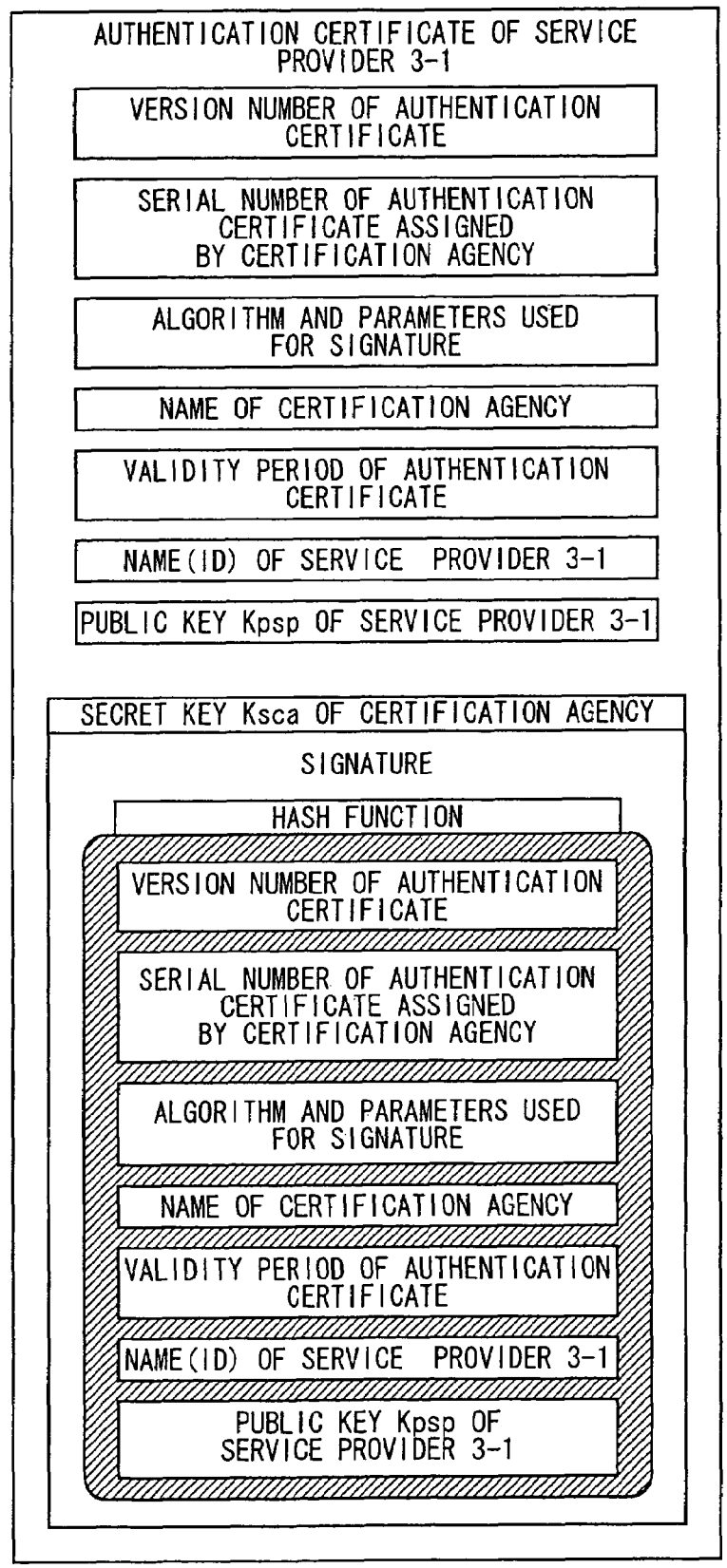
FIG. 25 is a schematic diagram showing an example authentication certificate of the service provider 3.

Also, the secure container preparation section 44 supplies the prepared service provider secure container to the user home network 5 by attaching an authentication certificate, such as the one shown in FIG. 25, consisting of its version number, its serial number assigned to the service provider 3-1 by the certification agency, the algorithm and parameters used for the signature, the name of the certification agency, the validity period of the authentication certificate, the name and public key Kpsp of the service provider 3-1, and the signature of the certification agency.

Returning to FIG. 19 again, the mutual authentication section 45 performs mutual authentication with the content provider 2 before receiving the content provider secure container from the content provider 2. It also performs mutual authentication with the user home network 5 before sending the service provider secure container to the user home network 5. However, this mutual authentication is not performed if, for example, the network 4 is a communication satellite network. In this example, since the content provider secure container and service provider secure container do not contain secret information, the service provider 3 need not necessarily perform mutual authentication with the content provider 2 and user home network 5.

Since the configuration of service provider 3-2 is the same as that of service provider 3-1, showing in Figures and explanation are omitted.

(5) User Home Network (5-1) Receiver 51

Figure 26:
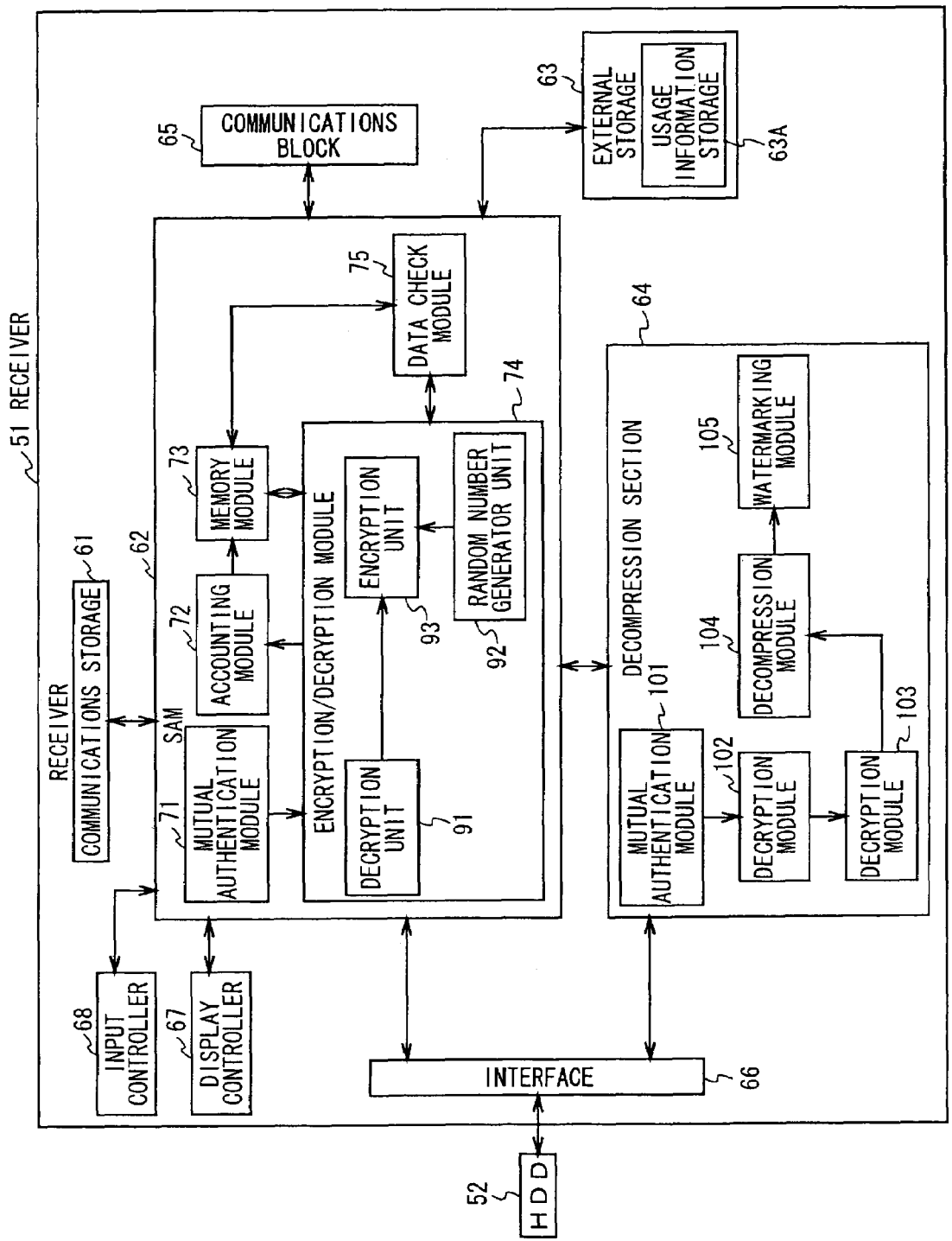
FIG. 26 is a block diagram showing an example functional configuration of a receiver 51 in a user home network 5.

With reference to FIG. 26, an example configuration of the receiver 51 in the user home network 5. The receiver 51 is consisting of a communications block 61, SAM 62, external storage 63, decompression section 64, communications block 65, interface 66, display controller 67, and input controller 68. The communications block 61 of the receiver 51 communicates with the service provider 3 or the EMD service center 1 through the network 4, sending and receiving necessary information.

SAM 62 consists of a mutual authentication module 71, accounting module 72, memory module 73, encryption/decryption module 74, and data check module 75. It is made up of single-chip ICs designed exclusively for cryptographic use. It has a multi-layer construction in which the memory cells inside are sandwiched by dummy layers of aluminum and the like. Since it operates at a small range of voltage or frequency, it is difficult to read data illegally from outside (tamper-proof).

Figure 27:
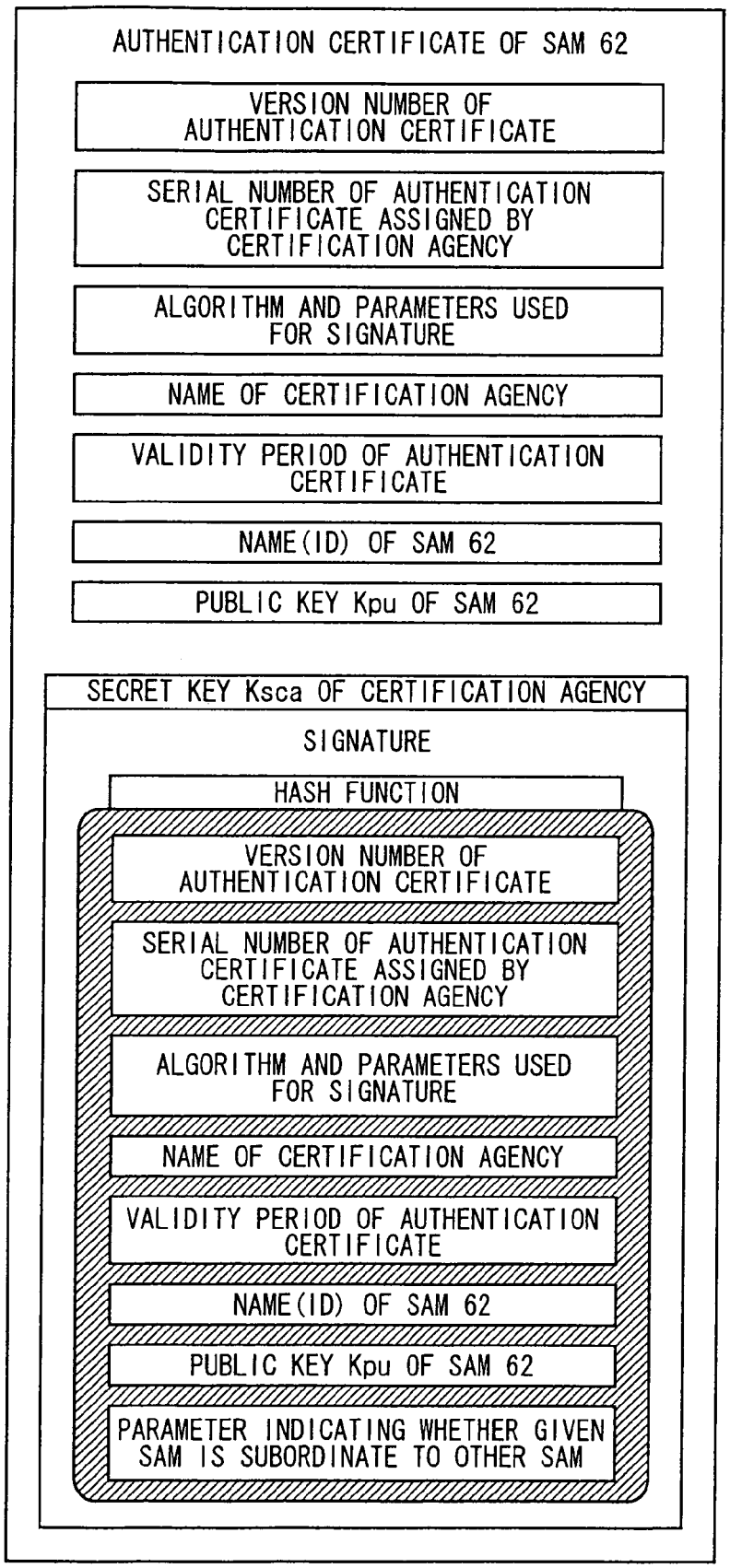
FIG. 27 is a schematic diagram showing an example authentication certificate of SAM 62 of the receiver 51.

The mutual authentication module 71 of SAM 62 sends SAM 62 authentication certificate (shown in FIG. 27) stored in the memory module 73 to the partner of mutual authentication, performs mutual authentication, and supplies the temporary key Ktemp (session key) consequently shared by the partner of mutual authentication to the encryption/decryption module 74. The authentication certificate of SAM contains information that corresponds to the information contained in the authentication certificate of the content provider 2-1 and authentication certificate of the service provider 3-1. Therefore, its description is omitted.

The accounting module 72 is an example of usage control status (UCS) and UCS when the rights for content have been purchased according to the use type of 'Purchase and Reproduce,' and prepares accounting information based on the usage details of the selected UCP. FIG. 28 shows an example of UCS when the rights for content have been purchased according to the use type 'Purchase and Reproduce.' FIG. 28 shows UCS A generated based on the usage details 11 in UCP A shown in FIG. 12A and "Price 11" on PT A-1 shown in FIG. 20A. As shown in FIG. 28, UCS contains the information specified in "Content ID," "Content Provider ID," "UCP ID," "UCP Validity Period," "Service Provider ID,""PT ID," "PT Validity Period," "UCS ID," "SAM ID," "User ID," "Usage Details," and "Usage History."

"Content ID," "Content Provider ID," "UCP ID," "UCP Validity Period," "Service Provider ID," "PT ID," "PT Validity Period" of UCS contain the information specified in the corresponding items of the PT. Thus, in the case of UCS A in FIG. 28, "Content ID" contains the ID of content A, "Content Provider ID" contains the ID of the content provider 2-1, "UCP ID" contains the ID of UCP A, "UCP Validity Period" contains the validity period of UCP A, "Service Provider ID" contains the ID of the service provider 3-1, "PT ID" contains the ID of PT A-1, and "PT Validity Period" contains the validity period of PT A-1.

"UCS ID" contains the ID assigned to the given UCS, and thus "UCS ID" of UCS A contains the ID of UCS A. "SAM ID" contains the ID of the equipment and "SAM. ID" of UCS A contains the SAM 62 ID of the receiver 51. "User ID" contains the ID of the user who uses the content and "User ID" of UCS A contains the ID of user F.

"Usage Details" consists of items "ID," "Type," "Parameter," and "Control Transfer Status." Of these items, "ID," "Type," and "Parameter" contain the information specified in the corresponding items of "Usage Details" of the selected UCP. Thus, "ID" of UCS A contains the information (ID of Usage Details 11) specified in "ID 13" of "Usage Details 13" of UCP A, "Type" is set to 'Limited-Time Reproduction' specified in "Type 11" of "Usage Details 11," and "Parameter" contains the information (Start Time and End Time) specified in "Parameter 11" of "Usage Details 11."

"Control Transfer Status" of "Usage Details" contains the respective IDs of the source equipment (equipment that has purchased the content) and destination equipment if "Control Transfer Permission Information" of the selected UCP is set to 'Permitted' (i.e., control transfer is possible). If no control transfer is performed, the ID of the source equipment is used as the ID of the destination equipment. If "Control Transfer Permission Information" of the UCP is set to 'Not Permitted,' "Control Transfer Status" should be set to 'Not Permitted.' In that case, control transfer of the content is not performed (not permitted). In "Control Transfer Status" of UCS A, the IDs of both source and destination equipment are set to the ID of SAM 62 because "Control Transfer Permission Information 11" of "Usage Details 11" of UCP A is set to 'Permitted' and because the control of content A is not transferred.

"Usage History" contains the history of use types for the same content. Only information that represents 'Purchase and Reproduce' is stored now in "Usage History" of UCS A.

For example, if the receiver 51 has used content A before, the then use type is also stored.

In the case of the UCS described above, "UCP Validity Period" and "PT Validity Period" have been specified. However, these items may not be specified for the UCS. Also, although "Content Provider ID" has been specified for the above UCS, it may not be specified if the UCP ID is unique enough to identify the content provider. Similarly, "Service Provider ID" may not be specified if the PT ID is unique enough to identify the service provider.

Figure 29:
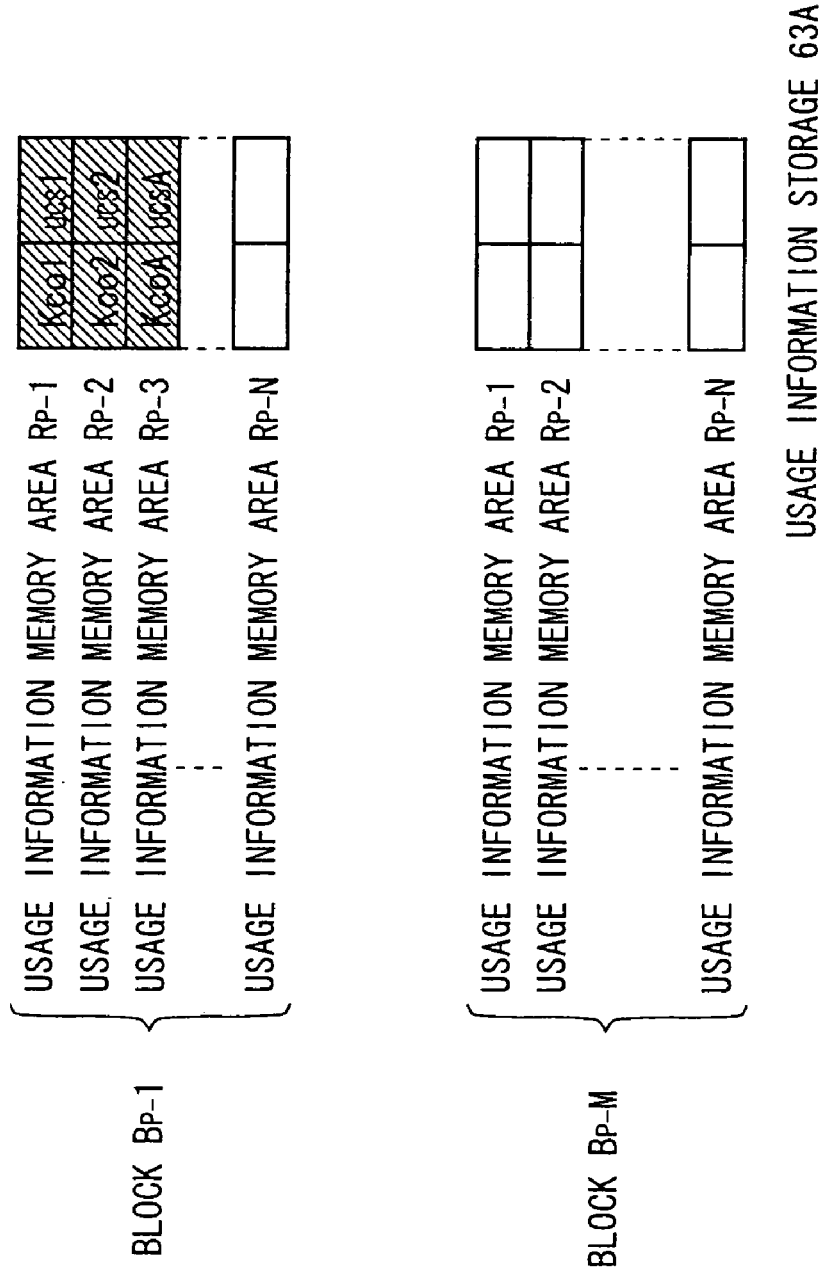
FIG. 29 is a schematic diagram illustrating the internal structure of the usage information storage 63A in the external storage 63 of the receiver 51.

The UCS prepared is sent to the external storage 63 and stored in its usage information storage 63A, together with the content keys Kco (encrypted with a save key Ksave) supplied by the decryption unit 91 of the encryption/decryption module 74 of the receiver 51. As shown in FIG. 29, the usage information storage 63A of the external storage 63 are divided into M number of blocks (1 MB each, for example): BP-1 to BP-M. Each block BP, in turn, is divided into N number of usage information memory areas: RP-1 to RP-N. The content keys Kco (encrypted with a save key Ksave) and UCS supplied by SAM 62 are stored, in matched pairs, in the appropriate usage information memory areas RP of the usage information storage 63A.

In the example of FIG. 29, the UCS A shown in FIG. 28 and the content key KcoA (encrypted with a save key Ksave) to decrypt the content A are stored, in matched pairs, in the usage information memory area RP-3 of the block BP-1. Other content keys Kco1 and Kco2 (encrypted with a save key Ksave) and usage control status UCS1 and 2 are stored in the usage information memory areas RP-1 and RP-2 of the block BP-1. The usage information memory areas RP-4 (not shown) to RP-N of the block BP-1 as well as blocks BP-2 (not shown) to BP-M currently do not store any content key Kco or usage control status UCS and contain the initial information which indicates that they are empty. Hereafter, the content keys Kco (encrypted with a save key Ksave) and UCS stored in the usage information memory areas RP will be collectively referred to as usage information if there is no need to treat them separately.

FIG. 30 shows the accounting information A prepared together with UCS A shown in FIG. 28. As shown in FIG. 30, accounting information contains "Content ID," "Content Provider ID," "UCP ID,""UCP Validity Period," "Service Provider ID," "PT ID," "PT Validity Period," "UCS ID," "SAM ID," "User ID," "Usage Details," and "Accounting History."

"Content ID," "Content Provider ID," "UCP ID," "UCP Validity Period," "Service Provider ID," "PT ID," "PT Validity Period," "UCS ID," "SAM ID," "User ID," and "Usage Details" of the accounting information contain the information specified in the corresponding items of the UCS. Thus, in the case of the accounting information A in FIG. 30, "Content ID" contains the ID of the content A, "Content Provider ID" contains the ID of the content provider 2-1, "UCP ID" contains the ID of UCP A, "UCP Validity Period" contains the validity period of UCP A, "Service Provider ID" contains the ID of the service provider 3, "PT ID" contains the ID of PT A-1, "PT Validity Period" contains the validity period of PT A-1, "UCS ID" contains the ID of UCS A, "SAM ID" contains the ID of SAM 62, "User ID" contains the ID of user F of the receiver 51, and "Usage Details" contains the information specified in "Usage Details 11" of UCS A.

"Accounting History" of accounting information contains information indicating the total of the accounts calculated in equipment. "Accounting History" of accounting information A contains the total of the accounts calculated in the receiver 51.

In the accounting information descried above, although "UCP Validity Period" and "PT Validity Period" have been specified, they may not be specified for the UCS. Also, although "Content Provider ID" has been specified in the accounting information described above, it may not be specified if the UCP ID is unique enough to identify the content provider. Similarly, "Service Provider ID" may not be specified if the PT ID is unique enough to identify the service provider.

Returning to FIG. 26, the memory module 73 stores keys such as the public key Kpu of SAM 62, the secret key Ksu of SAM 62, the public key Kpesc of the EMD service center 1, the public key Kpca of the certification agency, the save key Ksave, and three months' delivery keys Kd, the authentication certificate of SAM 62 (FIG. 27), accounting information (for example, the accounting information A in FIG. 30), reference information 51, and M number of verification values HP-1 to HP-M, as shown in FIG. 31.

FIG. 32 shows the reference information 51 stored in the memory module 73. The reference information contains predetermined information specified for each of the items of "SAM ID," "Equipment Number," "Settlement ID," "Charge Limit," "Account-Settling User Information," "Subordinate User Information," and "Use Point Information."

"SAM ID," "Equipment Number," "Settlement ID," "Account-Settling User Information," "Subordinate User Information," and "Use Point Information" of the reference information contains the information specified for the items corresponding thereto in the system registration information (FIG. 9) managed by the user management section 18 of the EMD service center 1. Thus, the reference information 51 contains the ID of SAM 62, equipment number (100) of SAM 62, settlement ID of user F, account-settling user information of user F (general information (the name, address, phone number, settlement institution information, date of birth, age, and sex), ID, and password of user F), and use point information shown in FIG. 33 (information similar to that shown in FIG. 10) of the receiver 51.

"Charge Limit" contains the upper limit on amounts charged, which varies depending on whether the given equipment is registered formally or temporarily. "Charge Limit" of the reference information 51 contains the upper limit on amounts charged for formally registered equipment ('Formal Registration') because the receiver 51 has been formally registered. The upper limit of amounts charged when formally registered is higher than the upper limit of amounts charged when temporarily registered.

Next, M number of the verification values HP-1 to, HP-M stored in the memory module 73 shown in FIG. 23 will be explained. The verification value HP-1 is the hash value obtained by the application of a hash function to all the data stored in block BP-1 of the usage information storage 63A of the external storage 63. The verification values HP-2 to HP-M are hash values obtained by the application of the hash function to the data stored in the corresponding blocks BP-2 to BP-M of the external storage 63, as is the case with the verification value HP-1.

Returning to FIG. 26, the encryption/decryption module 74 of SAM 62 consists of an decryption unit 91, random number generator unit 92, and encryption unit 93. The decryption unit 91 decrypts the encrypted content key Kco with the delivery key Kd and outputs the results to the encryption unit 93. The random number generator unit 92 generates a random number with predetermined digits generates a temporary key Ktemp, and outputs them to the encryption unit 93 as required (for example, during mutual authentication).

The encryption unit 93 encrypts the decrypted content key Kco again with the save key Ksave stored in the memory module 73. The encrypted content key Kco is supplied to the external storage 63. When sending the content key Kco to the decompression section 64, the encryption unit 93 encrypts it with the temporary key Ktemp generated by the random number generator unit 92.

The data check module 75 checks the data in a block BP of the usage information storage 63A of the external storage 63 for falsification by comparing the hash value of the data stored in the block BP with the corresponding verification value HP stored in the memory module 73. The data check module 75 also calculates the verification value HP when purchase, use and control transfer of content take place and stores (updates) it in the memory module 73.

The decompression section 64 consists of a mutual authentication module 101, decryption module 102, decryption module 103, decompression module 104, and watermarking module 105. The mutual authentication module 101 performs mutual authentication with SAM 62 and outputs the temporary key Ktemp to the decryption module 102. The decryption module 102 uses the temporary key Ktemp to decrypt the content key Kco encrypted by the temporary key Ktemp, and outputs the results to the decryption module 103. The decryption module 103 decrypts the content recorded on the HDD 52, with the content key Kco, and outputs the results to the decompression module 104. The decompression module 104 further decompresses the decrypted content by a method such as ATRAC2 and outputs the results to the watermarking module 105. The watermarking module 105 watermarks information (such as SAM 62 ID) in the content for identification of the receiver 51 and outputs the results to speakers (not shown) to reproduce music.

The communications block 65 communicates with the receiver 201 of the user home network 5. The interface 66 converts the signals from SAM 62 and the decompression section 64 into a specified form and outputs the results to the HDD 52. It also converts the signals from the HDD 52 into a specified form and outputs the results to SAM 62 and the decompression section 64.

The display controller 67 controls the output to a display unit 4 (not shown). The input controller 68 controls the input from an operator panel (not shown) consisting of various buttons.

The HDD 52 stores registration lists like the one shown in FIG. 34 in addition to the content and the like supplied by the service provider 3. The registration list consists of the list section that stores tabulates information and the SAM information section that stores specified information about the equipment that possesses the given registration list.

The SAM information section stores (in the "SAM ID" field) the SAM ID of the equipment that possesses the given registration list, in this example, the SAM 62 ID of the receiver 51. It also stores the validity period of the registration list (in the "Validity Period" field), version number of the registration list (in the "Version Number" field), and number of equipment connected (including this equipment) (in the "Number of Equipment Connected" field), which is two in total, in this example, including the receiver 51 itself and the receiver 201 connected to it.

The list section consists of nine items "SAM ID," "User ID,""Purchasing," "Accounting," "Equipment Billed," "Master Equipment,""Status Flag," "Signature to Conditions," and "Signature to Registration List" and, in this example, stores specified information in each item as the registration conditions of the receiver 51.

"SAM ID" stores the SAM ID of the equipment. In this example, the SAM 62 ID of the receiver 51, SAM 212 ID of the receiver 201 are stored. "User ID" stores the ID of the user of the corresponding equipment. In this example, the ID of user F and the ID of user A are stored.

"Purchasing" stores information ('Yes' or 'No') which indicates whether the corresponding equipment can purchase content (more precisely, purchase the rights to use the content). In this example, since the receivers 51 and 201 can purchase content, 'Yes' is stored.

"Accounting" stores information ('Yes' or 'No') which indicates whether the corresponding equipment can perform accounting in communication with the EMD service center 1. In this example, the receivers 51 and 201 can perform accounting since the user F is registered as account-settling user and so is the user A. So the appropriate row of the "Accounting" column stores 'Yes.' "Equipment Billed" stores the SAM ID of the equipment with which accounts are settled. In this example, since the receivers 51 (SAM 62) and 201 (SAM 212) can perform accounting for themselves, SAM 62 ID and SAM 212 ID are stored.

Master Equipment" stores the SAM ID of the connected equipment that can provide content if the given equipment receives content from other equipment connected rather than from the service provider 3. In this example, the receiver 51 and receiver 201 receives content from the service provider 3, so information ('None') which indicates that there is no equipment providing content is stored. Providing content here does not include control transfer.

"Status Flag" stores any restrictions to the operation of the given equipment. If there is no such restriction, appropriate information ('No Restriction') is stored. If there are any restrictions or if there is any condition that will stop the operation, appropriate information ('Restricted' or 'Stop,' respectively) is stored. For example, if settlement has failed, "Status Flag" of that equipment is set to 'Restricted.' In this example, the equipment with its "Status Flag" set to 'Restricted' can use the content already purchased, but cannot purchase new content. In short, certain restrictions are placed on the equipment. Besides, if illegal acts such as illegal duplication of content are detected, "Status Flag" is set to 'Stop' and the operation of the equipment is stopped. Consequently, the equipment can no longer receive any service from the EMD system.

In this example, no restriction is placed on the receivers 51, 201, and their "Status Flag" is set to 'No Restriction.'

"Signature to Conditions" stores the signature of the EMD service center 1 to the information stored in "SAM ID," "User ID," "Purchasing," "Accounting," "Equipment Billed," "Master Equipment," and "Status Flag." In this example, signature to registration conditions of the receivers 51 and 201 is stored.

"Signature to Registration List" stores the signature to the entire data specified in the registration list.

(5-2) Receiver 201

Figure 35:
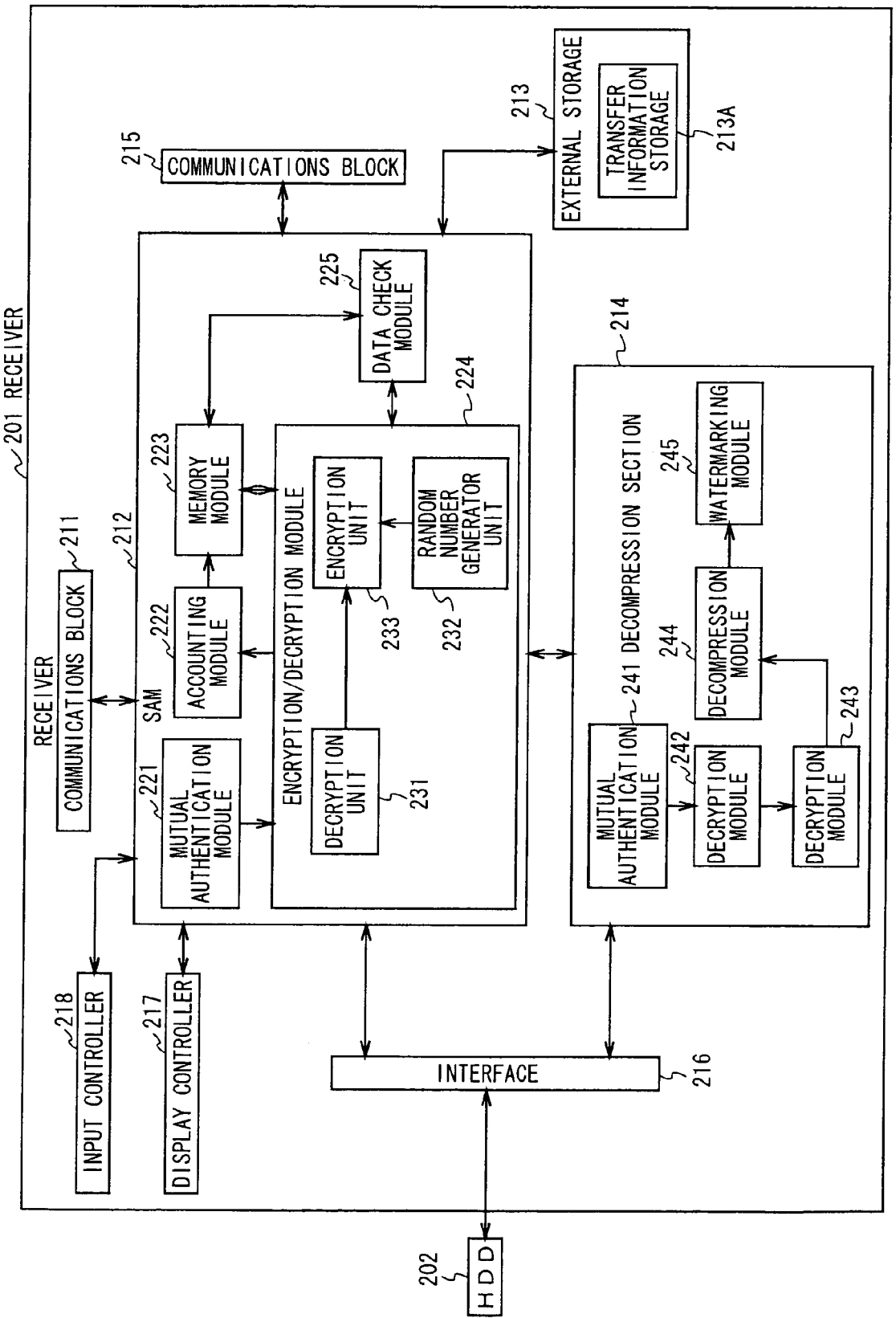
FIG. 35 is a block diagram showing an example functional configuration of a receiver 201 in the user home network 5.

FIG. 35 shows an example configuration of the receiver 201. The components from the communications block 211 to input controller 218 of the receiver 201 have functions similar to those of the communications block 61 to the input controller 68 of the receiver 51. Thus, their detailed description is omitted where possible.

The external storage 213 is divided into P number of blocks BM-1 to BM-P (for example, divided at every one megabyte) and has the transfer information storage 213A in which each block BM is divided into Q number of the transfer information memory area RM-1 to RM-Q. For example, when the control transfer of content is performed, the external storage 213 stores content key Kco (encrypted with the save key Ksave) to the content, ID of the content and SAM ID of the source equipment (hereafter, including all these, referred to as transfer information if there is no need to handle them individually) that are sent from SAM 12.

Figure 36:
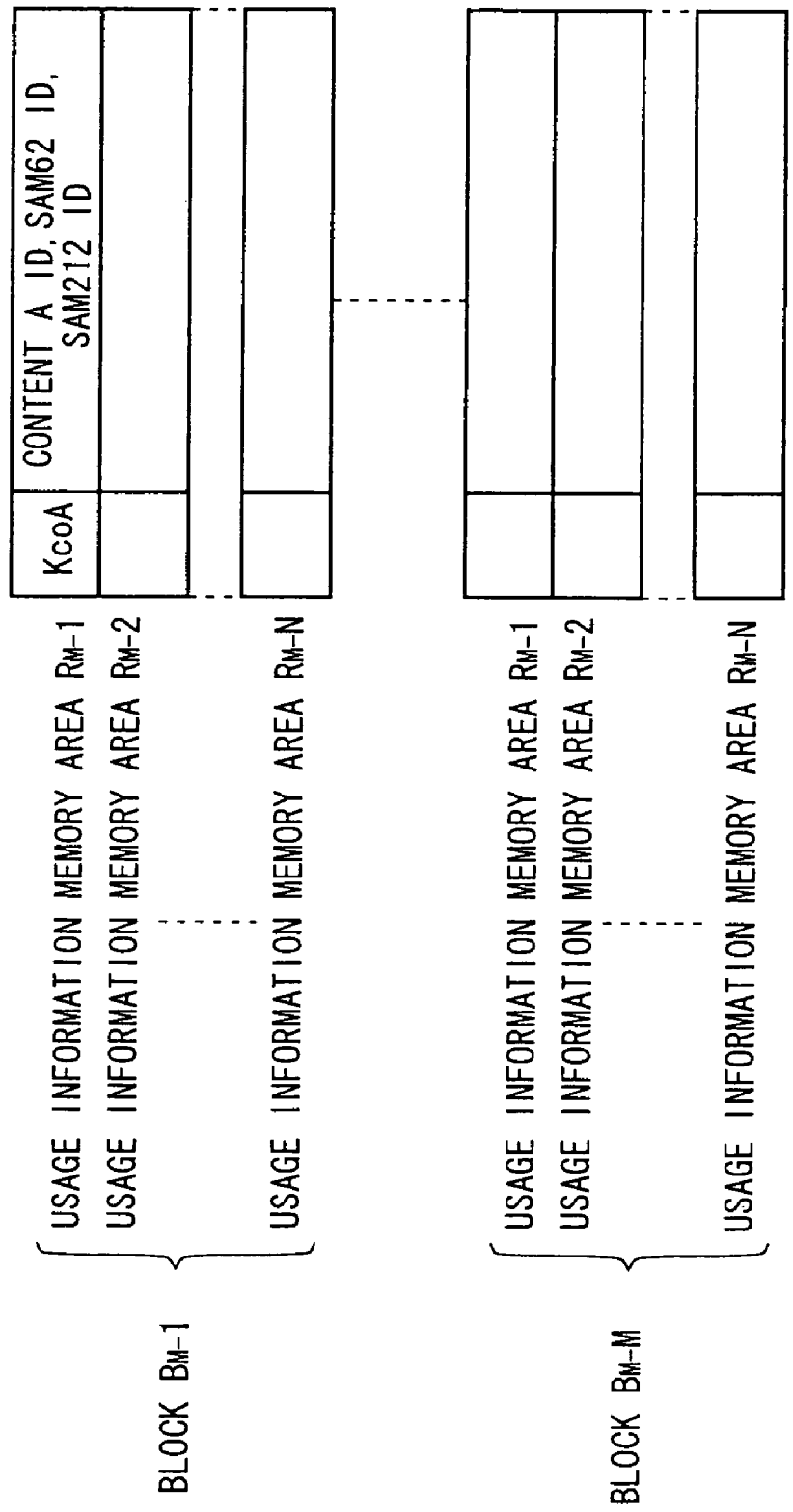
FIG. 36 is a schematic diagram illustrating the internal structure of the usage information storage 213A in the external storage 213 of the receiver 201.

The transfer information memory area RM-2 of the block BM-1 in the transfer information storage 213A in FIG. 36 stores content key KcoA (encrypted with the save key Ksave) to the content A (encrypted with the content key Kco), content A ID and SAM 62 ID. This represents the transfer information storage 213A in which control transfer of the content A from the receiver 51 is completed.

The transfer information memory area RM-2 (not shown) to RM-Q of the block BM-1 and blocks BM-2 (not shown) to BM-P do not store transfer information but stores initial information indicating that they are free (can store the transfer information).

Figure 37:
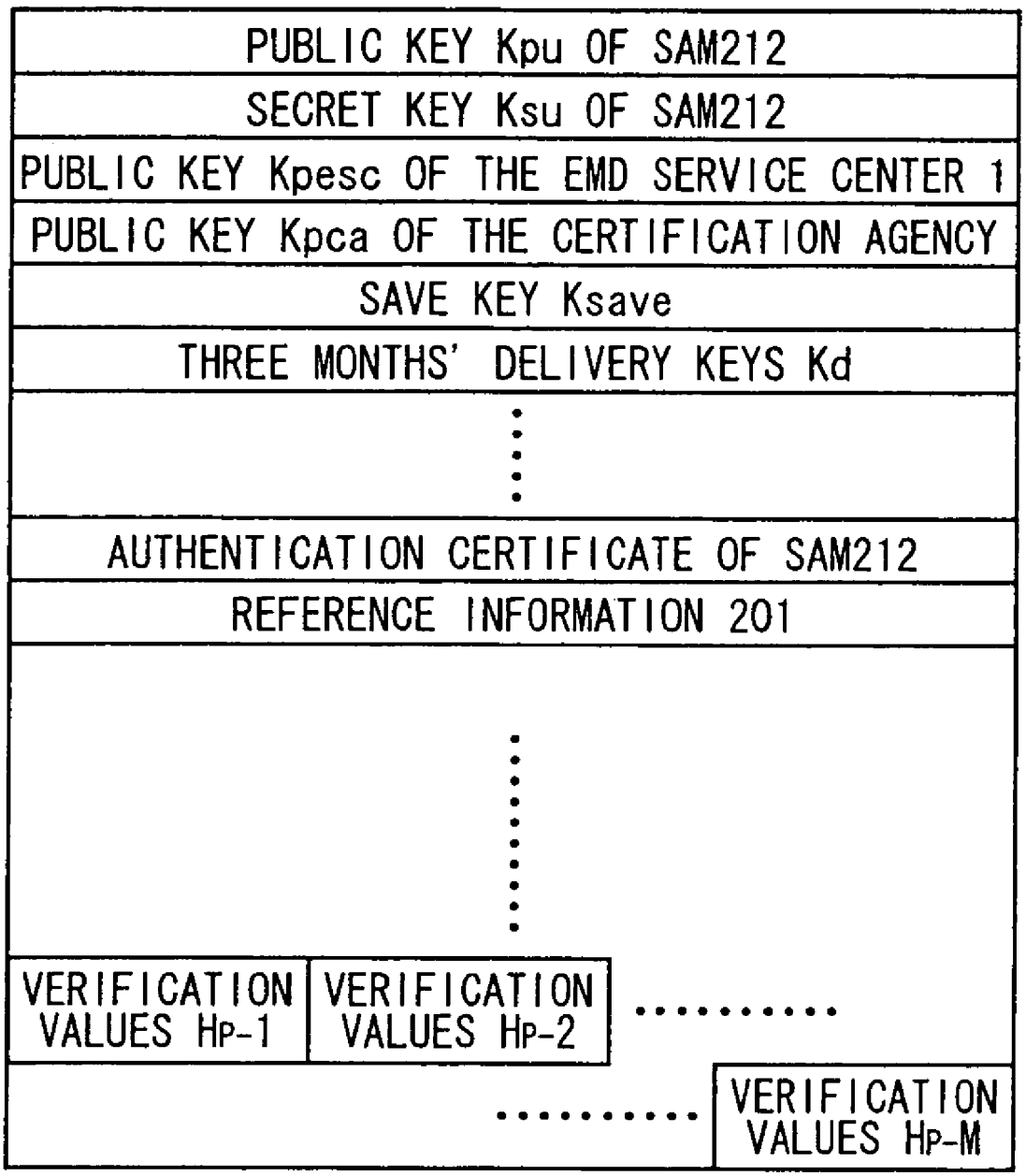
FIG. 37 is a chart showing the information stored in the memory module 223 of the receiver 201.

The memory module 223 of SAM 212 stores public key Kpu of SAM 212, secret key Ksu of SAM 212, public key Kpesc of EMD service center 1, public key Kpca of certification agency, save key Ksave, three months' delivery key Kd, authentication certificate of SAM 212 distributed from the certification agency in advance, reference information 201 and Q number of verification values HM-1 to HM-Q, as shown in FIG. 37.

P number of verification values HM-1 to HM-Q are hash values obtained by the application of a hash function to data stored in blocks BM-1 to BM-Q of the transfer information storage 213A of the external storage.

Explanation for HDD 202 is omitted since it has the function similar to HDD 52. The HDD 202 stores registration conditions of the receiver 51 indicated in the list section of registration list of receiver 51 in FIG. 34, and registration list (not shown) of the receiver 201 having a list section where registration conditions of the receiver 201 are set.

In this example, to make it simple, the external storage 63 of the receiver 51 is only provided with the usage information storage 63A, and the external storage 213 of the receiver 201 is only provided with the usage information storage 213A. Actually, the external storage 63 of the receiver 51 is also provided with the transfer information storage (not shown) in addition to the usage information storage 63A. Similarly, the external storage 213 of the receiver 201 is provided with the transfer information storage (not shown) in addition to the usage information storage 213A.

(6) Purchasing and Utilization of Content

Now the processing in the EMD system will be described with reference to the flow chart in FIG. 38. Here it is assumed that the content A in the content provider 2-1 is supplied to and used by the receiver 51 of the user home network 5 via the service provider 3-1.

(6-1) Transmission of Delivery Keys From EMD Service Center to Content Provider

Figure 39:
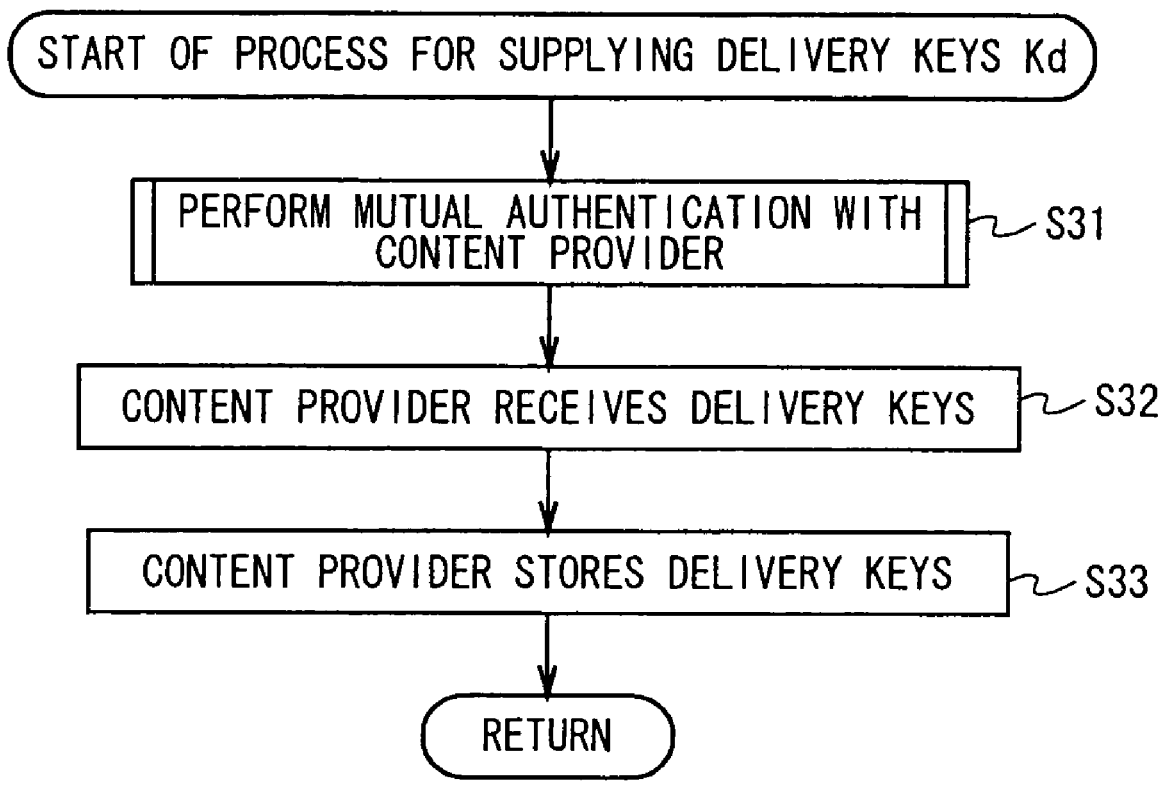
FIG. 39 is a flow chart illustrating the process of sending delivery keys Kd from the EMD service center 1 to the content provider 2.

In Step S11, the delivery keys Kd are supplied to the content provider 2-1 by the EMD service center 1. Details of this process is shown in the flow chart of FIG. 39. In Step S31, the mutual authentication section 17 (FIG. 3) of the EMD service center 1 performs mutual authentication with the mutual authentication section 39 (FIG. 11) of the content provider 2-1. When the authenticity of the content provider 2-1 is verified, the content provider management section 12 of the EMD service center 1 sends the delivery keys Kd supplied by the key server 14, to the content provider 2-1. Details of mutual authentication will be described later with reference to FIGS. 40 to 42.

In Step S32, the encryption section 36 of the content provider 2-1 receives the delivery keys Kd sent from the EMD service center 1, and stores them in Step S33.

Figure 38:
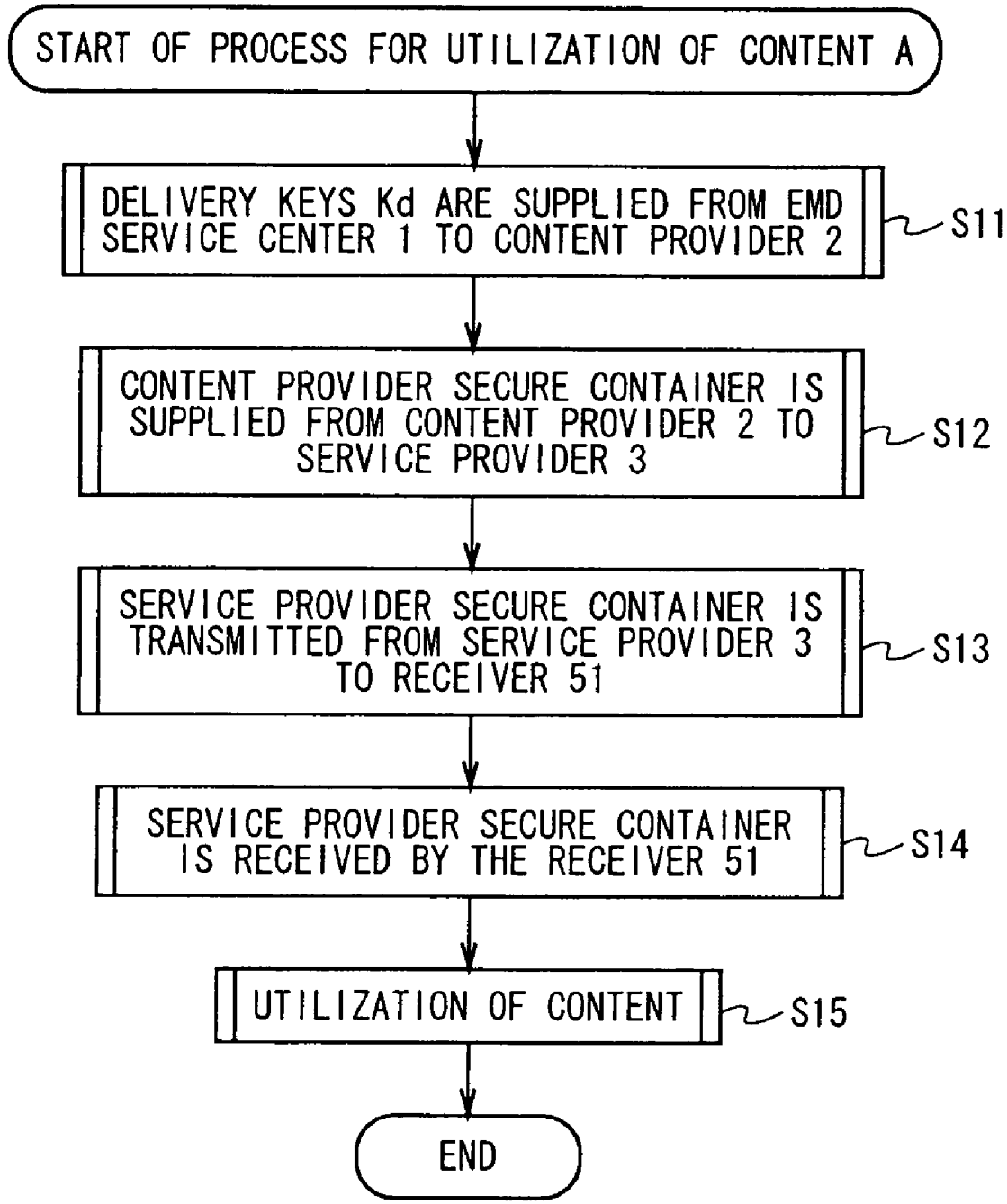
FIG. 38 is a flow chart illustrating process for utilization of content.

When the encryption section 36 of the content provider 2-1 stores the delivery keys Kd, the process of Step S11 finishes and Step S12 in FIG. 38 begins. Before explaining the process of Step S12, the mutual authentication (process of checking for spoofing) in Step S31 of FIG. 39 will be described, taking the case in which one common key is used (FIG. 40), the case in which two common keys are used (FIG. 41), and the case in which a public key is used (FIG. 42).

Figure 40:
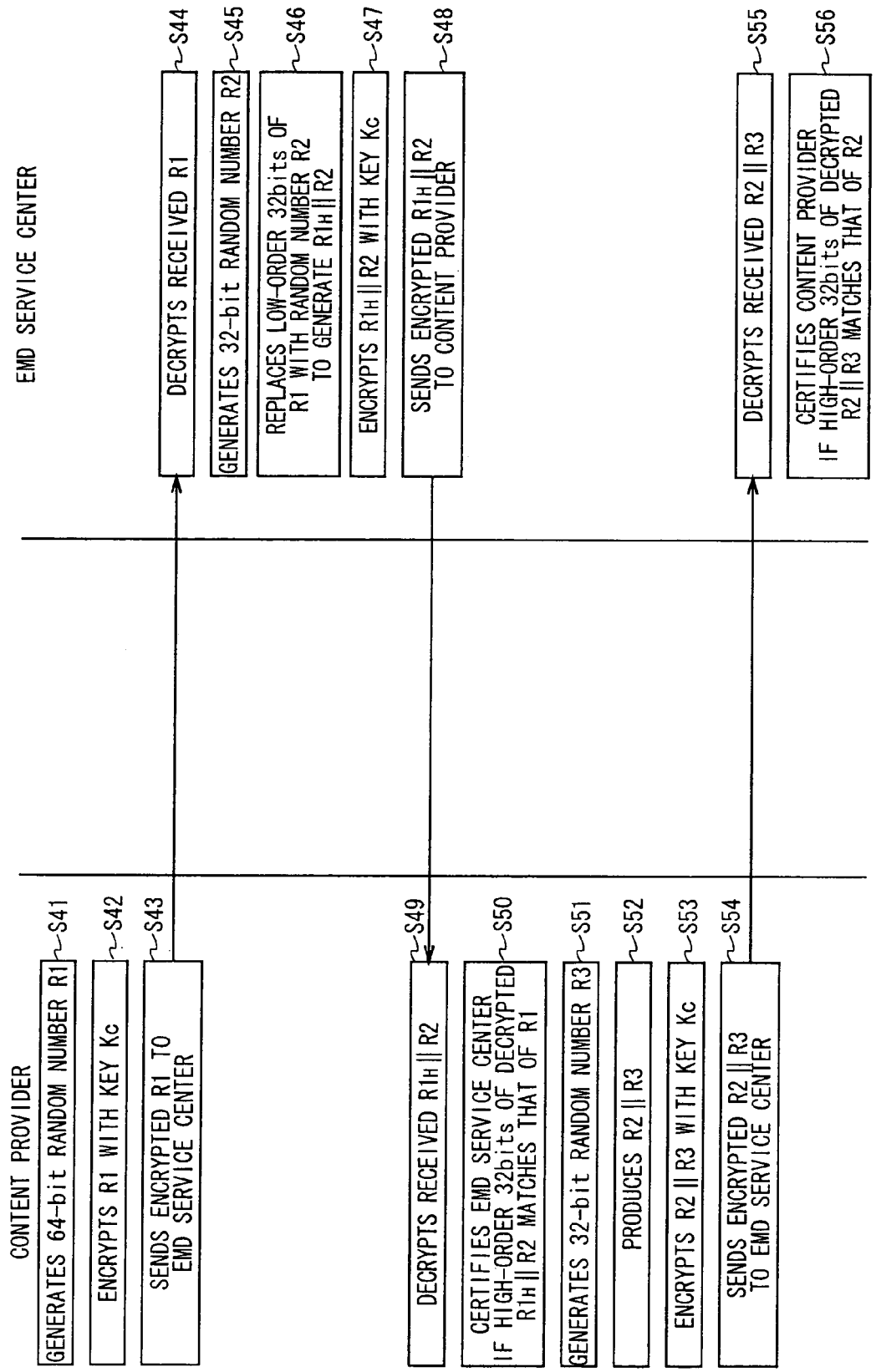
FIG. 40 is a flow chart illustrating a flow of mutual authentication between the content provider 2 and EMD service center.

FIG. 40 is a flow chart which describes the use of one common key in common-key DES cryptography for the operation of mutual authentication between the mutual authentication section 39 of the content provider 2 and mutual authentication section 17 of the EMD service center 1. In Step S41, the mutual authentication section 39 of the content provider 2 generates a 64-bit random number R1 (it may also be generated by the random number generator section 35). In Step S42, the mutual authentication section 39 of the content provider 2 DES-encrypts the random number R1 with a prestored common key Kc (it is also possible to make the encryption section 36 perform the encryption). In Step S43, the mutual authentication section 39 of the content provider 2 sends the encrypted random number R1 to the mutual authentication section 17 of the EMD service center 1.

In Step S44, the mutual authentication section 17 of the EMD service center 1 decrypts the received random number R1 with a prestored common key Kc. In Step S45, the mutual authentication section 17 of the EMD service center 1 generates a 32-bit random number R2. In Step S46, the mutual authentication section 17 of the EMD service center 1 replaces the low-order 32 bits of the decrypted 64-bit random number R1 with the random number R2 to generate a concatenation $R1_H \| R2$, where $Ri_H$ is the high order n bits of Ri and $A \| B$ is a concatenation of A and B (the low-order n bits of A and m-bit B are concatenated to produce n+m bits) In Step S47, the mutual authentication section 17 of the EMD service center 1 DES-encrypts $R1_H \| R2$ with the common key Kc. In Step S48, the mutual authentication section 17 of the EMD service center 1 sends the encrypted $R1_H \| R2$ to the content provider 2.

In Step S49, the mutual authentication section 39 of the content provider 2 decrypts the received $R1_H \| R2$ with the common key Kc. In Step S50, the mutual authentication section 39 of the content provider 2 checks the high-order 32 bits of the decrypted $R1_H \| R2$ against the high-order 32 bits $R1_H$ of the random number R1 generated in Step S41, and if they match, it certifies that the EMD service center 1 is legitimate. If the generated $R1_H$ and received $R1_H$ do not match, the process is terminated. If they match, the mutual authentication section 39 of the content provider 2 generates a 32-bit random number R3 in Step S51. In Step S52, the mutual authentication section 39 of the content provider 2 produces a concatenation $R2 \| R3$ by placing the random number R2, which is the low-order 32 bits taken out of the received and decrypted $R1_H \| R2$, in the high-order position and placing the generated random number R3 in the low-order position. In Step S53, the mutual authentication section 39 of the content provider 2 DES-encrypts $R2 \| R3$ with the common key Kc. In Step S54, the mutual authentication section 39 of the content provider 2 sends the encrypted concatenation R2∥R3 to the mutual authentication section 17 of the EMD service center 1.

In Step S55, the mutual authentication section 17 of the EMD service center 1 decrypts the received concatenation R2∥R3 with the common key Kc. In Step S56, the mutual authentication section 17 of the EMD service center 1 checks the high-order 32 bits of the decrypted concatenation R2∥R3 against the random number R2. If they match, it certifies that the content provider 2 is legitimate. If they do not, it terminates the process, determining that the content provider 2 is illegitimate.

Figure 41:
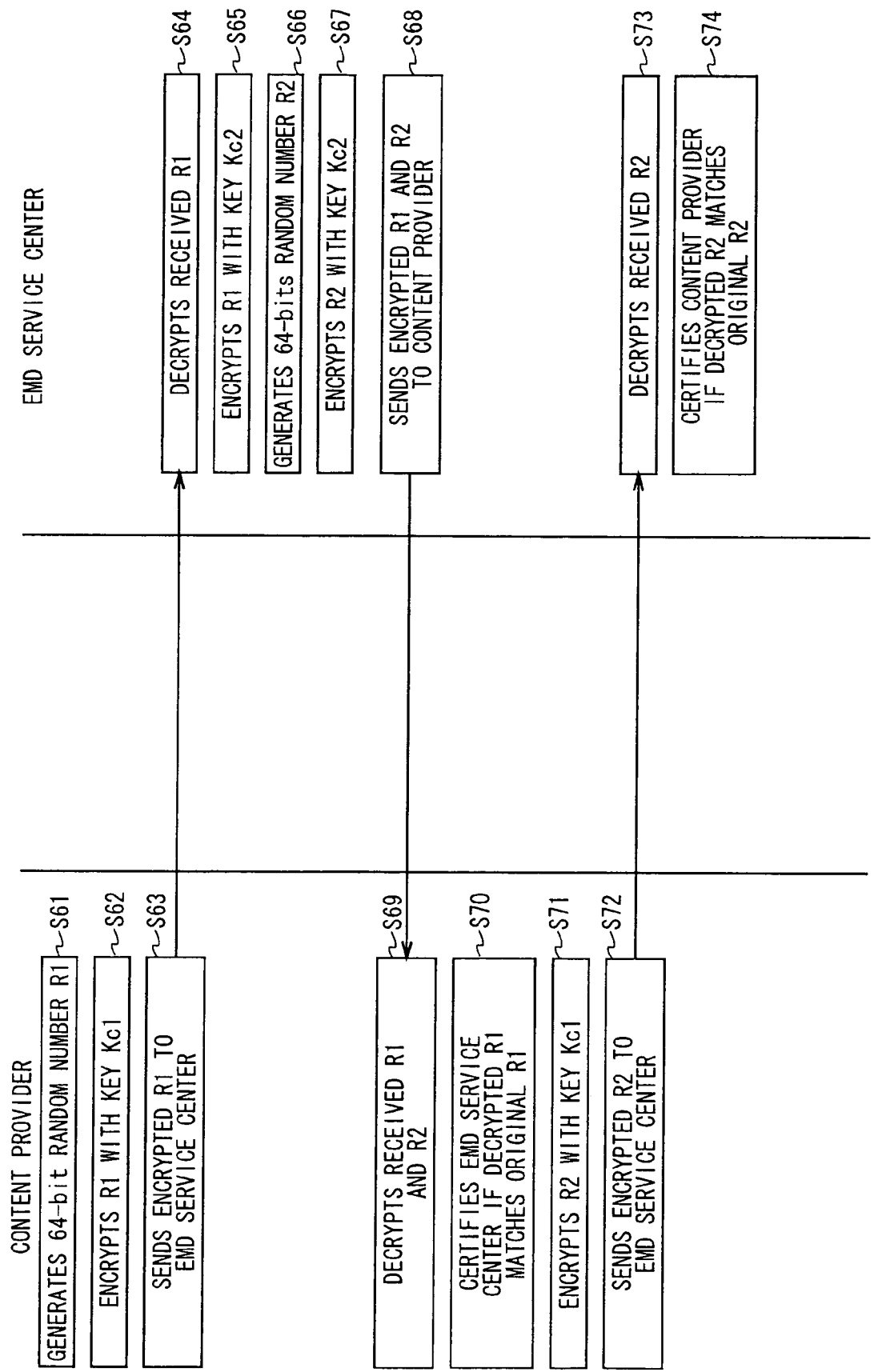
FIG. 41 is a flow chart illustrating another flow of mutual authentication between the content provider 2 and EMD service center 1.
Figure 42:
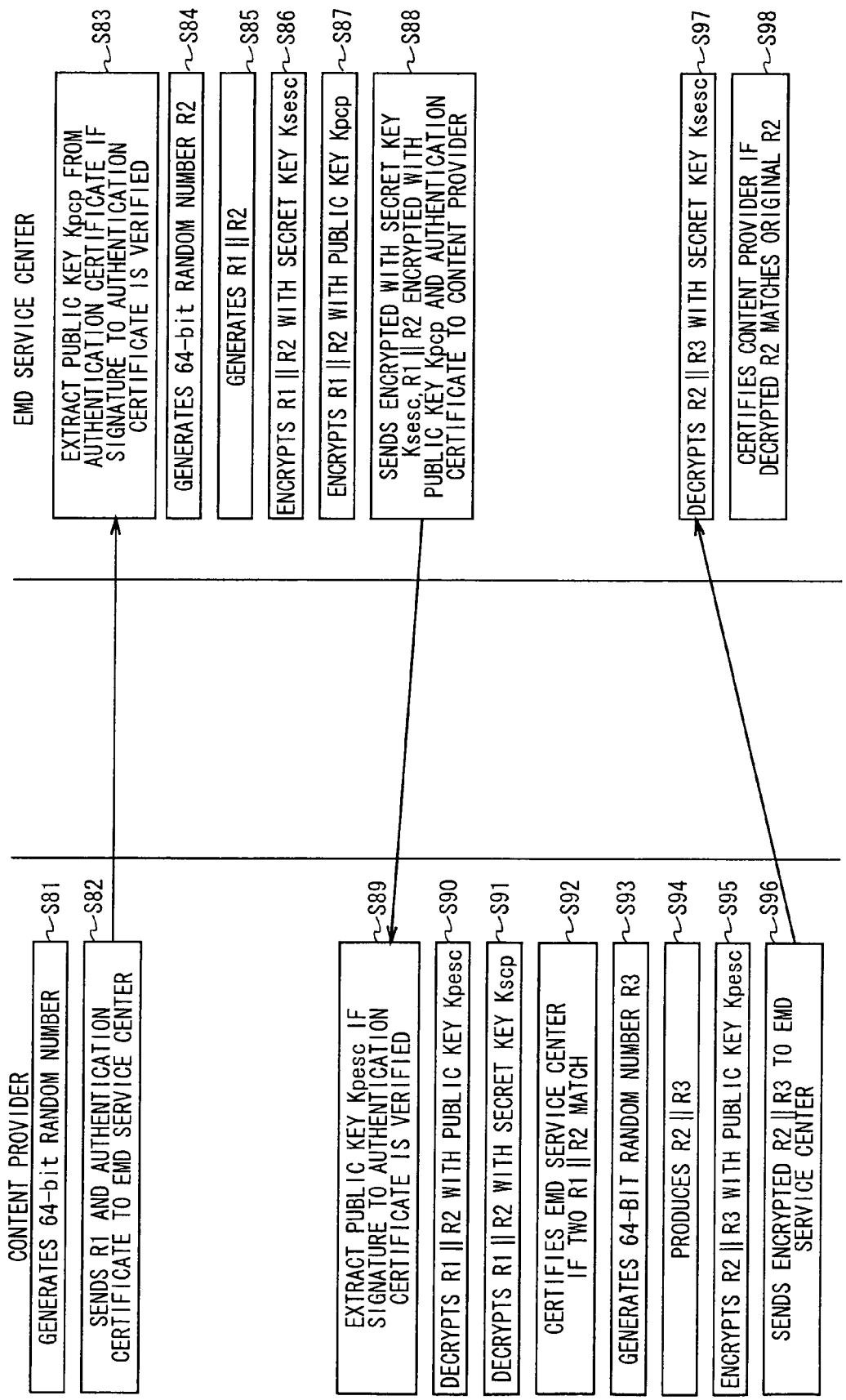
FIG. 42 is a flow chart illustrating another flow of mutual authentication between the content provider 2 and EMD service center 1.

FIG. 41 is a flow chart which describes the use of two common keys Kc1 and Kc2 in common-key DES cryptography for the operation of mutual authentication between the mutual authentication section 39 of the content provider 2 and mutual authentication section 17 of the EMD service center 1. In Step S61, the mutual authentication section 39 of the content provider 2 generates a 64-bit random number R1. In Step S62, the mutual authentication section 39 of the content provider 2 DES-encrypts the random number R1 with a prestored common key Kc1. In Step S63, the mutual authentication section 39 of the content provider 2 sends the encrypted random number R1 to the EMD service center 1.

In Step S64, the mutual authentication section 17 of the EMD service center 1 decrypts the received random number R1 with a prestored common key Kc1. In Step S65, the mutual authentication section 17 of the EMD service center 1 encrypts the random number R1 with a prestored common key Kc2. In Step S66, the mutual authentication section 17 of the EMD service center 1 generates a 64-bit random number R2. In Step S67, the mutual authentication section 17 of the EMD service center 1 encrypts the random number R2 with the common key Kc2. In Step S68, the mutual authentication section 17 of the EMD service center 1 sends the encrypted random numbers R1 and R2 to the mutual authentication section 39 of the content provider 2.

In Step S69, the mutual authentication section 39 of the content provider 2 decrypts the received random numbers R1 and R2 with a prestored common key Kc2. In Step S70, the mutual authentication section 39 of the content provider 2 checks the decrypted random number R1 against the random number R1 generated in Step S61 (the random number R1 before encryption). If they match, it certifies that the EMD service center 1 is legitimate. If they do not match, it terminates the process, determining that the EMD service center 1 is illegitimate. In Step S71, the mutual authentication section 39 of the content provider 2 encrypts the decrypted random number R2 with the common key Kc1. In Step S72, the mutual authentication section 39 of the content provider 2 sends the encrypted random number R2 to the EMD service center 1.

In Step S73, the mutual authentication section 17 of the EMD service center 1 decrypts the received random number R2 with the common key Kc1. In Step S74, the mutual authentication section 17 of the EMD service center 1 checks the decrypted random number R2 against the random number R2 generated in Step S66 (the random number R2 before encryption) If they match, it certifies that the content provider 2 is legitimate. If they do not, it terminates the process, determining that the content provider 2 is illegitimate.

FIG. 42 is a flow chart which describes the use of a 160-bits length elliptic curve in public-key cryptography for the operation of mutual authentication between the mutual authentication section 39 of the content provider 2 and mutual authentication section 17 of the EMD service center 1. In Step S81, the mutual authentication section 39 of the content provider 2 generates a 64-bit random number R1. In Step S82, the mutual authentication section 39 of the content provider 2 sends the random number R1 as well as an authentication certificate (acquired in advance from the certification agency) containing its own public key Kpcp to the mutual authentication section 17 of the EMD service center 1.

In Step S83, the mutual authentication section 17 of the EMD service center 1 decrypts the signature of the received authentication certificate (encrypted with a secret key Ksca of the certification agency) with the secret key Ksca of the certification agency acquired in advance and takes out the hash value of a public key Kpcp of the content provider 2 and a name of the content provider 2. It also takes out the public key Kpcp and name of the content provider 2 contained as plain text in the authentication certificate. If the authentication certificate is a legitimate one issued by the certification agency, it can be decrypted and the resulting hash value of the public key Kpcp and the name of the content provider 2 should match the hash value obtained by the application of a hash function to the public key Kpcp of the content provider 2 and the name of the content provider 2 contained as plain text in the authentication certificate. This proves that the public key Kpcp is the legitimate one that has not been falsified. If the signature cannot be decrypted, or even if it can be, if the hash values do not match, the public key or provider is illegitimate. In that case, the process is terminated.

If the authentication is successful, the mutual authentication section 17 of the EMD service center 1 generates a 64-bit random number R2 in Step S84. In Step S85, the mutual authentication section 17 of the EMD service center 1 generates a concatenation R1∥R2 of the random numbers R1 and R2. In Step S86, the mutual authentication section 17 of the EMD service center 1 encrypts the concatenation R1∥R2 with its own secret key Ksesc. In Step S87, the mutual authentication section 17 of the EMD service center 1 encrypts the concatenation R1∥R2 with the public key Kpcp of the content provider 2 obtained in Step S83. In Step S88, the mutual authentication section 17 of the EMD service center 1 sends the concatenation R1∥R2 encrypted with the secret key Ksesc, the concatenation R1∥R2 encrypted by the public key Kpcp, and authentication certificate (acquired in advance from the certification agency) containing its own public key Kpesc to the mutual authentication section 39 of the content provider 2.

In Step S89, the mutual authentication section 39 of the content provider 2 decrypts the signature of the received authentication certificate with the secret key Kpca of the certification agency acquired in advance, and if it is right, takes out the public key Kpesc from the certificate. This process is the same as in Step S83 and thus description thereof will be omitted. In Step S90, the mutual authentication section 39 of the content provider 2 decrypts the concatenation R1∥R2 encrypted with the secret key Ksesc, by using the public key Kpesc obtained in Step S89. In Step S91, the mutual authentication section 39 of the content provider 2 decrypts the concatenation R1∥R2 encrypted with its own public key Kpcp, by using its own secret key Kscp. In Step S92, the mutual authentication section 39 of the content provider 2 compares the concatenation R1∥R2 decrypted in Step S90 and the concatenation R1∥R2 decrypted in Step S91. If they match, it certifies that the EMD service center 1 is legitimate. If they do not match, it terminates the process, determining that the EMD service center 1 is illegitimate.

If the authentication is successful, the mutual authentication section 39 of the content provider 2 generates a 64-bit random number R3 in Step S93. In Step S94, the mutual authentication section 39 of the content provider 2 generates a concatenation R2∥R3 of the random numbers R2 obtained in Step S90 and the random number R3 generated in Step S93. In Step S95, the mutual authentication section 39 of the content provider 2 encrypts the concatenation R1∥R3 with the public key Kpesc obtained in Step S89. In Step S96, the mutual authentication section 39 of the content provider 2 sends the encrypted concatenation R2∥R3 to the mutual authentication section 17 of the EMD service center 1.

In Step S97, the mutual authentication section 17 of the EMD service center 1 decrypts the encrypted concatenation R2∥R3 with its own secret key Ksesc. In Step S98, the mutual authentication section 17 of the EMD service center 1 checks the decrypted random number R2 against the random number R2 generated in Step S84 (the random number R2 before encryption). If they match, it certifies that the content provider 2 is legitimate. If they do not, it terminates the process, determining that the content provider 2 is illegitimate.

As described above, the mutual authentication section 17 of the EMD service center 1 and the mutual authentication section 39 of the content provider 2 perform mutual authentication. The random numbers used for the mutual authentication are temporary keys Ktemp valid only for the processes subsequent to the given mutual authentication.

(6-2) Transmission of Content from Content Provider to Service Provider

Figure 43:
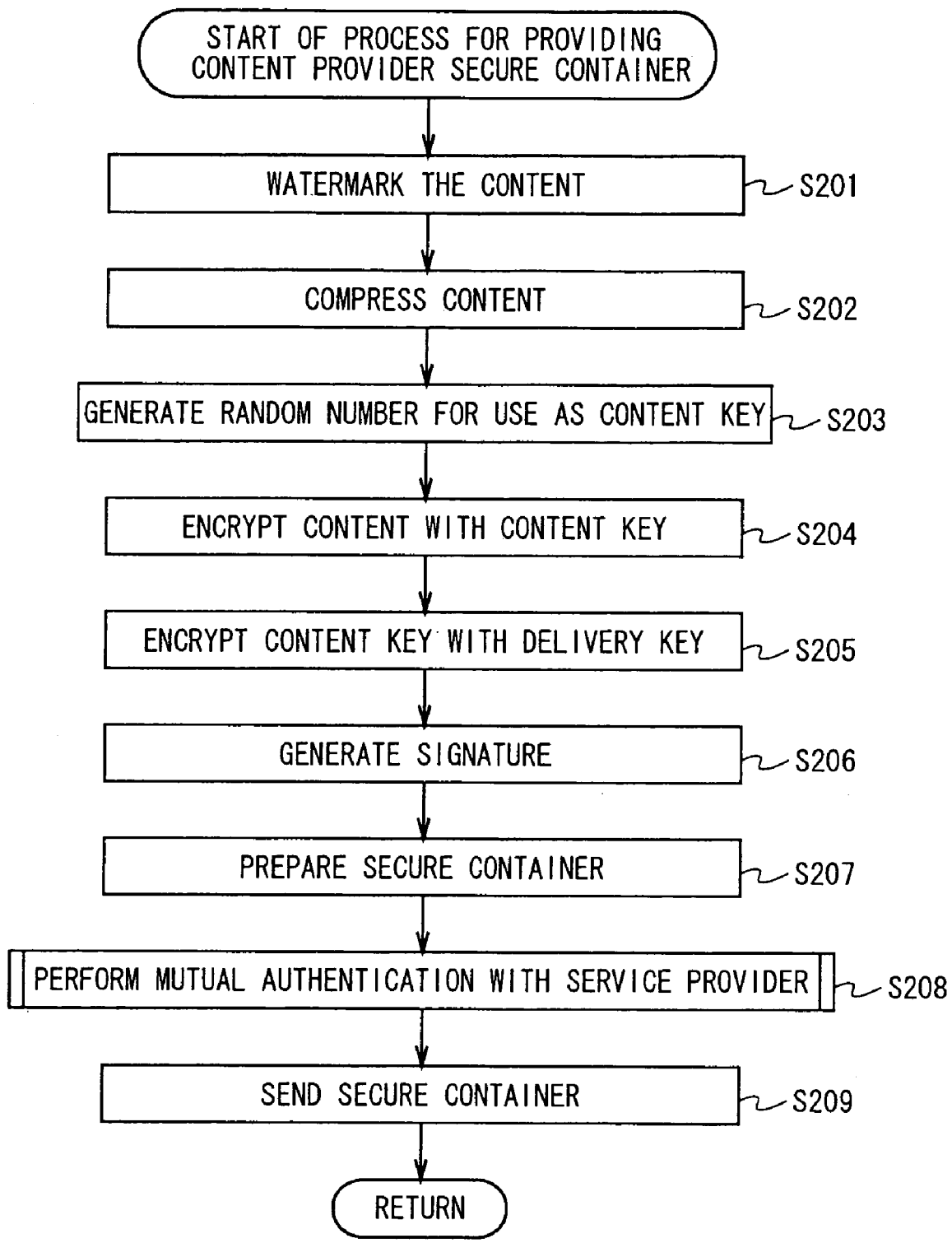
FIG. 43 is a flow chart illustrating the process of sending a content provider secure container from the content provider 2 to the service provider 3.

Now the process of Step S12 in FIG. 38 will be described. In Step S12, the content provider secure container is supplied from the content provider 2-1 to the service provider 3-1. Details of the process is shown in the flow chart of FIG. 43. In Step S201, the watermarking section 32 (FIG. 11) of the content provider 2 reads content A from the content server 31, inserts a predetermined watermark that represents the content provider 2, and supplies content A to the compression section 33.

In Step S202, the compression section 33 of the content provider 2-1 compresses the watermarked content A by a predetermined method such as ATRAC2 and supplies it to the encryption section 34. In Step S203, the random number generator section 35 generates a random number for use as a content key KcoA and supplies it to the encryption section 34.

In Step S204, the encryption section 34 of the content provider 2-1 encrypts the watermarked and compressed content A by a predetermined method such as DES by using the random number (content key KcoA) generated by the random number generator section 35. Then in Step S205, the encryption section 36 encrypts the content key KcoA by a predetermined method such as DES by using the delivery key Kd supplied by the EMD service center 1.

In Step S206, the secure container preparation section 38 of the content provider 2-1 computes a hash value by the application of a hash function to the content A (encrypted with the content key KcoA), content key KcoA (encrypted with the delivery key Kd), and UCP A and UCP B (FIG. 12) for content A that are stored in the policy storage section 37, and encrypts the hash value with its own secret key Ksesc, to generates the signature shown in FIG. 17.

In Step S207, the secure container preparation section 38 of the content provider 2-1 prepares the content provider secure container, shown in FIG. 17, which contains content A (encrypted with the content key KcoA), the content key KcoA (encrypted with the delivery key Kd), UCP A, UCP B (FIG. 12), and the signature generated in Step S206.

In Step S208, the mutual authentication section 39 of the content provider 2-1 performs mutual authentication with the mutual authentication section 45 (FIG. 19) of the service provider 3-1. The process of this mutual authentication is similar to that described with reference to FIGS. 40 to 42 and thus description thereof is omitted. In Step S209, the secure container preparation section 38 of the content provider 2-1 sends the content provider secure container prepared in Step S207 to the service provider 3-1 by attaching the authentication certificate (FIG. 18) issued in advance by the certification agency.

When the content provider secure container is supplied to the service provider 3-1 as described above, the process of Step S12 finishes and Step S13 in FIG. 38 begins.

(6-3) Transmission of Content from Service Provider to Receiver

Figure 44:
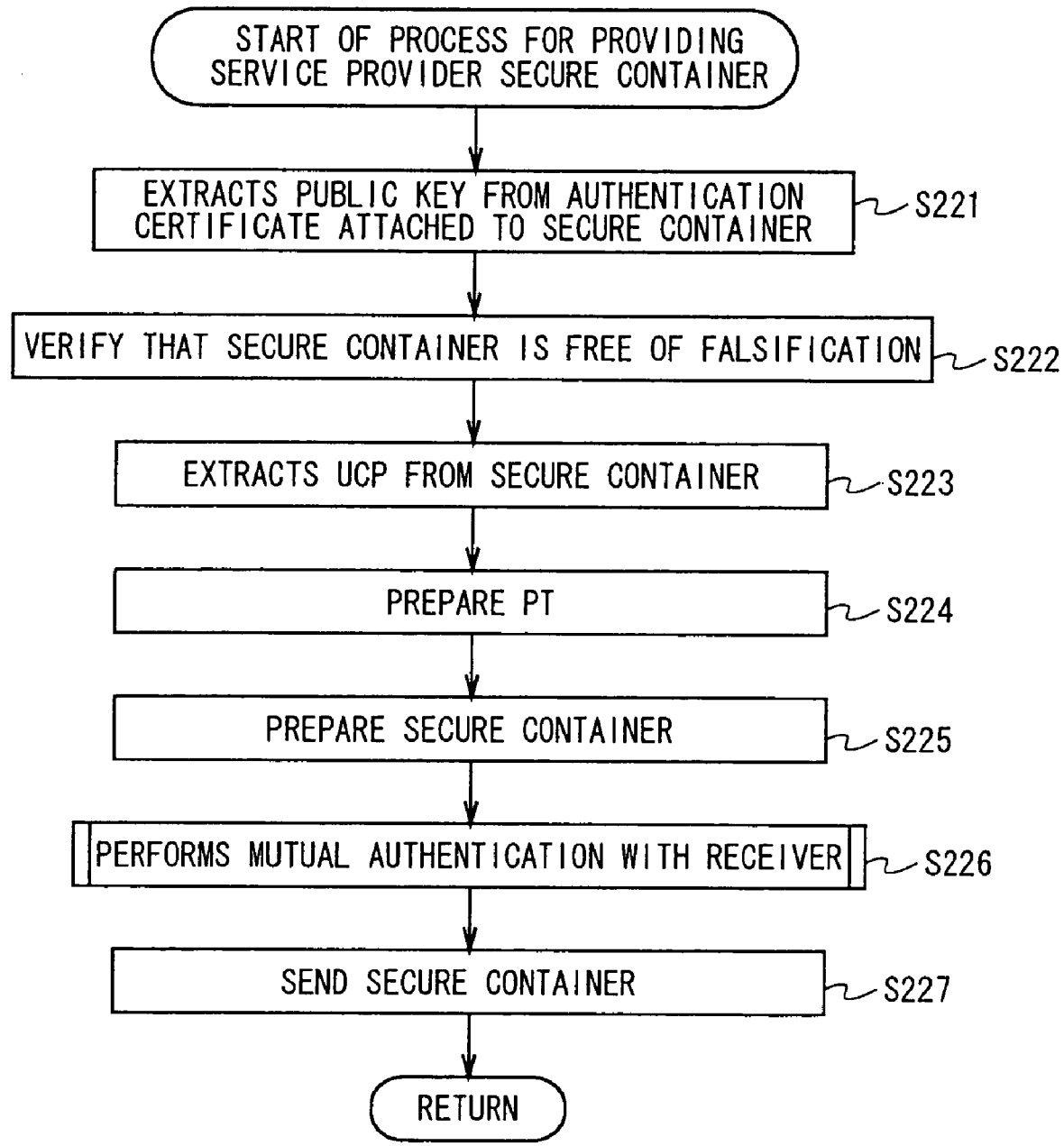
FIG. 44 is a flow chart illustrating the process of sending a service provider secure container from the service provider 3 to the receiver 51.

In Step S13, the service provider secure container is supplied from the service provider 3-1 to the user home network 5 (receiver 51). Details of the process is shown in the flow chart of FIG. 44. In Step S221, the pricing section 42 (FIG. 19) of the service provider 3-1 checks the signature contained in the authentication certificate attached to the content provider secure container sent by the content provider 2-1. If the authentication certificate (FIG. 18) has not been falsified, the pricing section 42 takes the public key Kpcp of the content provider 2-1 out of the authentication certificate. The verification of the authentication certificate is similar to the process of Step S83 in FIG. 42 and thus description thereof is omitted.

In Step S222, the pricing section 42 of the service provider 3-1 decrypts the signature in the content provider secure container sent by the content provider 2-1, by using the public key Kpcp of the content provider 2-1. It checks the content provider secure container for falsification by determining whether the resulting hash value matches the hash value obtained by the application of a hash function to the content A (encrypted with the content key KcoA), content key KcoA (encrypted with the delivery key Kd), and UCP A, UCP B. If the two hash values do not match (falsification is detected) the process is terminated. In this example, however, it is assumed that there is no falsification of the content provider secure container and Step S223 is performed next.

In Step S223, the pricing section 42 of the service provider 3-1 takes content A (encrypted with the content key KcoA), the content key KcoA (encrypted with the delivery key Kd), and the signature out of the content provider secure container and supplies them to the content server 41, which then stores them. Also, the pricing section 42 takes UCP A and UCP B out of the content provider secure container and supplies it to the secure container preparation section 44.

In Step S224, the pricing section 42 of the service provider 3-1 prepares PT A-1, PT A-2 (FIG. 20) and PT B-1, PT B-2 (FIG. 22) based on the extracted UCP A and supplies them to the secure container preparation section 44.

In Step S225, the secure container preparation section 44 of the service provider 3-1 prepares the service provider secure container shown in FIG. 24 from content A (encrypted with the content key KcoA) read from the content server 41, the content key KcoA (encrypted with the delivery key Kd), and UCP A, UCP B, PT A-1, PT A-2, PT B-1, PT B-2 and their signature supplied from the pricing section 42.

In Step S226, the mutual authentication section 45 of the service provider 3-1 performs mutual authentication with the mutual authentication module 71 (FIG. 26) of the receiver 51. The process of this mutual authentication is similar to that described with reference to FIGS. 40 to 42 and thus description thereof is omitted.

In Step S227, the secure container preparation section 44 of the service provider 3-1 sends the service provider secure container 4 prepared in Step S225 to the receiver 51 of the user home network 5 by attaching the authentication certificate (FIG. 25) of the service provider 3-1.

When the service provider secure container is supplied to the receiver 51 by the service provider 3 as described above, the process of Step S13 finishes and Step S14 in FIG. 33 begins.

(6-4) Recording of Content by Receiver

In Step S14, the service provider secure container sent by the service provider 3-1 is received by the receiver 51 of the user home network 5. Details of the process is shown in the flow chart of FIG. 45. In Step S241, the mutual authentication module 71 (FIG. 26) of the receiver 51 performs mutual authentication with the mutual authentication section 45 (FIG. 19) of the service provider 3-1 via the communications block 61. If the mutual authentication is successful, the communications block 61 receives the service provider secure container (FIG. 24) from the service provider 3-1 that participated in the mutual authentication. If the authentication fails, the process is terminated. In this example, however, it is assumed that the mutual authentication has been successful and Step S242 is performed next.

In Step S242, the communications block 61 of the receiver 51 receives an authentication certificate of the secret key from the service provider 3-1 that participated in the mutual authentication.

In Step S243, the encryption/decryption module 74 of the receiver 51 checks the signature contained in the service provider secure container for falsification received in Step S241. If falsification is detected, the process is terminated. In this example, however, it is assumed that there is no falsification and Step S224 is performed next.

In Step S244, the UCPs that satisfy the usage conditions and the PTs that satisfy the pricing conditions are selected, based on the reference information 51 (FIG. 32) stored in the memory module 73 of the receiver 51, and displayed on the display unit (not shown) through the display controller 67. The user selects the usage details of one of the UCPs by manipulating the operator panel (not shown) with reference to the details of the UCPs and PTs displayed. Then, the input controller 68 outputs, to SAM 62, the signals that correspond to the user operation input from the operator panel.

In this example, "Use Point Information" of the reference information 51 indicates that content use point of the content provider 2-1 counts 222 points as shown in FIG. 33. According to this reference information 51, out of UCP A and UCP B set in accordance with the content A, UCP A which shows "User Conditions 10" of "Usage Conditions 10" contains '200 Points or Higher' is selected. Besides, since "Account-Settling User Information" of the reference information 51 has set the user F as 'Male', "Pricing Conditions 10" of PT A-1 (FIG. 20A) are satisfied. Therefore, in this example, out of PT A-1 and PT A-2 prepared in accordance with UCP A, PT A-1 is selected and details of UCP A and PT A-1 are displayed on the display unit. Also, in this example, as above, the user F has selected usage details 11 of UCP A (price 11 of PT A-1)

In Step S245, the accounting module 72 of SAM 62 of the receiver 51 prepares UCS A (FIG. 28) and accounting information A (FIG. 30), based on the entry of "Usage Details 11" of UCP A (entries of "Usage Details 11" of UCP A-1) selected in Step S244. This means that, in this case, the content A is purchased and reproduced for 2000 yen.

In Step S246, content A (encrypted with the content key KcoA), UCP A, PT A-1, PT A-2, and the signature of the content provider 2 are taken out of the service provider secure container, output to the HDD 52, and stored there. In Step S247, the decryption unit 91 of the encryption/decryption unit 74 decrypts the content key KcoA (encrypted with the delivery key Kd) contained in the service provider secure container, with the delivery key Kd stored in the memory module 73.

In Step S248, the encryption unit 93 of the encryption/decryption unit 74 encrypts the content key KcoA decrypted in Step S247, by means of the save key Ksave stored in the memory module 73.

In Step S249, the data check module 75 of SAM 62 searches the usage information storage 63A (FIG. 29) of the external storage 63 for the block BP which has free space and in which the content key KcoA encrypted with the save key Ksave in Step S248 and UCS A prepared in Step S245 are stored in matching pairs. In this example, block BP-1 of the usage information storage 63A in FIG. 29 is detected. Incidentally, in the usage information storage 63A of FIG. 22, the usage information memory area RP-3 of the block BP-1 is shown to already store the content key KcoA and UCS A. In this example, however, they are not stored at this point and the usage information memory area RP-3 of the block BP-1 is free, containing predetermined initial information.

In Step S250, the data check module 75 of the receiver 51 obtains a hash value by applying a hash function to the block BP-1 data (all the data stored in the usage information memory areas RP-1 to RP-N) detected in Step S249. Then in Step S251, the data check module 75 compares the hash value obtained in Step S250 with the verification value HP-1 (FIG. 31) that is stored in the memory module 73 and that corresponds to block BP-1. If they match, the block BP-1 data is free of falsification and Step S252 is performed next.

In Step S252, SAM 62 of the receiver 51 stores the usage information (the content key KcoA encrypted with the save key Ksave in Step S248 and UCS A (FIG. 28) prepared in Step S245) in the usage information memory area RP-3 of the block BP-1 in the usage information storage 63A (of the external storage 63) as shown in FIG. 29.

In Step S253, the data check module 75 of the receiver 51 computes a hash value by applying a hash function to the block BP-1 data in the usage information storage 63A, including the usage information stored in the usage information memory area RP-3 in Step S252. In Step S254, the data check module 75 overwrites the verification value HP-1 stored in the memory module 73 with the hash value. In Step S255, the accounting module 72 stores, in the memory module 73, the accounting information A prepared in Step S245, and the process finishes.

In Step S251, if the data check module 75 determines that the computed hash value and the verification value HP-1 do not match, the block BP-1 data has been falsified. Consequently, the data check module 75 goes to Step S256, where it determines whether all the blocks BP in the usage information storage 63A of the external storage 63 have been checked. If it determines that not all the blocks BP in the external storage 63 have been checked, it goes to Step S257 and searches for unchecked blocks (other blocks with free space), returns to Step S250, where the rest of the process is executed.

In Step S256, if the data check module 75 determines that all the blocks BP in the usage information storage 63A of the external storage 63 have been checked, there is no block BP (usage information memory area RP) that can store usage information. Consequently, the process finishes.

When the service provider secure container is thus received by the receiver 51, the process of Step. S14 finishes and Step S15 in FIG. 38 begins.

(6-5) Reproduction of Content

Figure 46:
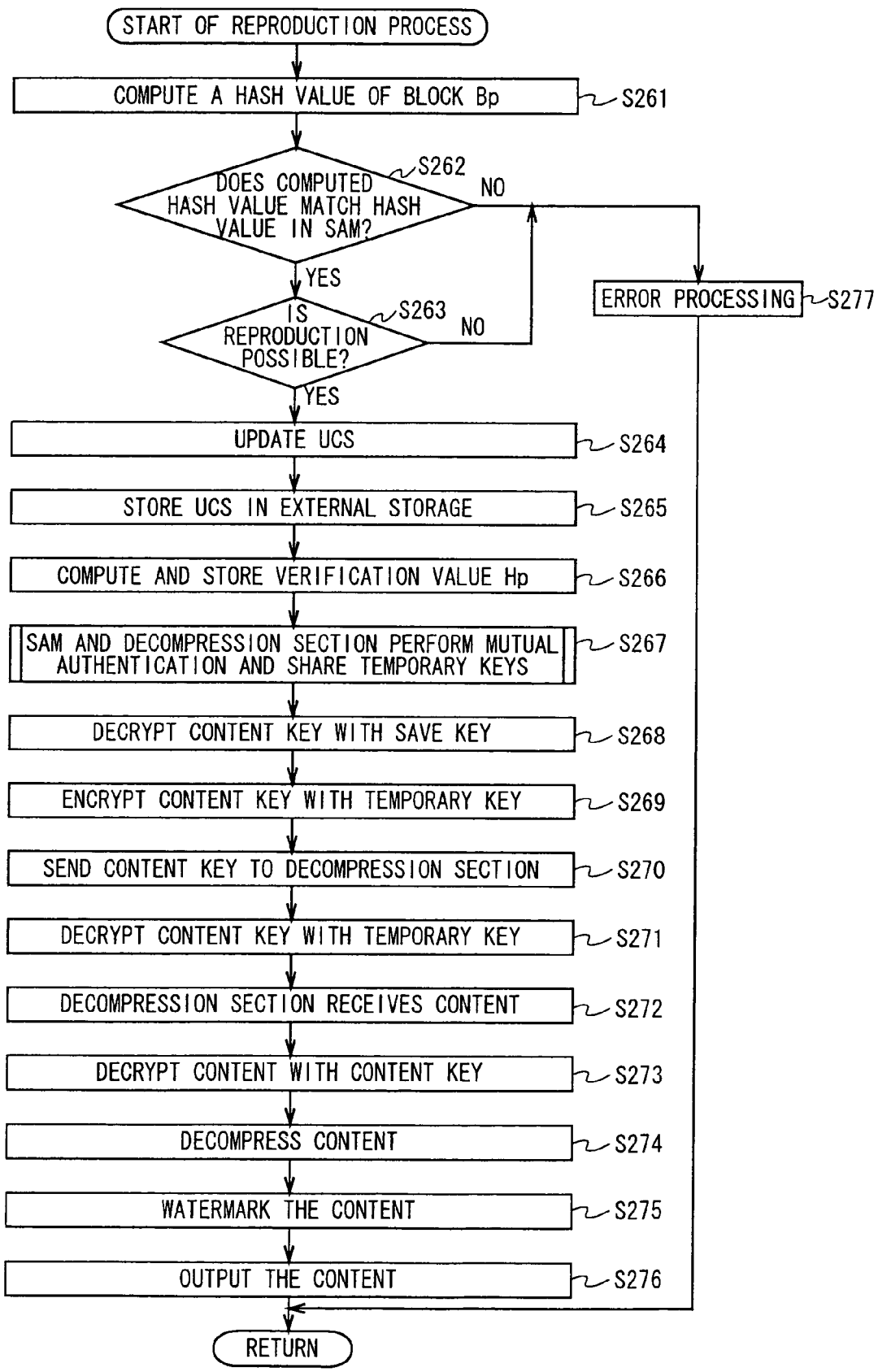
FIG. 46 is a flow chart illustrating the process in which the receiver 51 reproduces content.

In Step S15, the contents A supplied is used by the receiver 51. In this example, according to the usage details 11 of UCP A selected in Step S224 of FIG. 40, the usage type of content A is reproduction. Thus, reproduction of content A will be described next. Details of the reproduction is shown in the flow chart of FIG. 46.

Figure 45:
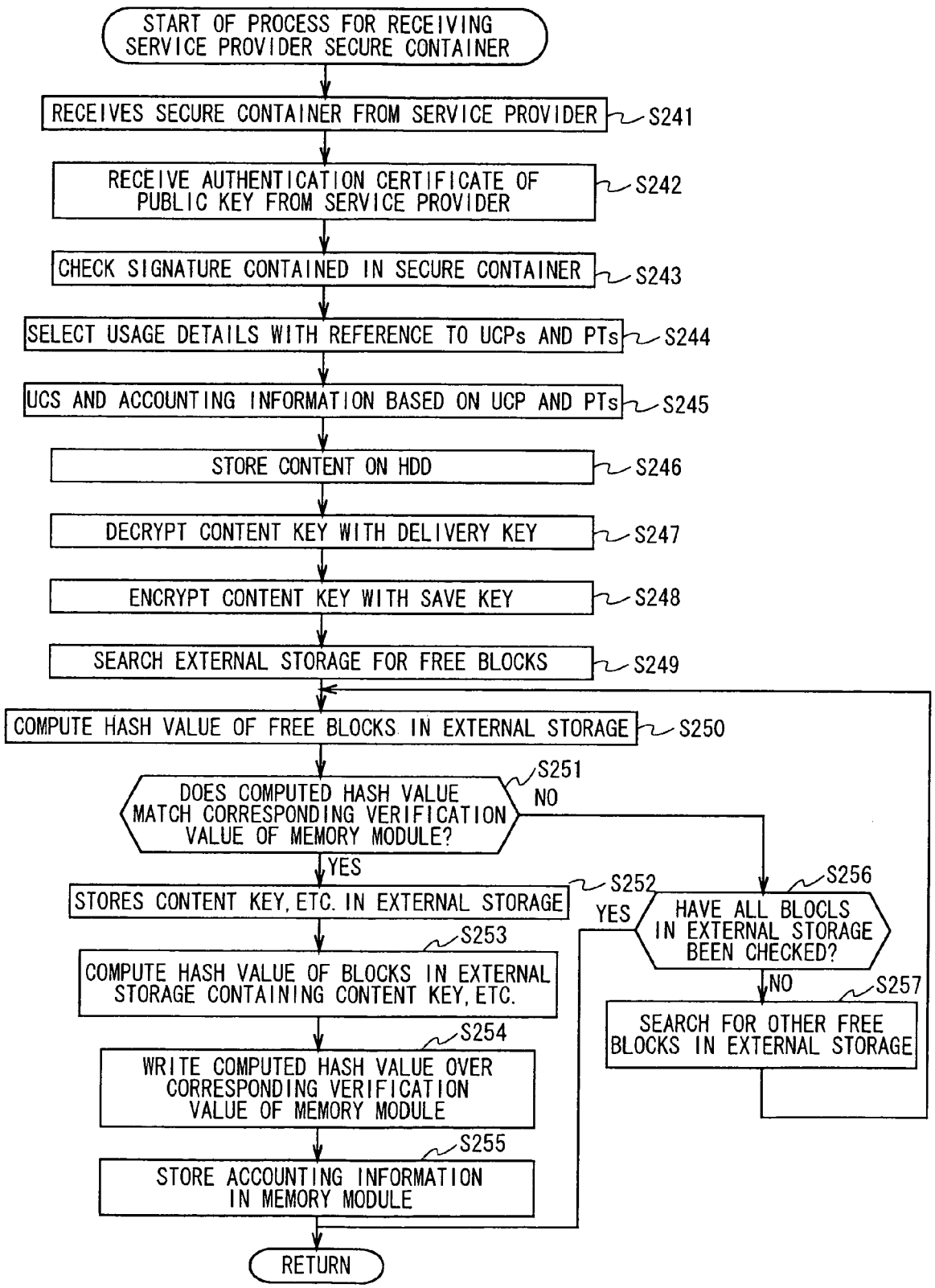
FIG. 45 is a flow chart illustrating the process in which the receiver 51 receives the service provider secure container.

In Step S261, the data check module 75 of the receiver 51 computes a hash value by applying a hash function to the block BP-1 data in the usage information storage 63A of the external storage 63, including the content key KcoA (encrypted with the save key Ksave) and UCS A stored in the usage information memory area RP-3 in Step S252 of FIG. 45.

In Step S262, the data check module 75 of the receiver 51 compares the hash value computed in Step S261 with the hash value (verification value HP-1) computed in Step S253 of FIG. 45 and stored in the memory module 73 in Step S254. If they match, the block BP-1 data is free of falsification and Step S263 is performed next.

In Step S263, it is determined whether contents A is available, based on the information contained in "Parameter" of "Usage Details" for UCS A (FIG. 28). For example, as "Type" of "Usage Details" for UCS is set to 'Limited-Time Reproduction,' "Parameter" of the UCS stores the start time and end time of usage. And it is determined whether the present time is within the limits. That is, if the present time is within the limits, the content is judged to be available and if it is not within the limits, the content is judged to be unavailable. On the other hand, if "Type" of "Usage Details" for UCS is set to a use type that allows reproduction (duplication) up to a certain number of times, "Parameter" stores the information about the remaining number of times the content can be used. If the available number of times stored in "Parameter" is not zero (0), the corresponding content is judged to be available. On the other hand, if the available number of times is zero (0), the corresponding content is judged to be unavailable.

Since "Type" of "Usage Details" for UCS A is set to 'Purchase and Reproduce,' in this example, the content A is purchased and reproduced without limit. Therefore, "Parameter" of "Usage Details" of UCS A contains information that content is available. And thus in this example, in Step S263, contents A is judged to be available. Consequently, Step S264 is performed next.

In Step S264, the accounting module 72 of the receiver 51 updates UCS A. Although UCS A does not contain any information that should be updated, the available number of times stored in "Parameter" is decremented by 1 if "Type" of "Usage Details" is set to a use type that allows reproduction up to a certain number of times.

Next, in Step S265, the SAM 62 of the receiver 51 stores the UCS A updated in Step S264 (not actually updated in this example) in the usage information memory area RP-3 of the block BP-1 in the usage information storage 63A of the external storage 63. In Step S266, the data check module 75 computes a hash value by applying a hash function to the block BP-1 data in the usage information storage 63A of the external storage 63, including the UCS A stored in Step S265 and overwrites the verification value HP-1 stored in the memory module 73 with the hash value.

In Step S267, the mutual authentication module 71 of SAM 62 and mutual authentication module 101 of the decompression section 64 perform mutual authentication and share temporary keys Ktemp. The process of this mutual authentication is similar to that described with reference to FIGS. 40 to 42 and thus description thereof is omitted.

The random numbers R1, R2, and R3, or their combinations used for the mutual authentication are stored as temporary keys Ktemp.

In Step S268, the decryption unit 91 of the encryption/decryption module 74 decrypts the content key KcoA (encrypted with the save key Ksave) stored in block BP-1 (the usage information memory area RP-3) in the usage information storage 63A of the external storage 63 in Step S252 of FIG. 45, by using the save key Ksave stored in the memory module 73.

Next, in Step S269, the encryption unit 93 of the encryption/decryption module 74 encrypts the decrypted content key KcoA, by using the temporary key Ktemp. In Step S270, SAM 62 sends the encrypted content key KcoA encrypted with the temporary key Ktemp to the decompression section 64.

In Step S271, the decryption module 102 of the decompression section 64 decrypts the content key KcoA by using the temporary key Ktemp. In Step S272, the decompression section 64 receives the content A (encrypted with the content key Kco) recorded on the HDD 52 through the interface 66. In Step S273, the decryption module 103 of the decompression section 64 decrypts content A (encrypted with the content key Kco) with the content key KcoA.

In Step S274, the decompression module 104 of the decompression section 64 decompresses the decrypted content A by a predetermined method such as ATRAC2. In Step S275, the watermarking module 105 of the decompression section 64 watermarks the decompressed content A for identification of the receiver 51. In Step S276, content A is output to speakers or the like (not shown) and the process finishes.

In Step S277, if it is determined in Step S262 that the hash value computed in Step S261 and the hash value stored in the memory module 73 of the receiver 51 do not match, or if the content is judged to be unavailable in Step S263, SAM 62 runs predetermined error processing to display an error message on the display unit (not shown) through the display controller 67 and the process finishes.

In this way, when content A is reproduced (used) on the receiver 51, the process finishes, and so does the entire process in FIG. 38.

(6-6) Account Settlement

Figure 47:
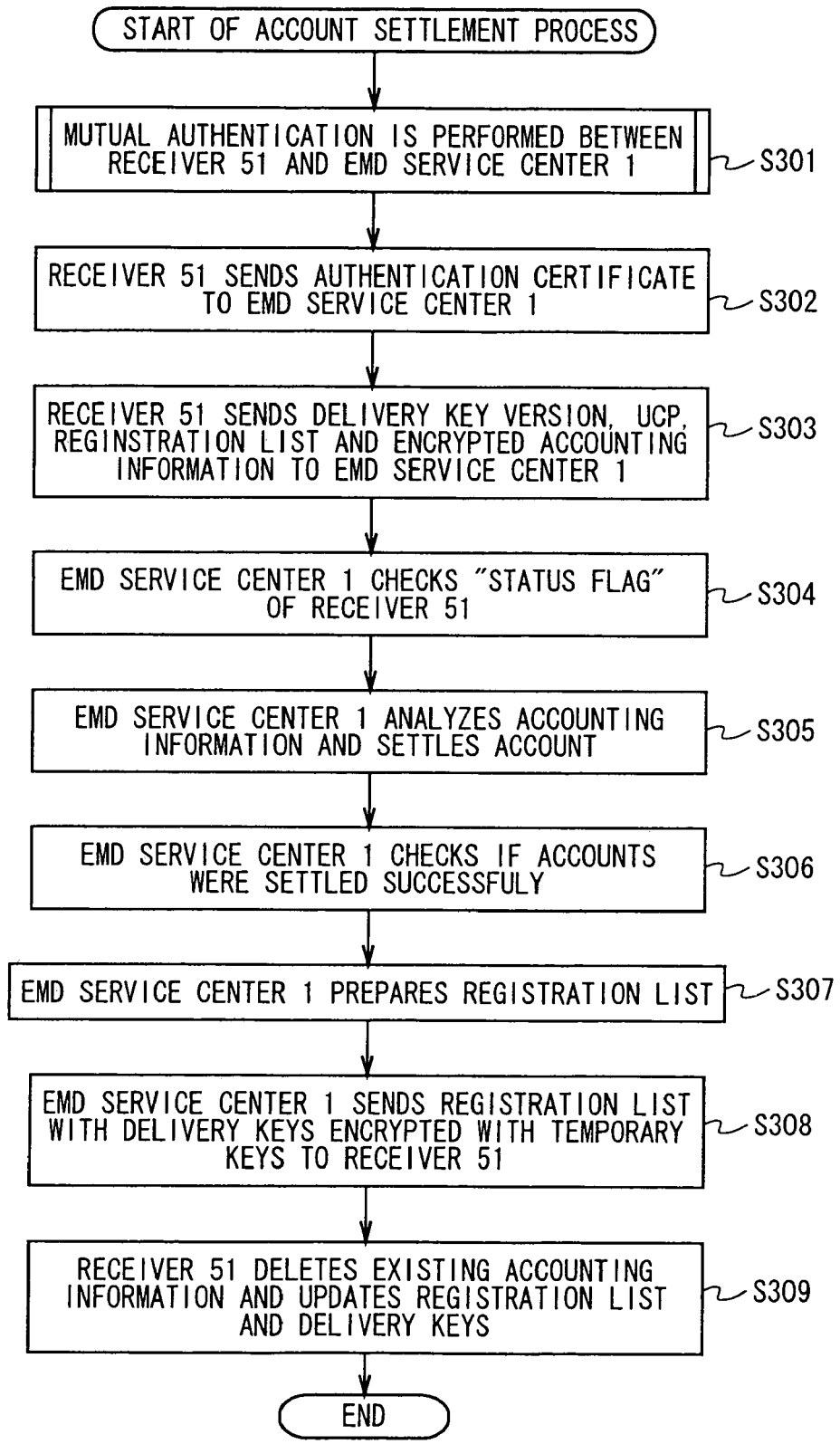
FIG. 47 is a flow chart illustrating an account settlement process.

Now the processing procedures for settling accounts with the receiver 51 will be described with reference to the flow chart in FIG. 47. This process is started when the amount posted exceeds a preset ceiling (the limit charge for formal or temporary registration), or if the version of delivery keys Kd becomes obsolete, making it impossible, for example, to decrypt the content key Kco (encrypted with the delivery key Kd) in Step S247 of FIG. 45 (and thus impossible to receive the service provider secure container).

In Step S301, mutual authentication is performed between the receiver 51 and EMD service center 1. This mutual authentication is similar to that described with reference to FIGS. 40 to 42 and thus description thereof is omitted.

Next, in Step S302, SAM 62 of the receiver 51 sends an authentication certificate to the user management section 18 (FIG. 3) of the EMD service center 1. In Step S303, SAM 62 of the receiver 51 encrypts the accounting information stored in the memory module 73, by means of the temporary key Ktemp shared with the EMD service center 1 in Step S301, and sends it to the EMD service center 1 together with the version of delivery keys Kd, UCP and PTs, and registration list stored in the HDD 52.

In Step S304, after the information sent by the receiver 51 in Step S303 is received and decrypted, the user management section 18 of the EMD service center 1 checks the receiver 51 for any illegal act that would make "Status Flag" in the registration list to be set to 'Stop.'

In Step S305, the billing section 19 of the EMD service center 1 analyzes the accounting information received in Step S303 to calculate the amounts to be charged to the user (for example, user F). Then, in Step S306, the user management section 18 checks to see if the accounts were settled successfully in Step S305.

Next, in Step S307, the user management section 18 of the EMD service center 1 sets the registration conditions of the receiver 51 based on the results of checks run in Steps S304 and S306, and attaches a signature to it to prepare a registration list of the receiver 51.

For example, if an illegal act is detected in Step S304, the "Status Flag" is set to 'Stop,' which stops all the subsequent processes. In short, the receiver 51 can no longer receive any service from the EMD system. On the other hand, if it is confirmed that the settlement has failed in Step S306, "Status Flag" is set to 'Restricted,' in which case, the receiver 51 can no longer purchase any new content although it can reproduce already purchased content.

Next, the account settlement process goes to Step S308, where the user management section 18 of the EMD service center 1 encrypts the latest version of delivery keys Kd (the latest three months' delivery keys Kd) and the registration list prepared in Step S307, by using the temporary key Ktemp, and sends the results to the receiver 51. The registration list does not need to be encrypted because of its attached signature.

In Step S309, SAM 62 of the receiver 51 receives the delivery keys Kd and registration list sent by the EMD service center 1, through the communications block 61, decrypts them, and stores them in the memory module 73 and the HDD 52 stores the registration list. At the same time, the accounting information stored in the memory module 73 is deleted and the registration list and delivery keys Kd are updated.

(6-7) Setting of Control Transfer

Figure 48:
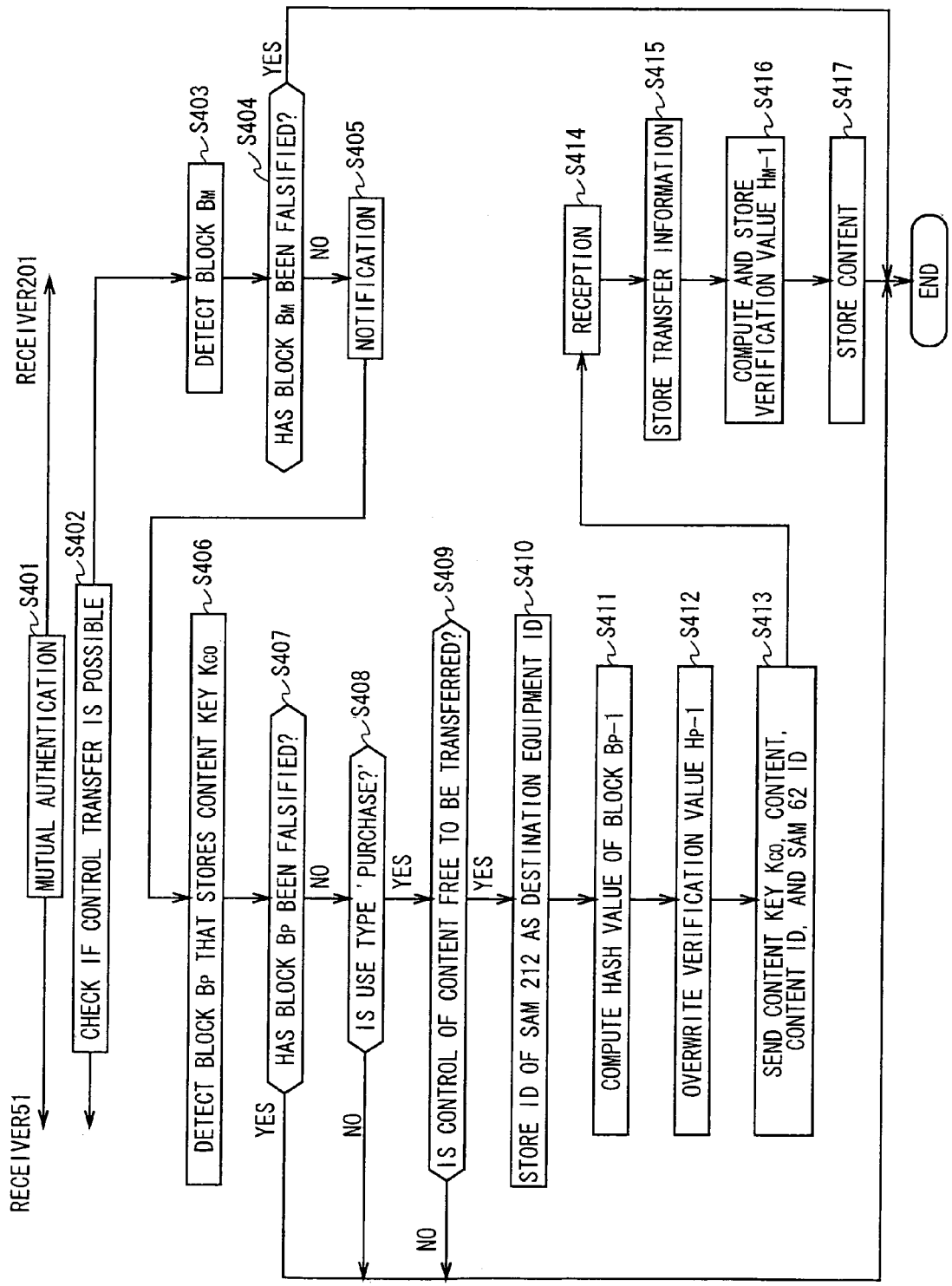
FIG. 48 is a flow chart illustrating the process of control transfer of content.

Now the processing procedures used when the control of content A is transferred from the receiver 51 to the receiver 201 will be described with reference to the flow chart in FIG. 48.

In Step S401, mutual authentication is performed between receivers 51 and 201. This mutual authentication is similar to that described with reference to FIGS. 40 to 42 and thus description thereof is omitted.

Next, in Step S402, SAM 62 of the receiver 51 (source equipment of control transfer) and SAM 212 of the receiver 201 (destination equipment of control transfer) checks whether control transfer of content is possible, referring to their own registration lists. Specifically, SAM of the source equipment (SAM 62 of the receiver 51) checks whether the registration conditions of the destination equipment (receiver 201) are contained in its own registration list. If they are, it judges that control transfer of content is possible. Similarly, SAM of the destination equipment (SAM 212 of the receiver 201) checks whether the registration conditions of the source equipment (receiver 51) are contained in its own registration list. If they are, it judges that control transfer of content is possible. If either side judges that control transfer of content is impossible, the process is terminated. In this example, however, the registration lists of both receivers contain the registration conditions of both receivers. Consequently, both sides judge that control transfer of content is possible and the process goes to Step S403.

Next, in Step S403, the data check module 225 of the receiver 201 searches the transfer information storage 213A (FIG. 36) of the external storage 213 for the block BM that stores the transfer information (content key KcoA encrypted with a save key Ksave, ID of content A, and ID of SAM 62) received in Step S414 described later. In this example, block BM-1 is detected in Step S403. Incidentally, in the transfer information storage 213A of FIG. 36, the transfer information memory area RM-1 of block BM-1 is shown to already store the content key KcoA, ID of content A, and ID of SAM 62. In this example, however, they are not stored at this point and the transfer information memory area RM-1 is free.

In Step S404, the data check module 225 of the receiver 201 checks the block BM-1 data detected in Step S403 for falsification. Specifically, the data check module 225 computes a hash value by applying a hash function to the data stored in the block BM-1, and checks if the hash value matches the verification value HM-1 that is stored in the memory module 223 and that corresponds to the block BM-1. If they match, the block BM-1 is judged to be free of falsification and the process goes to Step S405.

In Step S405, SAM 212 of the receiver 201 sends a signal to the receiver 51 through the communications the block 215, indicating that control transfer of content is possible.

In Step S406, when the receiver 51 receives the signal from the receiver 201, indicating that control transfer of content is possible, the data check module 75 of the receiver 51 detects the block BP-1 that is located in the usage information storage 63A (FIG. 29) of the external storage 63 and that stores the content key KcoA corresponding to the content A whose control is to be transferred.

In Step S407, the data check module 75 of the receiver 51 checks the block BP-1 data detected in Step S406 for falsification. Specifically, the data check module 75 computes a hash value by applying a hash function to all the data stored in the block BP-1. Then, the data check module 75 checks if the computed hash value matches the verification value HP-1 (hash value computed in Step S253 and stored in Step S254 of FIG. 45) that is stored in the memory module 73 and that corresponds to the block BP-1. If they are proved to be identical, i.e., the block BP-1 data is free of falsification, Step S408 is performed next.

In Step S408, SAM 62 of the receiver 51 checks whether the use type of the content is. 'Purchase and Reproduce,' referring to "Type" in "Usage Details" of UCS A (FIG. 28) which is stored in the block BP-1 (the usage information memory area RP-3) detected in Step S406 in the usage information storage 63 of the external storage 63. When "Type" in "Usage Details" is set to 'Purchase and Reproduce,' as is the case with UCS A, the use type of the content is judged to be 'Purchase and Reproduce,' and the process goes to Step S409.

In Step S409, SAM 62 of the receiver 51 checks whether its own ID is specified as the ID of destination equipment in "Control Transfer Status." in "Usage Details" of UCS A, i.e., whether the content is under transferred control. If the content is not under transferred control, the process goes to Step S410.

In Step S410, SAM 62 of the receiver 51 specifies the ID of SAM 212 of the receiver 201, which is the destination equipment of this control transfer, as the ID of destination equipment in "Control Transfer Status" in "Usage Details"

of UCS A. Next, in Step S411, the data check module 75 of the receiver 51 computes a hash value by applying a hash function to the data stored in the block BP-1 that stores the UCS A which had the information in "Control Transfer Status" in "Usage Details" changed in Step S410 (the destination equipment ID was changed from the ID of SAM 62 to the ID of SAM 212). In Step S412, the data check module 75 writes the computed hash value over the corresponding hash value HP-1 stored in the memory module 73.

Next, in Step S413, SAM 62 of the receiver 51 decrypts the content key KcoA (encrypted with a save key Ksave) stored in the block BP-1 (the usage information memory area RP-3) of the usage information storage 63A of the external storage 63 by the save key Ksave, encrypts it by the temporary key Ktemp shared with the receiver 201 in Step S401, and sends it together with its own ID (ID of SAM 62) and the ID of content A specified in "Content ID" of UCS A to the receiver 201. In time with the execution of this process, the content A stored in the HDD 52 is also sent to the receiver 201.

In Step S414, the receiver 201 receives the content key KcoA (encrypted with the temporary key Ktemp), ID of SAM 62, and ID of content A from the receiver 51. In Step S415, SAM 212 of the receiver 201 decrypts the received content key KcoA (encrypted with the temporary key Ktemp) with the temporary key Ktemp, encrypts it again with the save key Ksave it possesses, and stores it similarly together with the ID of SAM 62, and the ID of content A, and its own, ID (ID of SAM 212) in the transfer information memory area RM-1 of the block BP-1 detected in Step S403, in the transfer information storage 213A (FIG. 36) of the external storage 213, as shown in FIG. 36.

Next, in Step S416, SAM 212 of the receiver 201 computes a hash value by applying a hash function to the data in the block BM-1 that stored transfer information in Step S415 and that is located in the transfer information storage 213A, and writes it over the verification value HM-1 stored in the memory module 223.

In Step S417, the content supplied by the receiver 51 is stored in the HDD 202.

If it is determined in Step S404 that the block BM-1 data in the transfer information storage 213A of the external storage 213 has been falsified or if it is determined in Step S407 that the block BP-1 data in the usage information storage 63A of the external storage 63 has been falsified, the process is terminated. That is, if the memory area storing transfer information has been falsified or the usage information has been falsified (more precisely, if it is suspected that any of them may have been falsified), no control transfer of content takes place.

The process is also terminated if it is determined in Step S407 that the use type of content A is not 'Purchase and Reproduce' or if it is determined in Step S408 that content A is under transferred control. In short, control transfer of content can take place (is permitted) only in the case of the use type that allows content to be purchased and reproduced. Also, control transfer of content cannot take place further (is not permitted) if the content is under transferred control.

(6-8) Cancellation of Control Transfer

Figure 49:
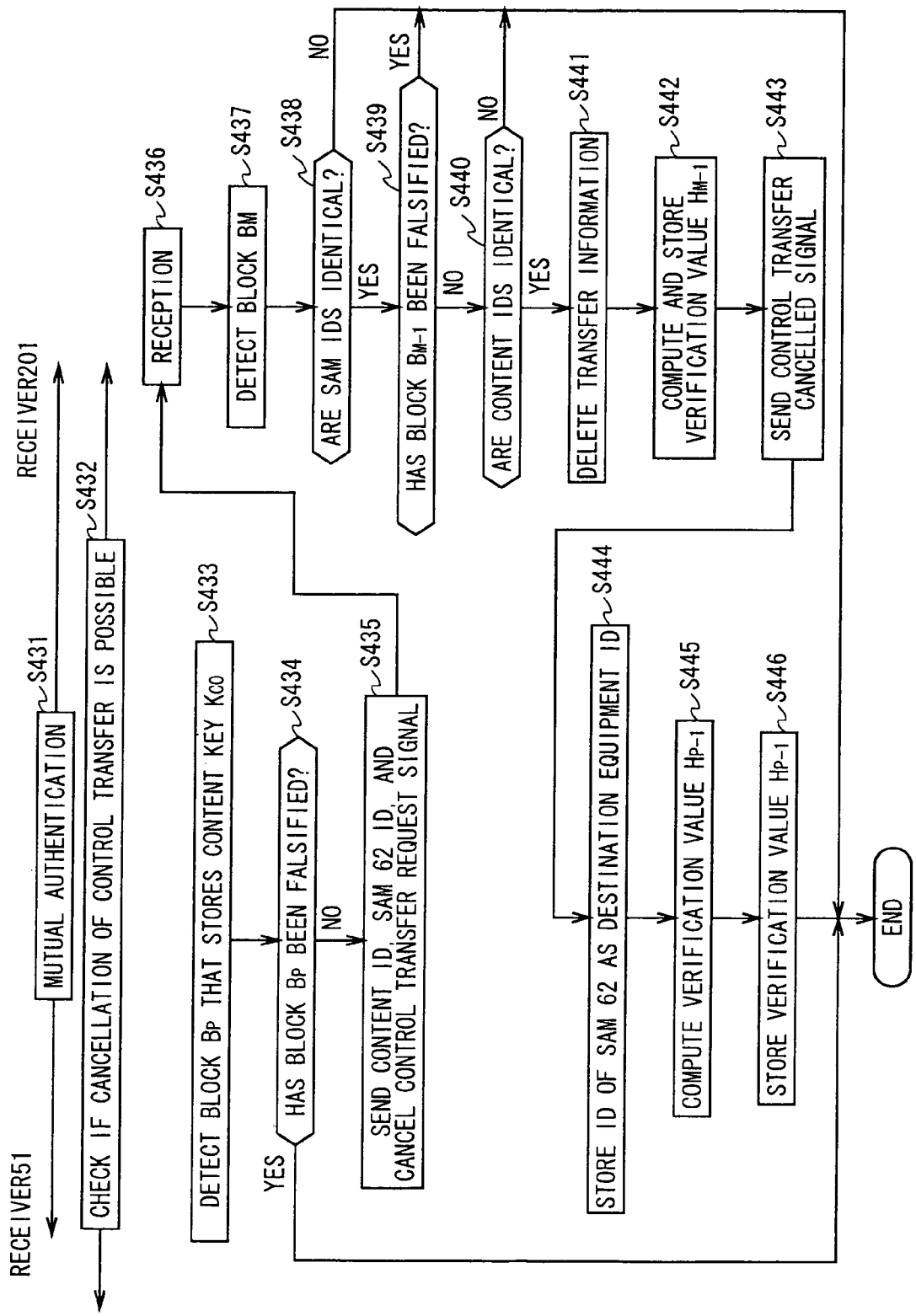
FIG. 49 is a flow chart illustrating the process of terminating control transfer of content.

Now the processing procedures used to return the control of content A to the receiver 51 (cancel the control transfer) after it has been transferred to the receiver 201 following the procedures described above will be described with reference to the flow chart in FIG. 49.

In Step S431, mutual authentication is performed between receivers 51 and 201. This mutual authentication is similar to that described with reference to FIGS. 40 to 42 and thus description thereof is omitted. Next, in Step S432, SAM 62 of the receiver 51 (source equipment of control transfer) and SAM 212 of the receiver 201 (destination equipment of control transfer) checks whether cancellation of the control transfer is possible, referring to their own registration lists. The specific process for that is basically the same as that of Step S402 in FIG. 48 and thus description thereof is omitted.

In Step S433, the data check module 75 of the receiver 51 searches the usage information storage 63A (FIG. 29) of the external storage 63 for the block BP that stores the content key KcoA for the content A (encrypted with the content key KcoA) that is under transferred control. The block BP-1 is detected, in this example.

Next, in Step S434, the data check module 75 of the receiver 51 checks the block BP-1 data detected in Step S433 for falsification. The specific process for that is basically the same as that of Step S407 in FIG. 48 and thus description thereof is omitted.

If the block BP-1 data in the usage information storage 63A of the external storage 63 is judged to be free of falsification in Step S434, the process goes to Step S435. SAM 62 of the receiver 51 reads the ID of SAM 62 and ID of content A from the UCS A (FIG. 28) stored in the block BP-1 of the usage information storage 63A of the external storage 63 and sends them to the receiver 201 together with an appropriate signal requesting to cancel the control transfer (hereafter referred to as the Cancel Control Transfer request signal).

In Step S436, the ID of SAM 62, ID of content A, and Cancel Control Transfer request signal are received from the receiver 51. Then, in Step S437, SAM 212 of the receiver 201 searches the transfer information storage 213A of the external storage 213 for the block BM that stores, the ID of content A, the same one as the received ID of content A. The block BM-1 is detected, in this example.

In Step S438, SAM 212 of the receiver 201 determines whether the ID of SAM 62, the same one as the SAM 62 ID received in Step S436 is stored in the block BM-1 (transfer information memory area RM-1) of the transfer information storage 213A of the external storage 213. If it is stored, Step S439 is performed next. In this example, the transfer information memory area RM-1 of the block BM-1 does store the ID of SAM 62 and thus the process goes to Step S439.

In Step S439, SAM 212 of the receiver 201 determines whether the block BM-1 that stores the ID of SAM 62 has been falsified. The specific process for that is basically the same as that of Step S404 in FIG. 48 and thus description thereof is omitted. If it is determined in Step S439 that the block BM-1 is free of falsification, the process goes to Step S440.

In Step S440, SAM 212 of the receiver 201 determines whether the content ID received in Step S436 is stored in the block BM-1 (transfer information memory area RM-1) of the transfer information storage 213A of the external storage 213. If it is stored, Step S441 is performed next. In this example, the transfer information memory area RM-1 of the block BM-1 does store the content ID of the content A and thus the process goes to Step S441.

In Step S441, SAM 212 of the receiver 201 deletes the transfer information from the block BM-1 (transfer information memory area RM-1) of the transfer information storage 213A of the external storage 213. As a result, the transfer information memory area RM-1 of the block BM-1 stores predetermined initial information. In time with the execution of this process, the content A stored in the HDD 202 is also deleted.

Next, in Step S442, the data check module 225 of the receiver 201 computes a hash value by applying a hash function to the data in the block BM-1 that contains the transfer information memory area RM-1 from which the transfer information was deleted in Step S441, and writes it over the hash value HM-1 that is stored in the memory module 223 and that corresponds to the block BM-1.

In Step S443, SAM 212 of the receiver 201 sends a signal to the receiver 51, indicating that the control transfer of the content has been cancelled (hereafter referred to as the Control Transfer Cancelled signal).

In Step S444, when the Control Transfer Cancelled signal is received from the receiver 201, SAM 62 of the receiver 51 stores its own ID as the ID of destination equipment in "Control Transfer Status" in "Usage Details" of UCS A (the ID of SAM 62 has been specified as the ID of source equipment).

Next, in Step S445, the data check module 75 of the receiver 51 computes a hash value by applying a hash function to the data in the block BP-1 that stores the UCS A which had the information in "Control Transfer Status" in "Usage Details" changed in Step S444 (the destination equipment ID was changed from the ID of SAM 212 to the ID of SAM 62). In Step S446, the data check module 75 writes the computed hash value over the hash value HP-1 that is stored in the memory module 73 and that corresponds to the block BP-1.

When the control transfer of content is cancelled in the manner described above, the transfer information is deleted from the destination equipment, the receiver 201, making it impossible for the receiver 201 to use the content A any more. Then, the SAM ID of the source equipment (SAM 62 of the receiver 51) is specified also as the ID of destination equipment in "Control Transfer Status" in "Usage Details," allowing the receiver 51 to perform a new control transfer of the content A.

Although in the example described above, control transfer of content was possible only when the use type of the content was 'Purchase and Reproduce,' it is also possible to enable control transfer of content even when the use type is 'Limited-Time Reproduction.'

Also, although the receiver 51 sent a Cancel Control Transfer signal to the receiver 201 (i.e., the receiver 51 requested the receiver 201 to cancel the control transfer) in the above example, it is also possible to allow the receiver 201 to request cancellation of control transfer.

Also, the public key Kpu and authentication certificate of SAM 62 were stored in the memory module 73 of the receiver 51 in the above example, it is also possible to store them on the HDD 52. Similarly, the public key Kpu and authentication certificate of SAM 212 can be stored on the HDD 202 as well.

Besides, although the content in the above description was music data, it can also be moving picture data, still image data, text data, or program data. Then in using a different type of content, a compression method suitable for the content type can be selected: for example, MPEG (Moving Picture Experts Group) can be used if the content is image data. The type of watermark suitable for the content can also be selected.

As to common-key cryptography, DES which is a block cipher was used. However, FEAL proposed by NTT (trademark), IDEA (International Data Encryption Algorithm), or a stream cipher that encrypts a bit or several bits of data at a time can be employed as well.

Although common-key cryptography was used to encrypt content and content keys Kco as described above, public-key cryptography can also be used.

In the present specification, a system means entire equipment consisting of two or more equipment items.

As for providing medium for use in providing the programs for running the processes described above, in addition to recording media such as magnetic discs, CD-ROMs, or solid state-memories, communications media such as satellites can also be used.

The receivers according to the embodiments of the present invention described above allow value information to be transferred while ensuring protection of the copyright because when the transfer status information indicates that value information has not been transferred; if value information is supplied to other information processing apparatuses together with transfer information containing the key required to decrypt the value information, the transfer status information is changed to indicate that the value information has been transferred; and if a reply signal is received in response to a given control signal, the transfer status information is changed to indicate that value information has not been transferred.

Also, the receivers according to the embodiments of the present invention described above allow transferred value information to be utilized while ensuring protection of the copyright because stored transfer information is deleted when value information, transfer information containing the key required to decrypt the value information, and a given control signal are received from other information processing apparatuses.

INDUSTRIAL APPLICABILITY

The present invention can be applied to information processing systems that encrypt and distribute music data, moving picture data, still image data, text data, or program data.

The invention claimed is:

1. An information processing apparatus for controlling transfer of contents to a destination information processing apparatus, comprising:
   storage means for storing a usage control status; and
   judgment means for judging whether transfer of said contents is possible in accordance with said usage control status;
   wherein said usage control status has a registration area storing an ID information (SAM ID) of said destination information processing apparatus,
   wherein said judgment means performs the judgment based on said ID information (SAM ID) stored in said registration area, and
   wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted.

2. The information processing apparatus according to claim 1, wherein said judgment means judges that transfer of said contents is possible when said ID information comprises the source information processing apparatus ID.

3. An information processing apparatus for canceling a transfer of contents after the transfer of contents is performed to a destination information processing apparatus, comprising:

storage means for storing a usage control status; and judgment means for judging whether canceling transfer of said contents is possible in accordance with said usage control status;

wherein said usage control status has a registration area storing an ID information (SAM ID) of said destination information processing apparatus, wherein said judgment means performs the judgment based on said ID information (SAM ID) stored in said registration area wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted.

4. The information processing apparatus according to claim 3, wherein said judgment means judges that canceling transfer of said contents is possible when said ID information comprises destination information processing apparatus ID.

5. The information processing apparatus according to claim 4, wherein said judgment means judges whether canceling transfer of said contents is possible when ID information further stored to the storage area of the source information processing apparatus in said usage control status comprises the source information processing apparatus ID.

6. The information processing apparatus according to claim 3, wherein said judgment means judges that canceling transfer of said contents is possible when said ID information comprises the source information processing apparatus ID.

7. The information processing apparatus according to claim 3, wherein said judgment means judges that canceling transfer of said contents is possible when ID information further stored to the storage area of the destination information processing apparatus in said usage control status comprises the destination information processing apparatus ID.

8. An information processing system for canceling a transfer of contents after the transfer of contents is performed from a first information processing apparatus to a second information processing apparatus;

said first information processing apparatus comprising:

first storage means for storing a first usage control status; and first judgment means for judging whether canceling transfer of said contents is possible based on said first usage control status;

wherein said second information processing apparatus comprises:

second storage means for storing a second usage control status; and second judgment means for judging whether canceling transfer of said contents is possible based on said second usage control status;

wherein said first usage control status has a registration area storing an ID information (SAM ID) of said second information processing apparatus;

wherein said first judgment means performs the judgment based on said ID information (SAM ID) stored in said registration area of said first usage control status; and wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, the said control transfer permission information being one of permitted or not permitted.

9. The information processing system according to claim 8, wherein it is judged that canceling transfer of said contents is possible when ID information stored to the storage area of said destination information processing apparatus in first and second usage control status comprises the first information processing apparatus ID and ID information stored to the storage area of said first information processing apparatus in first and second usage control status comprises the second information processing apparatus ID.

10. An information processing apparatus for controlling transfer of contents to a destination information processing apparatus, comprising:

storage means for storing a usage control status, wherein said usage control status has a registration area storing an ID information (SAM ID) of said destination information processing apparatus;

judgment means for judging whether transfer of said content is possible based on said usage control status, and change means for changing said usage control status based on the result of said judgment means;

wherein said judgment means performs the judgment based on said ID information (SAM ID) stored in said registration area;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted; and wherein when said judgment means judges that transfer of said contents is possible, said change means changes registration conditions stored in the storage area of said destination information processing apparatus into ID information (SAM ID) of said destination information processing apparatus.

11. The information processing apparatus according to claim 10, wherein: said information processing apparatus further comprises a transmitting means, and said transmitting means transmits the changed usage control status to said destination information processing apparatus.

12. An information processing system for controlling transfer of contents when the transfer of contents is performed from a first information processing apparatus to a second information processing apparatus, said first information processing apparatus comprising:

storage means for storing a usage control status;

judgment means for judging whether controlling transfer of said contents is possible based on said usage control status;

wherein said usage control status has a registration area storing an ID information (SAM ID) of said destination information processing apparatus, wherein said judgment means performs the judgment based on said ID information (SAM ID) stored in said registration area;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted;

change means for changing said usage control status based on the result of said judgment means; and transmitting means for transmitting the usage control status changed by said change means to said second information processing apparatus;

wherein said second information processing apparatus comprises:

receiving means for receiving said usage control status transmitted by said transmitting means;

wherein when said judgment means judges that transfer of said contents is possible, said change means changes registration conditions stored in the storage area of said destination information processing apparatus into ID information (SAM ID) of said second information processing apparatus.

13. The information processing system according to claim 12, wherein said second information processing apparatus further comprises generation means, said generation means for generation the new usage control status for using said second information processing apparatus based on said usage control status received by said receiving means.

14. The information processing system according to claim 12, wherein said second information processing apparatus further comprises generation means, said generation means for generating the new usage control status for using a third information processing apparatus based on said usage control status change means transmitted by said transmitted means.

15. An information processing apparatus for canceling a transfer of contents after the transfer of contents is performed from a first information processing apparatus to a second information processing apparatus, comprising:

storage means for storing a usage control status;

judgment means for judging whether canceling transfer of said contents is possible based on said usage control status; and change means for changing said usage control status based on the result of said judgment means;

wherein said first usage control status has a registration area storing an ID information (SAM ID) of said second information processing apparatus, wherein said judgment means performs the judgment based on said ID information (SAM ID) stored in said registration area of said first usage control status;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted; and wherein when said judgment means judges that transfer of said contents is possible, said change means changes registration conditions stored in the storage area of said second information processing apparatus into ID information (SAM ID) or initial value of said first information processing apparatus.

16. An information processing system for canceling a transfer of contents after a transfer of contents is performed from a first equipment information processing apparatus to a second information processing apparatus;

said first information processing apparatus comprising:

first storage means for storing a first usage control status;

judgment means for judging whether canceling transfer of said contents is possible based on said first usage control status;

wherein said first usage control status has a registration area storing an ID information (SAM ID) of said second information processing apparatus, wherein said judgment means performs the judgment based on said ID information (SAM ID) stored in said registration area of said first usage control status;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted;

change means for changing said usage control status based on the result of said judgment means; and transmitting means for transmitting a transfer cancel command to said second information processing apparatus; and said second information processing apparatus comprising:

second storage means for storing a second usage control status;

receiving means for receiving said transfer cancel command; and deletion means for deleting said second usage control status;

wherein when said judgment means judges that canceling transfer of said contents is possible, said change means changes registration condition stored in the storage area of said second information processing apparatus into ID information (SAM ID) or initial value of said first information processing apparatus;

wherein said deletion means deletes said second usage control status when said receiving means receives said transfer cancel command.

17. The information processing system according to claim 16, wherein said second information processing apparatus further comprises reply means, said reply means replaying a signal indicative of said first information processing apparatus, after said deletion means deleted said second usage control status, and wherein said change means changes said first usage control status after receiving said completion signal of deletion.

18. An information processing method for performing transfer of contents from a first information processing apparatus to a destination information processing apparatus, said information processing method comprising the steps of:

storing a usage control status;

judging whether transfer of said contents is possible based on said usage control status;

wherein said usage control status stores an ID information (SAM ID) of said destination information processing apparatus, said storing occurring in a registration area of said usage control status, said judging being based on said ID information (SAM ID) stored in said registration area;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted.

19. An information processing method for canceling transfer of contents after the transfer of contents is performed from a first information processing apparatus to a destination information processing apparatus, said information processing method comprising the steps of:

storing a usage control status;

judging whether canceling the transfer of said contents is possible based on said usage control status;

wherein said usage control status stores an ID information (SAM ID) of said destination information processing apparatus, said storing occurring in a registration area of said usage control status, said judging being based on said ID information (SAM ID) stored in said registration area;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted.

20. An information processing method for controlling transfer of contents from a first information processing apparatus to a destination information processing apparatus, comprising the steps of:

storing a usage control status;

judging whether transfer of said contents is possible based on said usage control status;

wherein said usage control status stores an ID information (SAM ID) of said destination information processing apparatus, said storing occurring in a registration area of said usage control status, said judging being based on said ID information (SAM ID) stored in said registration area; and changing said usage control status based on the result of said judgment step;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted; and wherein when it is judged that transfer of said contents is possible, registration conditions are stored in the storage area of said destination information processing apparatus and changed into ID information (SAM ID) of said destination information processing apparatus.

21. An information processing method for canceling a transfer of contents after the transfer of contents is performed from a first information processing apparatus to a second information processing apparatus, said information processing method comprising the steps of:

storing a usage control status;

judging whether canceling transfer of said contents is possible based on said usage control status, wherein said first usage control status stores an ID information (SAM ID) of said second information processing apparatus, said storing occurring in a registration area of said first usage control status, said judging being based on said ID information (SAM ID) stored in said registration area; and changing said usage control status based on the result of said judgment step;

wherein said registration area stores usage details comprising a type including how said contents can be reproduced or duplicated and control transfer permission information including whether control transfer is possible, said type being one of purchase and reproduce, first generation duplicate, limited-time reproduction, pay per copy, or pay per play, and said control transfer permission information being one of permitted or not permitted; and wherein when it is judged that transfer of said contents is possible, said registration conditions stored in the storage area of said second information processing apparatus is changed into the source information processing apparatus ID or initial value.

* * * * *